US007699315B2

(12) United States Patent
Hirato et al.

(10) Patent No.: US 7,699,315 B2
(45) Date of Patent: Apr. 20, 2010

(54) LIGHT EMITTING GAMING DEVICE TO REDUCE PLAYER FATIGUE

(75) Inventors: Jun Hirato, Tokyo (JP); Yasuaki Tanabe, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 294 days.

(21) Appl. No.: 11/753,765

(22) Filed: May 25, 2007

(65) Prior Publication Data

US 2007/0284814 A1 Dec. 13, 2007

(30) Foreign Application Priority Data

Jun. 9, 2006 (JP) ............................ 2006-161655

(51) Int. Cl.
*A63F 13/00* (2006.01)
*G07F 17/34* (2006.01)

(52) U.S. Cl. .................................................. 273/143 R

(58) Field of Classification Search .............. 273/138.1, 273/139, 143 R; 463/16, 20, 21, 25
See application file for complete search history.

(56) References Cited

U.S. PATENT DOCUMENTS

| | | | | |
|---|---|---|---|---|
| 2,020,453 | A * | 11/1935 | Hoffman | 516/58 |
| 2,222,319 | A * | 11/1940 | Gray et al. | 362/245 |
| 5,151,850 | A * | 9/1992 | Matsuno et al. | 362/488 |
| 6,334,612 | B1 | 1/2002 | Wurz et al. | |
| 6,656,041 | B1 * | 12/2003 | Kaminkow et al. | 463/16 |
| 6,974,238 | B2 * | 12/2005 | Sturt et al. | 362/488 |
| 7,131,909 | B2 * | 11/2006 | Rowe | 463/42 |
| 2004/0105264 | A1 * | 6/2004 | Spero | 362/276 |
| 2004/0266524 | A1 | 12/2004 | Williams et al. | |
| 2006/0094511 | A1 | 5/2006 | Roireau | |
| 2006/0203490 | A1 * | 9/2006 | Saccomanno et al. | 362/257 |
| 2008/0137333 | A1 * | 6/2008 | Tamaoki et al. | 362/244 |

(Continued)

FOREIGN PATENT DOCUMENTS

DE 100 19 746 A1 10/2001

OTHER PUBLICATIONS

U.S. Appl. No. 11/753,765, filed May 25, 2007, Hirato et al.

(Continued)

*Primary Examiner*—William M Pierce
(74) *Attorney, Agent, or Firm*—Oblon, Spivak, McClelland, Maier & Neustadt, L.L.P.

(57) ABSTRACT

To provide a gaming machine which achieves a reduction in a player's fatigue.

A gaming machine 1 according to the invention includes a cabinet 3, having a display portion 4 which displays information relating to a game and operation buttons 11 for a player to carry out an operation of the game, a power lamp light emitting portion 300 which emits light, and a lens barrel 310 which intercepts at least some of light heading toward a player, from among light emerging from LED's 302 provided on the power lamp light emitting portion 300. In this kind of gaming machine 1, at least some of the light heading toward the player, from among the light emerging from the LED's 302 of the power lamp light emitting portion 300, is intercepted by the lens barrel 310. For this reason, light from the power lamp light emitting portion 300 entering the player's field of vision being reduced by the lens barrel 310, fatigue of a player continuing the game is reduced.

3 Claims, 47 Drawing Sheets

U.S. PATENT DOCUMENTS

| | | | | |
|---|---|---|---|---|
| 2008/0165541 | A1* | 7/2008 | Chou et al. | 362/311 |
| 2008/0285255 | A1* | 11/2008 | Bourdelais et al. | 362/19 |

OTHER PUBLICATIONS

U.S. Appl. No. 11/753,692, filed May 25, 2007, Tanabe.
U.S. Appl. No. 11/756,928, filed Jun. 1, 2007, Ishikawa et al.
U.S. Appl. No. 11/757,136, filed Jun. 1, 2007, Tanabe.
U.S. Appl. No. 11/757,606, filed Jun. 4, 2007, Tanabe et al.
U.S. Appl. No. 11/757,785, filed Jun. 4, 2007, Hirato et al.
U.S. Appl. No. 11/757,662, filed Jun. 4, 2007, Hirato et al.

* cited by examiner

LIGHT EMITTING GAMING DEVICE TO REDUCE PLAYER FATIGUE

RELATED APPLICATION

This application claims the priority of Japanese Patent Application No. 2006-161655 filed on Jun. 9, 2006, which is incorporated herein by reference.

BACKGROUND OF THE INVENTION

1. Technical Field

The present invention relates to a gaming device applicable to a gaming machine, such as a slot machine, in which symbols aligned in a plurality of arrays are variably displayed.

2. Related Art

To date, a gaming machine (for example, a slot machine or the like) which, by causing a revolving reel (a variable display device), on a perimeter of which a symbol array is provided, to revolve, carries out a game variably displaying symbols has been known. As the variable display device installed in this kind of gaming machine, one which varies the symbols by mechanically revolving an actual revolving reel, and one which variably displays the symbols by simulating a revolution of the revolving reel on an image display device such as a liquid crystal display device or a CRT, have been known.

This type of gaming machine, in general, by inserting a medal or a coin (hereafter called a game medium) and carrying out a prescribed start operation (a depression operation of a SPIN button or the like), varies a plurality of the variable display devices whereon, based on a selection result of an internal selection, a stop process of a plurality of varying symbols is carried out. Then, based on a combination of stopped symbols, a prescribed amount of the game media is granted to a player (for example, refer to U.S. Pat. No. 6,334, 612).

In general, in this kind of gaming machine, a large number of illumination devices are provided for an effect and an advertising of the gaming machine. Then, a fact that an excessive illumination due to these kinds of illumination device constantly enters a player's field of vision is a cause of an increase in fatigue of a player continuing the game.

SUMMARY OF THE INVENTION

The invention, being contrived in order to solve the heretofore described problem, has an object of providing a gaming device which achieves a reduction in the player's fatigue.

The invention, being a gaming device, includes: a cabinet having a display portion, which displays information relating to the game, and an operation portion for a player to carry out an operation of the game; a light emitting portion which emits light; and a light interception portion which intercepts at least some of light heading toward a player, from among light emerging from a light source provided on the light emitting portion.

Also, it is preferable that the light emitting portion has a lens which converges the light emerging from the light source.

Also, it is preferable that the light interception portion surrounds a periphery of the lens.

According to the gaming device of the invention, it is possible to reduce the player's fatigue.

Additional objects and advantage of the invention will be set forth in the description which follows, and in part will be obvious from the description, or may be learned by practice of the invention. The objects and advantages of the invention may be realized and obtained by part of the instrumentalities and combinations particularly pointed out hereinafter.

BRIEF DESCRIPTION OF THE SEVERAL VIEWS OF THE INVENTION OF THE DRAWINGS

The accompanying drawings, which are incorporated in and constitute apart of the specification, illustrate embodiments of the invention, and together with the general description given above and the detailed description of the embodiments given below, serve to explain the principals of the invention.

FIG. 5A is an enlarged sectional view showing a reflecting surface, while

DESCRIPTION OF THE PREFERRED EMBODIMENTS

Figure 1:
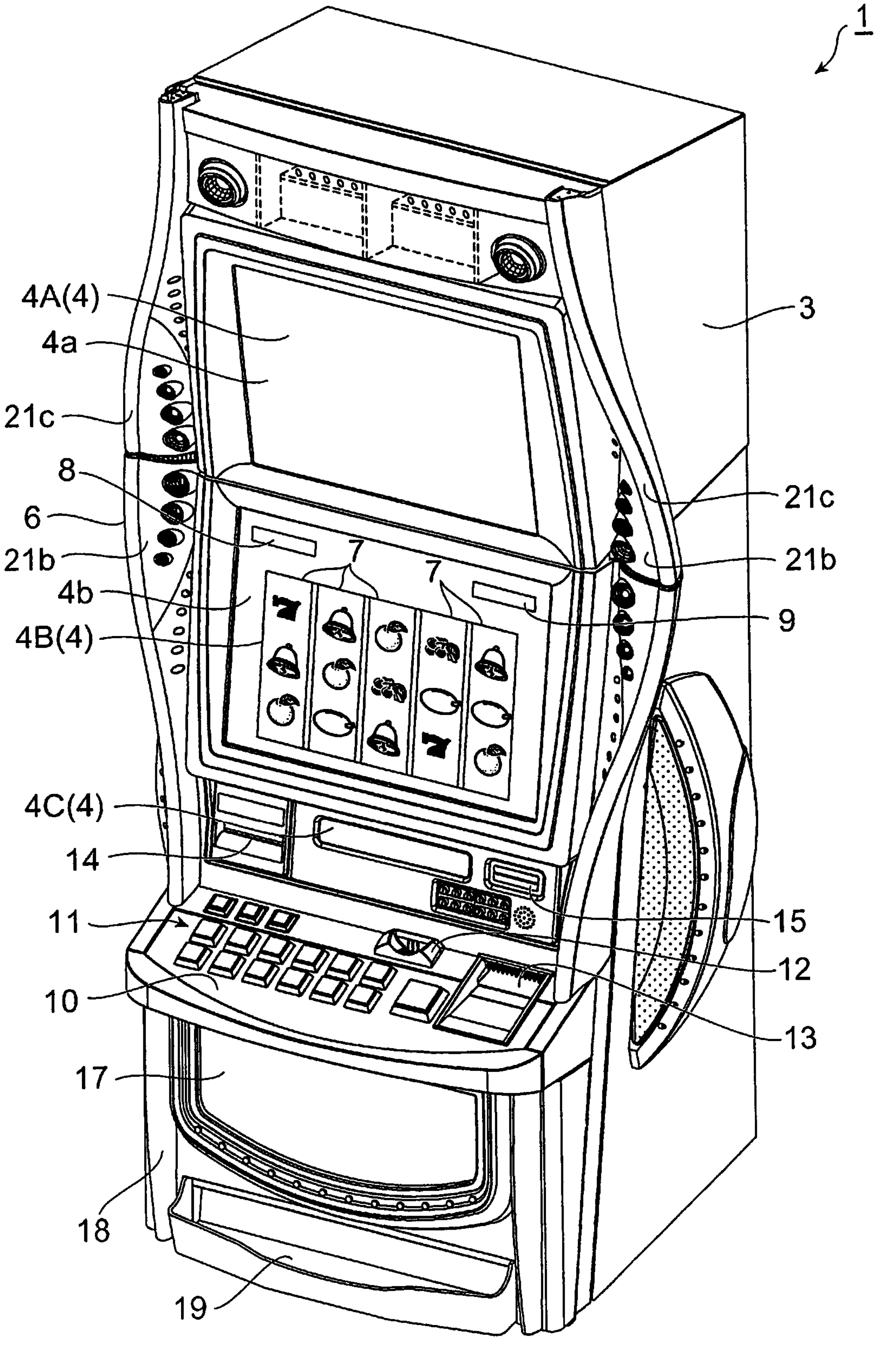
FIG. 1 is a perspective view showing an embodiment of a gaming machine according to the invention.

A gaming device according to the invention includes a cabinet having a display portion, which displays information relating to a game, and an operation portion for a player to carry out an operation of the game, a light emitting portion which emits light, and a light interception portion which intercepts at least some of light heading toward a player, from among light emerging from a light source provided on the light emitting portion.

In this kind of gaming device, at least some of the light heading toward the player, from among the light emerging from the light source of the light emitting portion, is intercepted by the light interception portion. For this reason, light from the light emitting portion entering the player's field of vision being reduced by the light interception portion, fatigue of a player continuing the game is reduced.

Also, it is preferable that the light emitting portion has a lens which converges the light emerging from the light source. In this case, diverting a lens converging direction away from a direction of the player, it is possible to more effectively avoid a situation in which the light from the light emitting portion enters the player's field of vision.

Also, it is preferable that the light interception portion surrounds a periphery of the lens. By this part, it is possible to more reliably avoid the situation in which the light from the light emitting portion enters the player's field of vision.

Hereafter, a detailed description will be given, while referring to the drawings, of preferred embodiments of a gaming machine including the gaming device according to the invention.

Overall Description of Gaming Machine

Figure 2:
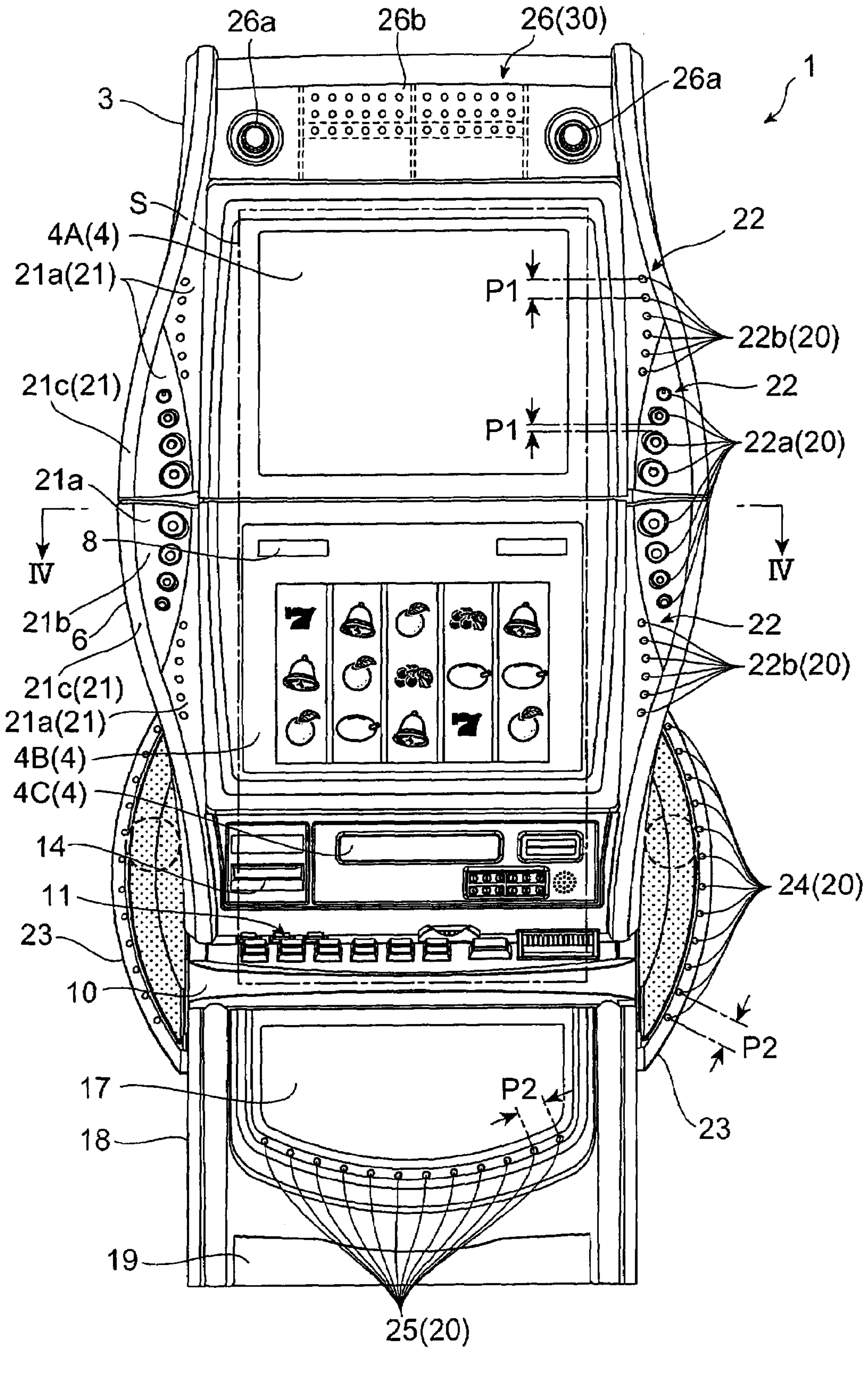
FIG. 2 is a front view of the gaming machine shown in FIG. 1.
Figure 3:
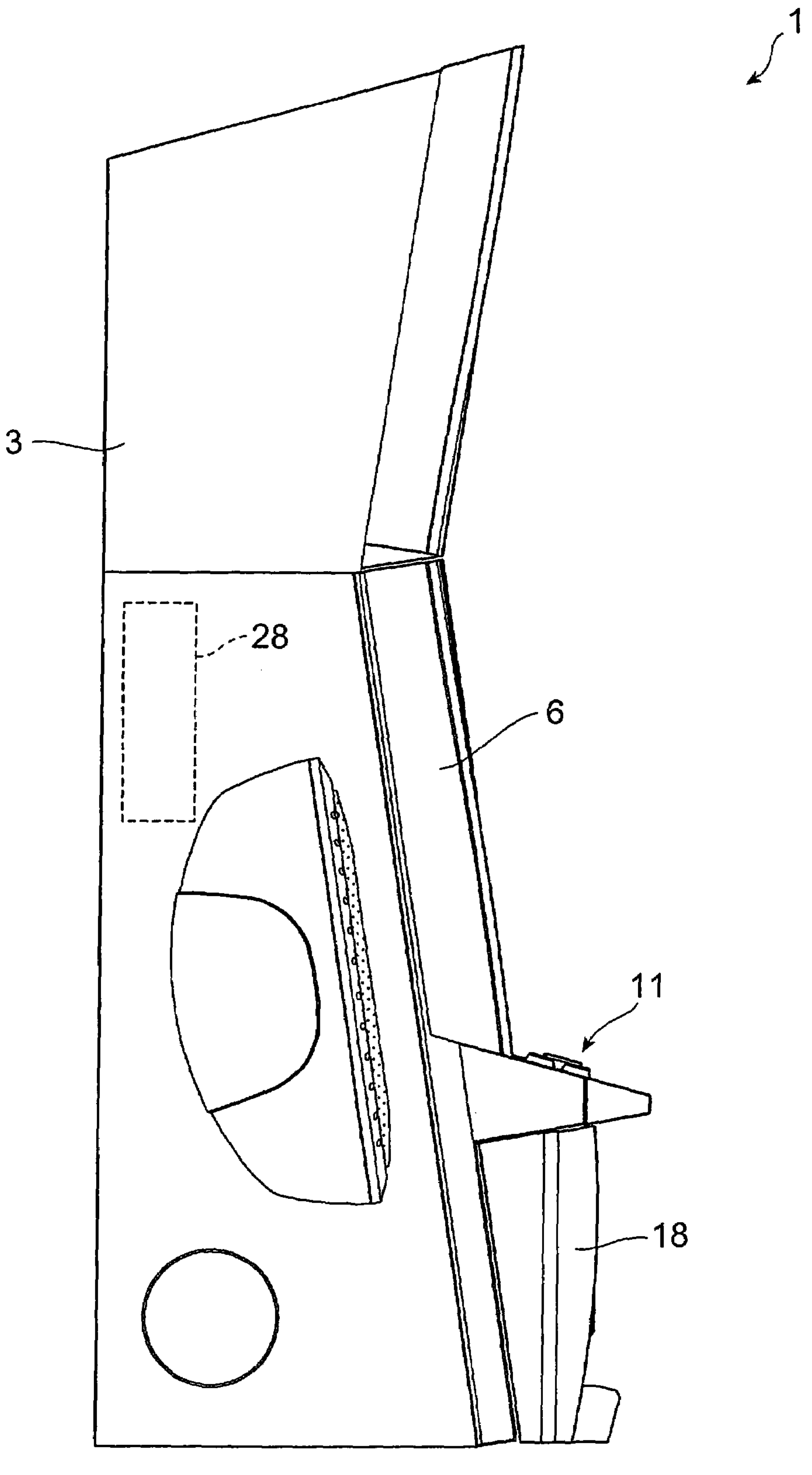
FIG. 3 is a side view of the gaming machine shown in FIG. 1.

As shown in FIGS. 1 to 3, a gaming machine 1, being an upright type slot machine installed in a game arcade such as a casino, has a cabinet 3 for housing electrical or mechanical parts for executing a prescribed game aspect. A display portion 4 for displaying game information based on a game operation of a player including, for example, an upper variable display portion 4A, a middle variable display portion 4B and a lower variable display portion 4C, each display portion 4A to 4C is attached to a front surface of the vertically long cabinet 3.

The upper variable display portion 4A is configured of a liquid crystal panel for displaying a payout table, a display of game rules and a bonus game, and the like at the time of a game. Then, the variable display portion 4A including this liquid crystal panel is inclined in such a way as to tilt forward in order to improve a visibility for a player whose view point is positioned approximately at a height of the middle variable display portion 4B.

The middle variable display portion 4B, being a revolving symbol display panel on which the player constantly keeps a close watch, is a transmissive liquid crystal panel fixed to an upper front door 6 of the cabinet 3. Five transparent display windows 7 being provided in the variable display portion 4B including this liquid crystal panel, symbols of five mechanical reels disposed inside the cabinet 3 can be seen through the display windows 7 from outside. Also, a plurality of pay lines traversing the five display windows 7 horizontally and diagonally are displayed on the variable display portion 4B. Then, in the variable display portion 4B, an animation effect is carried out at the time of a winning or the like. Furthermore, a payout quantity display portion 8 and a credit quantity display portion 9 are provided in an upper portion of the variable display portion 4B. Then, the middle variable display portion 4B being inclined in such a way that an upper portion tilts rearward, as the player whose view point is positioned approximately at the height of the middle variable display portion 4B looks slightly down at it, it is possible for the player to look at a screen from a comfortable position. Although a description has been given of a case in which a symbol change display is carried out with the mechanical reels installed on a rear surface of the variable display portion 4B, it is also acceptable to display video reels on the variable display portion 4B, instead of the mechanical reels. Also, a number of the mechanical reels is not limited to five.

The lower variable display portion 4C is a liquid crystal panel for displaying a point quantity recorded on a card or a game point quantity. A numeric value displayed on the variable display portion 4C including this liquid crystal panel being based on a display result of the middle variable display portion 4B, when symbols come together on the variable display portion 4B and a "winning combination" occurs, the game point quantity displayed on the variable display portion 4C is added to based on a big bonus result. Also, a ticket printer 14 is installed on a left side of the variable display portion 4C, and a card reader 15 is installed on a right side of the variable display portion 4C.

An operation table 10 protruding forward from a front of the cabinet 3 being disposed below the lower variable display portion 4C, operation buttons 11 (for example, a BET button, a COLLECT button, a START button, a STOP button and the like) acting as an operation portion for the player to carry out an operation of the game are arranged on the operation table 10. Furthermore, a coin slot 12 and a bill accepter 13 are provided on the operation table 10.

A waist panel 17, being disposed below the operation table 10, is a plastic panel on which an image relating to the game is printed. The waist panel 17, as well as being fixed to a lower front door 18, is lit up by a cold cathode tube. Furthermore, a coin tray 19 for collecting coins paid out based on a game result is disposed below the waist panel 17.

Illumination

Figure 7:
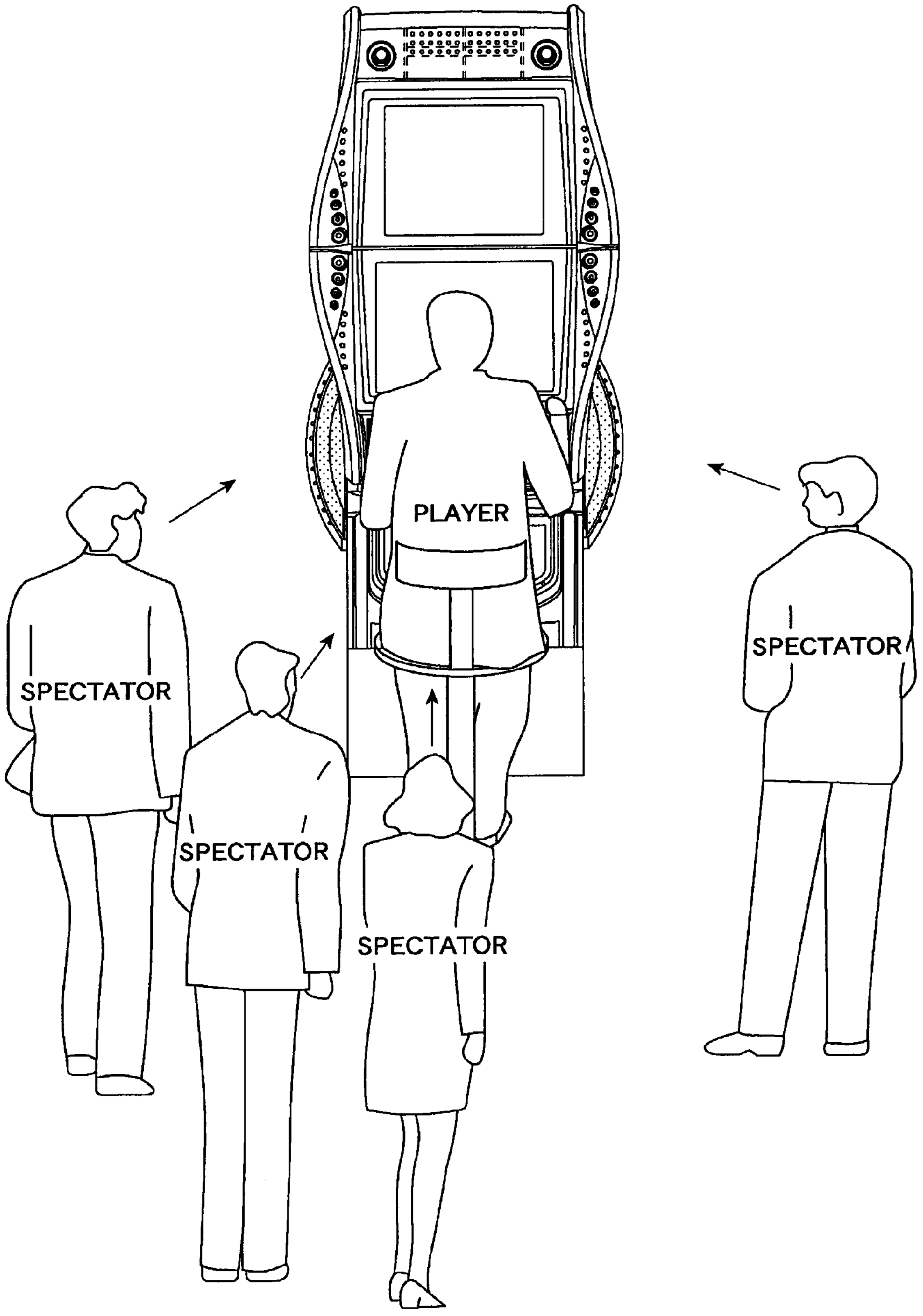
FIG. 7 is a front view showing the relationship between the player positioned to the front of the gaming machine and the spectators.

As shown in FIGS. 1 and 2, light emitting portions 20 are disposed on the cabinet 3 in such a way as to surround a game area S including: the display portion 4 configured of the upper variable display portion 4A, the middle variable display portion 4B and the lower variable display portion 4C; and the operation buttons (the operation portion) 11 on the operation table 10. As shown in FIG. 7, the player is positioned in such a way that the player's view point is positioned approximately at the height of the middle variable display portion 4B. The position of the player is also in an approximate center of the game area S, which is an area on which the player focuses most closely. The light emitting portions 20 are configured of side lamps 22, which are provided on inclined portions 21 protruding bow-like from both right and left end portions, on the front of the cabinet 3, and on sides thereof across the upper variable display portion 4A, the middle variable display portion 4B and the lower variable display portion 4C, speaker lamps 24, which, as well as being provided on bow shaped speakers 23A and 23B protruding laterally from both right and left end portions of the cabinet 3 in a vicinity of the operation table 10, are arranged along edges of the speakers 23A and 23B, under lamps 25, which, as well as being provided on the lower front door 18, are arranged along a lower edge of the waist panel 17, and a top lamp 26 which is provided above the upper variable display portion 4A. The light emitting portions 20, by a light emitting control, create an intriguing illumination.

Figure 4:
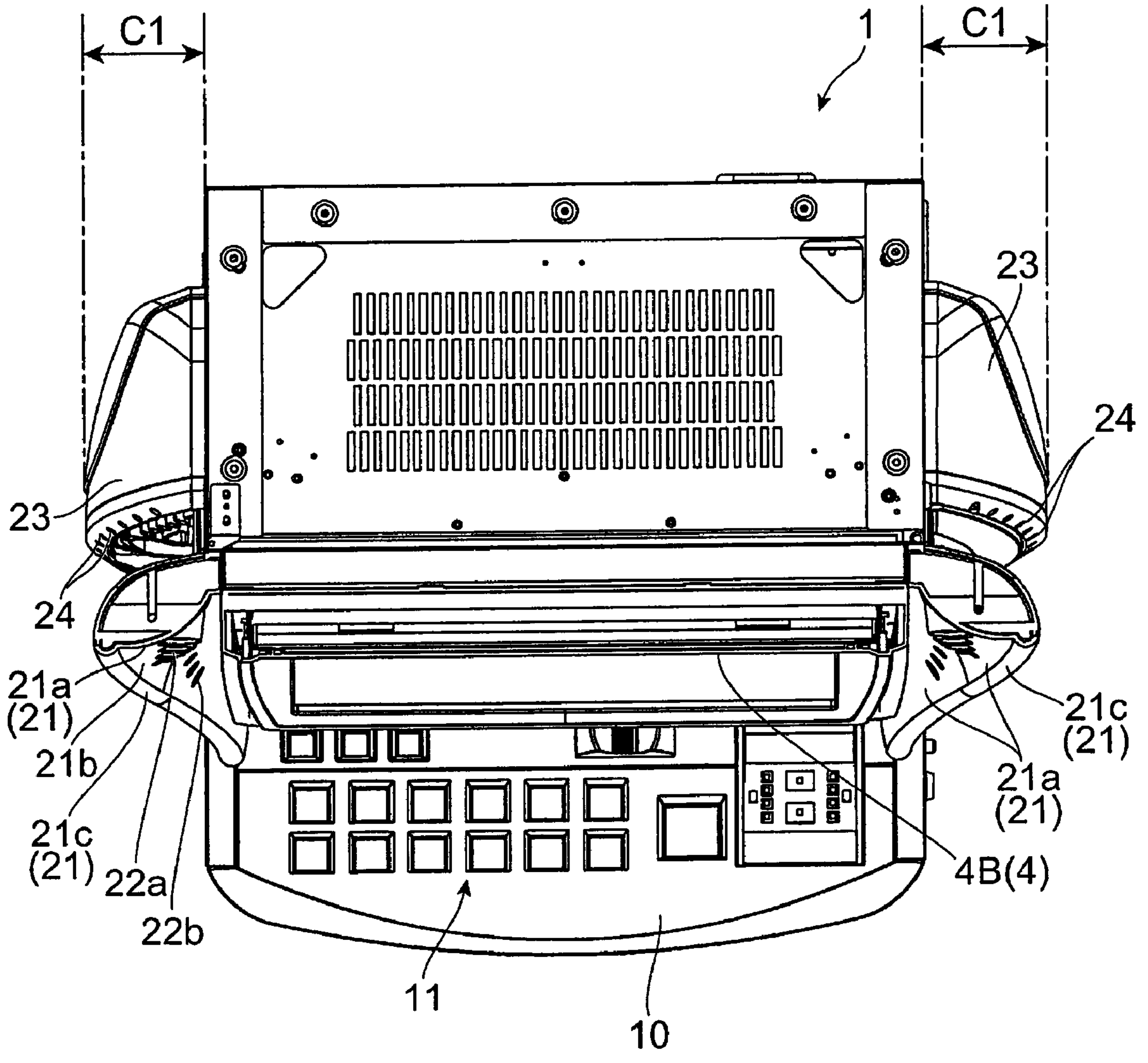
FIG. 4 is a sectional view along line IV-IV of FIG. 2.

As shown in FIGS. 2 and 4, the right and left inclined portions 21, being inclined toward the display portions 4A and 4B as they go away from front surfaces 4*a* and 4*b* (refer to FIG. 1) of the display portions 4A and 4B, are each configured of an inclined surface 21*a* and a thick frame 21*c*, and a chromeplated reflecting surface 21*b* being provided in a center of the inclined surface 21*a*, a surface of the inclined surface 21*a* on which sub-side lamps 22*b* are disposed is satin finished. On an outer edge of each inclined portion 21, the bow shaped thick frame 21*c*, of which a central portion swells outward, extends in an up and down direction and, as well as having a semicircular cross-section, is chromeplated. Furthermore, eight main side lamps 22*a*, being arranged in the up and down direction on each reflecting surface 21*b*, are light emitting portions which decrease in size gradually toward a bottom or a top from a center. In the side lamps 22, the sub-side lamps 22*b*, being arranged in the up and down direction above and below the main side lamps 22*a*, are linearly arranged in such a way as to be approximately continuous with the main side lamps 22*a*.

In this way, the gaming machine 1 including the cabinet 3 having the display portion 4, which displays the information relating to the game, and the operation buttons 11 acting as the operation portion for the player to carry out the operation of the game, the light emitting portions 20 are disposed in such a way as to surround the game area S including the display portion 4 and the operation buttons (the operation portion) 11.

As the light emitting portions 20 are disposed in such a way as to surround the game area S including the display portion 4 and the operation buttons (the operation portion) 11, it being possible to cause the gaming machine 1 itself to emit light in such a way as to surround the game area S, it becomes possible to advertise the game machine 1 itself to surrounding spectators. Simultaneously, as the display portion, on which details of a game actually being played are displayed, and the operation portion, with which it is possible to confirm an operation procedure, method and the like of a game the player plays, are places of deepest concern to the surrounding spectators, there is an advantage of heightening a degree of focusing on the game area S including these kinds of display portion and operation portion. For example, the spectators observe the game from positions such as those shown in FIG. 7.

Figure 6:
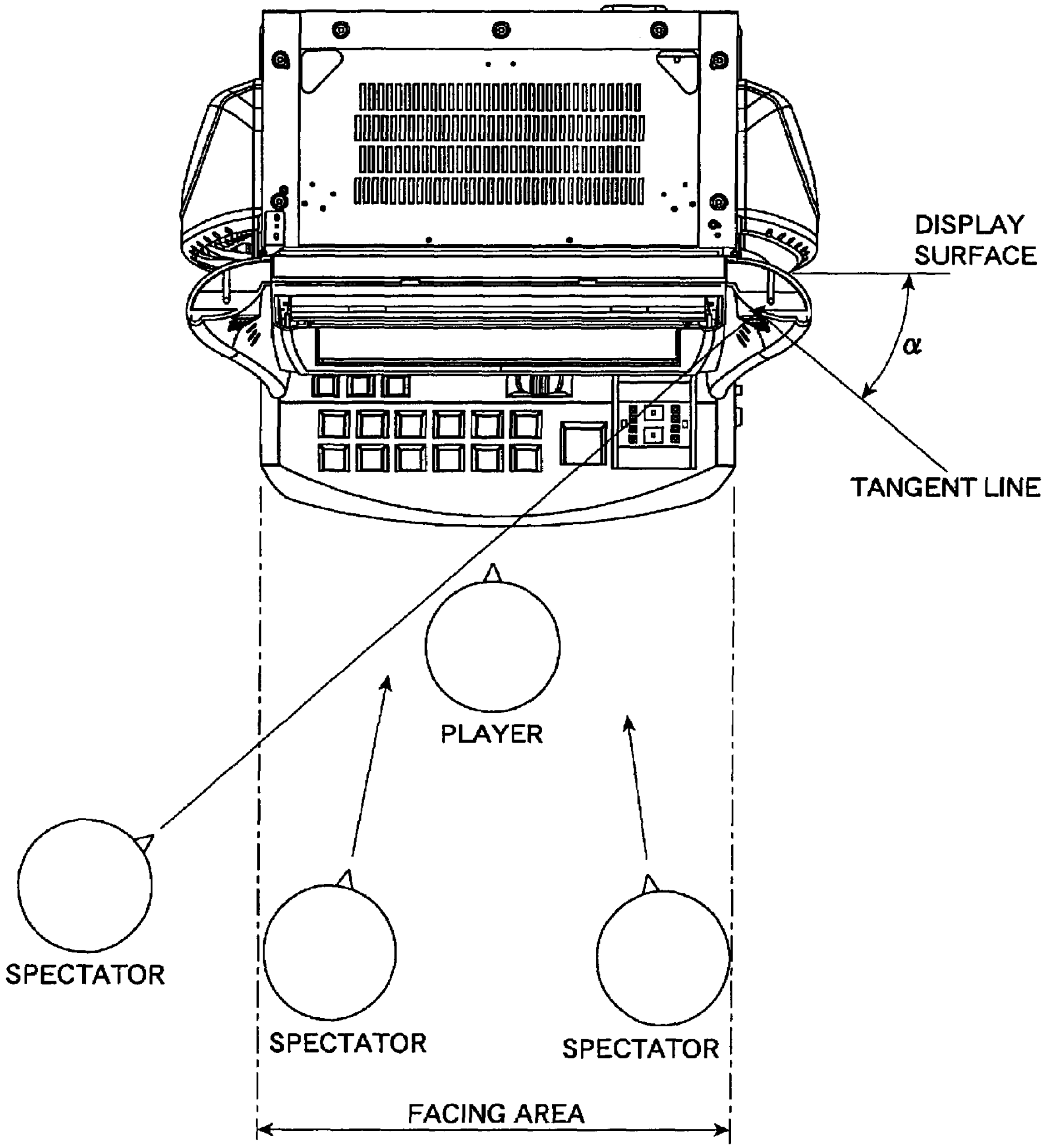
FIG. 6 is a plan view showing a relationship between a player positioned to a front of the gaming machine and spectators.

Also, some of the light emitting portions 20 are disposed on the inclined surfaces 21*a* inclined toward the display portions 4A and 4B as they go away from the front surfaces 4*a* and 4*b* (refer to FIG. 1) of the display portions 4A and 4B. As the inclined portion 21 disposed at a player's right hand approximately faces a spectator diagonally behind the player to the left, and the inclined portion 21 disposed at a player's left hand approximately faces a spectator diagonally behind the player to the right, as shown in FIG. 6, it is easy for these kinds of inclined surface 21*a*, which also approximately face the spectators diagonally behind the player, to enter the relevant spectators' field of vision and, it being possible to advertise the game machine by part of light from the lamps 22*a* and 22*b* disposed on the inclined surfaces 21*a*, it is possible to obtain an advantage of advertising to a larger number of spectators. As shown in FIG. 6, by inclining the light emitting portions 20 on the inclined surfaces 21*a* by an angle α, it being possible to cause the light to face a spectator in other than a facing area, particularly a spectator diagonally behind the player, it is easy for a spectator who has noticed the light to be guided to the display portions 4A and 4B. The angle α is preferably about 30 to 60 degrees.

Also, the inclined portions 21 protrude from the side portions of the cabinet 3. As a result, it being possible to make the game machine 1 itself look larger by an amount equivalent to widths C1 of the inclined portions 21, a distinctive cabinet 3 is created and, as it is possible to secure a wide effective installation area of the light emitting portions 20 carrying out an advertising to the spectators, as well as it becoming possible to improve a degree of advertising of the gaming machine 1 to the spectators, it is possible to make effective use of a space between gaming machines installed at regular intervals for an opening and closing operation of the front doors 6 and 18.

Figure 5A:
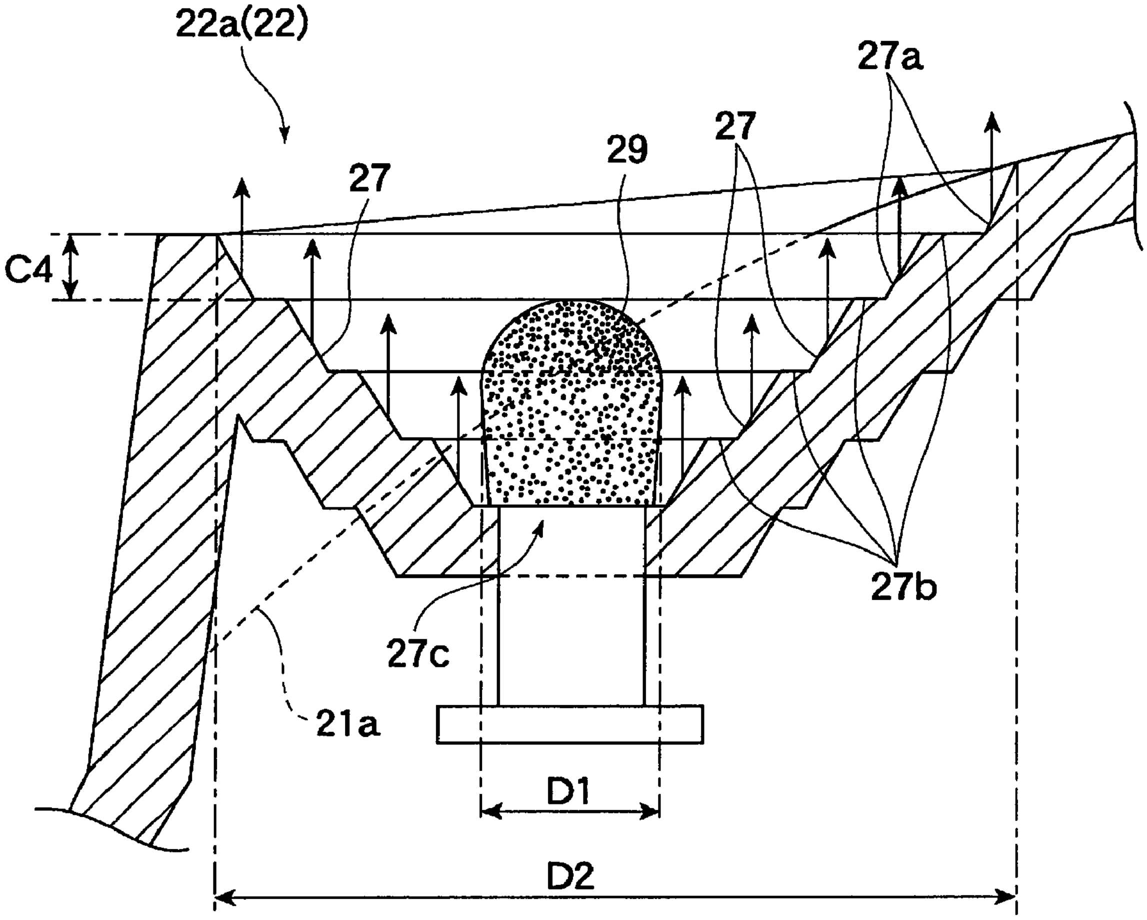

Furthermore, as shown in FIG. 5A, the main side lamps 22*a* arranged on the inclined portions 21 are each configured of a light emitting source 29 having an LED, and a funnel-shaped reflecting surface 27 surrounding the light emitting source 29. With this kind of configuration, as light emitted from the LED 29 is reflected by the funnel-shaped reflecting surface 27 surrounding the LED 29, it becomes possible to make a diameter D2 of apparent light look larger than a diameter D1 of the actual light emitted from the LED 29 and, as well as it being possible to improve the degree of advertising, even in a case in which a quantity of light from the LED 29 has been suppressed, it is possible to make the diameter D2 look larger than the diameter D1 of the actual light emitted from the LED 29, so it is possible to reduce the diameter D2 by that amount, meaning that an energy-saving advantage can also be obtained. Furthermore, in a vicinity of the game area S, as the reflecting surface 27 is formed in the funnel shape, the light emitting source 29 is disposed a distance C4 to a rear of a reflecting portion, so, without the light emitted from the lamps 22*a* directly entering the player's field of vision, it is possible to reduce a strain on and a fatigue of the player's eyes.

Figure 5B:
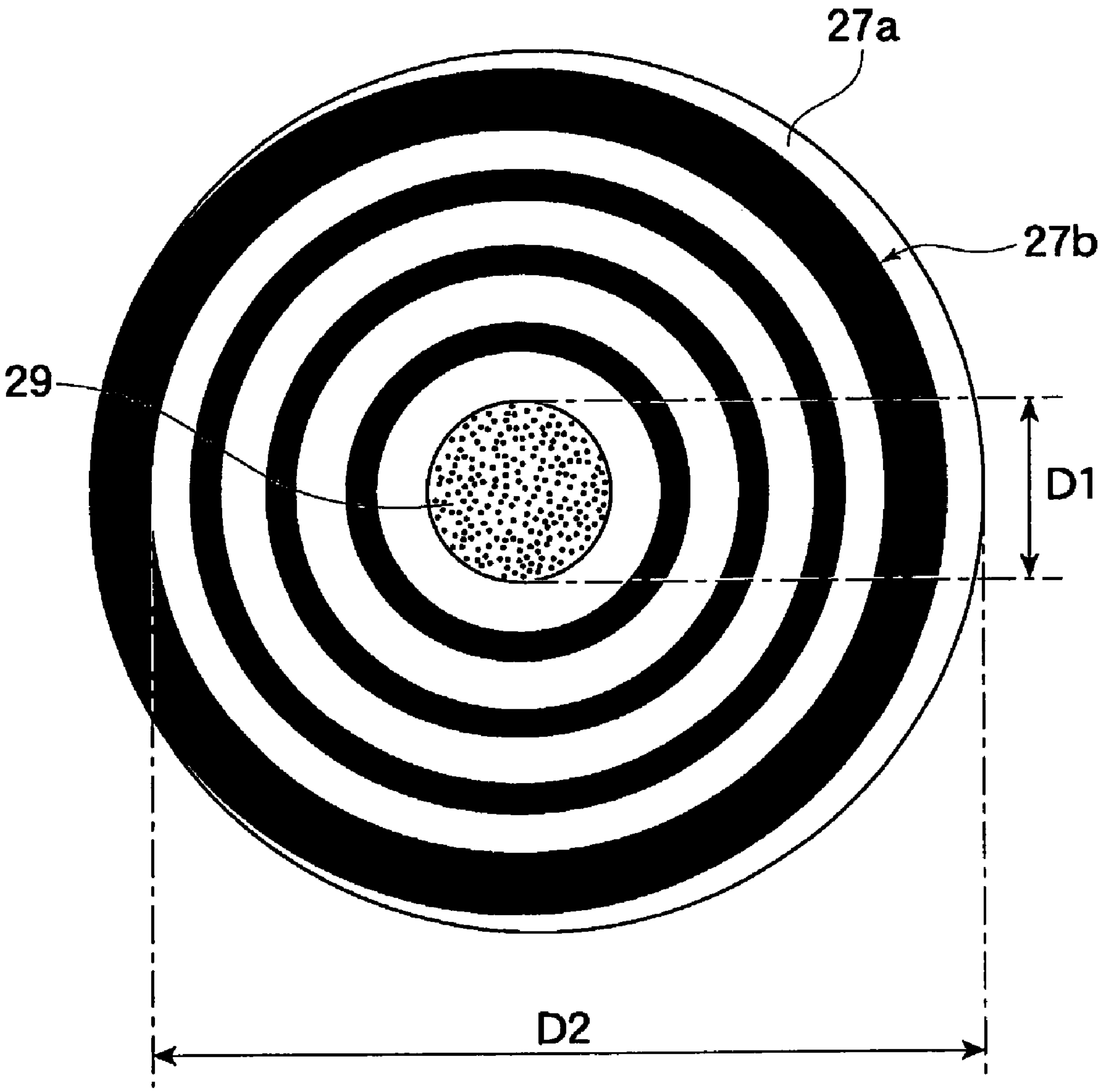
FIG. 5B is a plan view showing reflected light.

The reflecting surface 27 is formed in steps. The light from the LED 29 is reflected forward (in an arrowed direction in the figure) by inclined surfaces 27*a* forming the funnel shape within the reflecting surface 27, while the light is not reflected by surfaces 27*b* parallel to a surface 27*c* on which the LED 29 is installed. Consequently, as it is possible to produce ring-shaped shadowed portions within the reflecting surface 27, a number of ring beams of light corresponding to a number of steps is generated as shown in FIG. 5B. By this part, it being possible to impart a decorative element to the light, it is possible to improve the degree of advertising to the surrounding spectators. Furthermore, as the light has the shadowed portions, it being possible to reduce a quantity of light visible to the player, it is possible to reduce the strain on and the fatigue of the player's eyes.

Furthermore, as shown in FIG. 2, the speaker lamps 24 installed on side surfaces of the cabinet, although installed a prescribed distance rearward from the front surface of the cabinet 3, are linearly arranged in such a way as to be visually approximately continuous with the sub-side lamps 22*b* and the under lamps 25. As the speaker lamps 24 are arranged along the edges of the speakers 23A and 23B, it is possible to further accentuate the speakers 23A and 23B protruding laterally from the cabinet 3, and the side surfaces of the cabinet 3.

Furthermore, the under lamps 25 are linearly arranged in such a way as to be visually approximately continuous with the speaker lamps 24. The waist panel 17 is accentuated by the under lamps 25.

The top lamp 26 being configured of power lamps 26*a* disposed on both sides and a strip-shaped lamp 26*b* arranged in a center in a horizontal direction, each power lamp 26*a* generates very strong light by part of a fisheye lens, and the strip-shaped lamp 26*b* generates horizontally long light by arranging LED's horizontally. The thus configured top lamps 26 are linearly arranged in such a way as to be visually approximately continuous with the sub-side lamps 22*b*.

Furthermore, a control device 28 (refer to FIG. 3) controlling a flashing of the light emitting portions 20 is disposed in the cabinet 3, and the lamps 22*a*, 22*b*, 24, 25, 26*a* and 26*b* controlled by the control device 28 are linearly arranged. By this part, as it is possible to create moving light such as a flowing light illumination, the degree of advertising of the gaming machine 1 to the spectators is further improved. Also, for example, even in the event that the speakers 23A and 23B provided with some of the light emitting portions 20, not being flush with the front doors 6 and 18, the display portion 4 or the like, are withdrawn rearward, in the event that an unevenness exists in a place installed with the light emitting portions 20, or in the event that the light emitting portions 20 are not equally spaced, as a frame such as fringes the game area S can be dramatized by the light, it becomes easier for the spectators, or a spectator who is about to start the game, to identify a game area S worthy of notice.

Also, intervals P1 between the side lamps 22 disposed lateral to the display portion 4 are narrower than intervals P2 between the speaker lamps 24 and under lamps 25 disposed lateral to and below the operation buttons 11. With regard to the side lamps 22 disposed at the first intervals P1 and the speaker lamps 24 and under lamps 25 disposed at the second intervals P2, in a case of carrying out an execution of an identical flashing time control by part of the control device 28 in order to create the flowing light, as the second intervals P2 are set wider than the first intervals P1, a flow speed of beams of light arranged at the first intervals P1 can be made to look slower than a flow speed of beams of light arranged at the second intervals P2. Consequently, as a light flowing speed becomes slow on a periphery of the display portion most worthy of notice in the game area S on which the player and the spectators focus, it is possible to heighten a degree of focusing on the display portion 4 in the game area S. Herein, as long as the intervals P2 are set wider than the intervals P1, it is not necessary that the intervals P1 of the main side lamps 22*a* are identical to the intervals P1 of the sub-side lamps 22*b*, and it is not necessary either that the intervals P2 of the under lamps 25 are identical to the intervals P2 of the speaker lamps 24.

Front Doors

Figure 8:
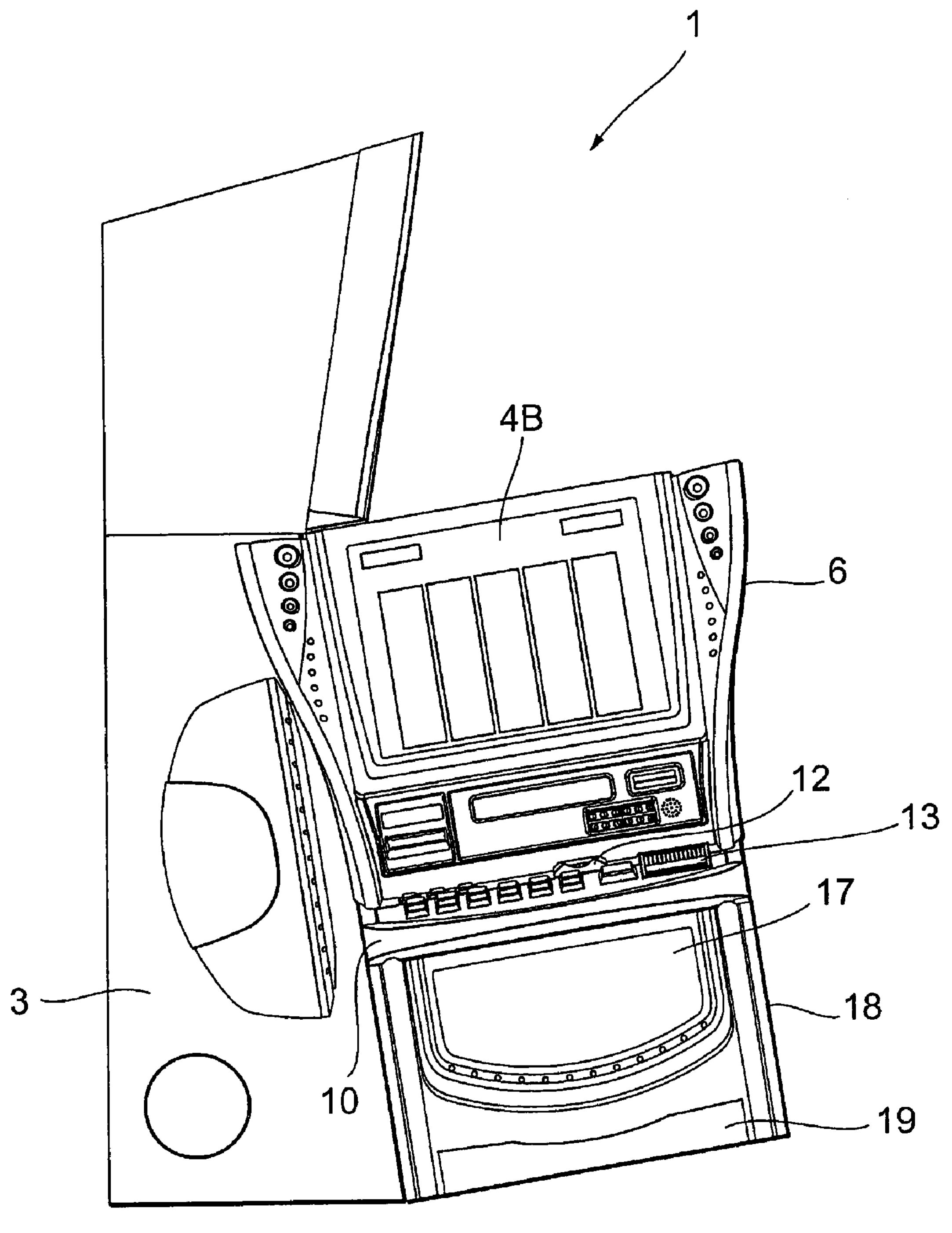
FIG. 8 is a side view showing a condition in which an upper front door (a first opening and closing door) is opened.
Figure 9:
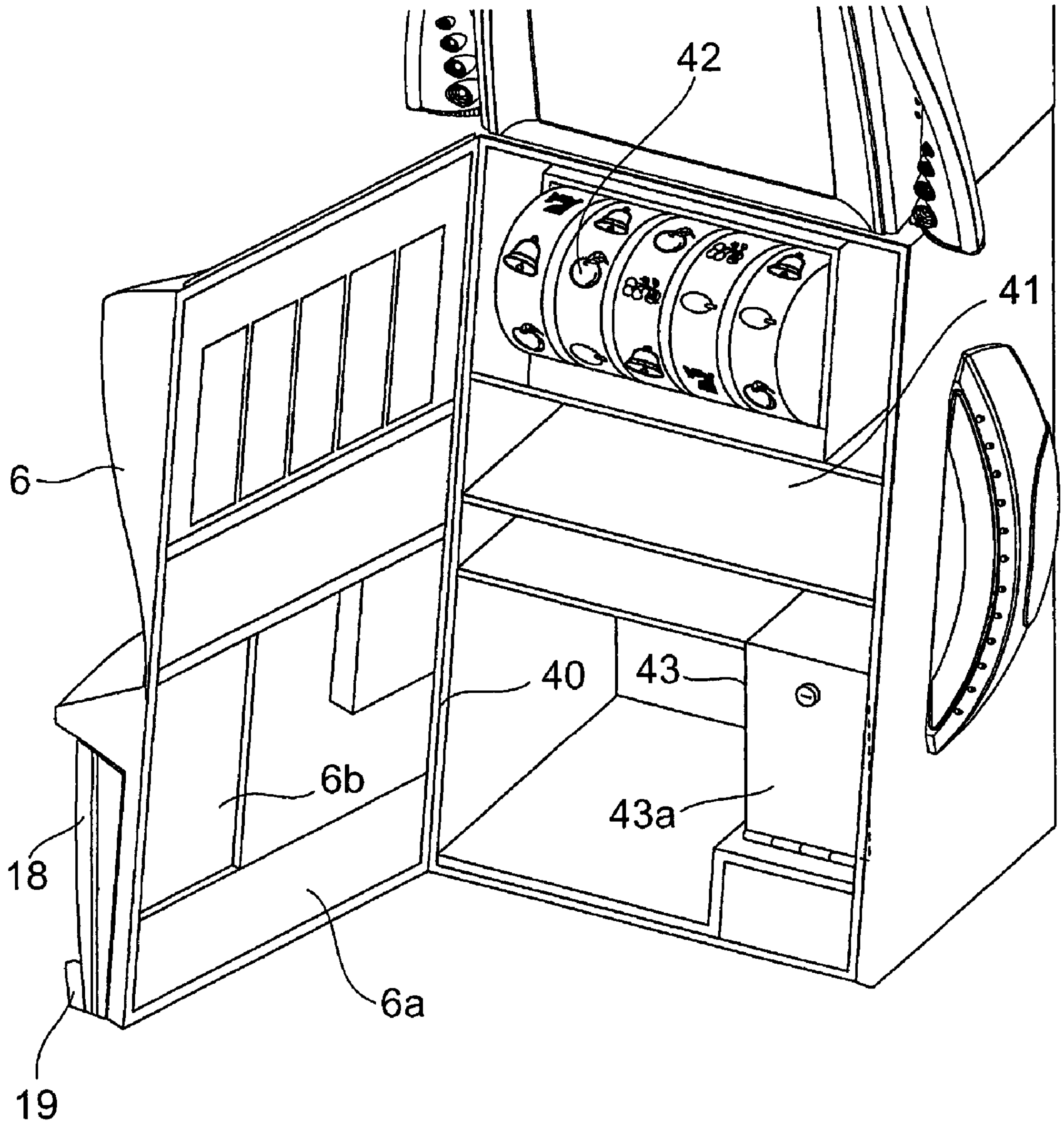
FIG. 9 is a perspective view showing a condition in which the upper front door is opened.

As shown in FIGS. 8 and 9, the gaming machine 1 includes the upper front door (a first opening and closing door) 6 provided with the variable display portion 4B and the operation table 10, and the lower front door (a second opening and closing door) 18 provided with the waist panel 17 and the coin tray 19. The upper front door 6 and the lower front door 18 open laterally, which provides an opening and closing operability, and the upper front door 6, as well as being provided on the front surface of the cabinet 3, is supported on a left side of the cabinet 3 via a hinge 40. As the upper front door 6 is connected by the hinge 40 to a left end of the cabinet 3, of which the front surface is inclined in such a way as to tilt rearward, the upper front door 6, when opened 90 degrees or more, can be opened in such a way that a right side is lifted up.

When the upper front door 6 is opened, the lower front door 18 also pivots along with the upper front door 6, and a large opening 41 appears in the front surface of the cabinet 3. By opening the upper front door 6, it is possible to carry out a maintenance of the mechanical reels 42 and a wiring inside the cabinet 3, and it is possible to expose a collection box 43 installed inside the cabinet 3. The collection box 43 is used for collecting bills inserted from the bill accepter 13. Also, the opening 41 also being furnished with a coin hopper (not shown) in which coins inserted from the coin slot are accumulated, the coins pass through a chute 47 as necessary and, after passing through a coin tray chute 19*a* disposed on a right side as seen from a rear surface 18*a* of the lower front door 18, are paid out into the coin tray 19.

Furthermore, the variable display portion 4B including the liquid crystal panel is fixed to an upper portion of the upper front door 6, and a partition plate 6*a* is provided in a lower portion of the upper front door 6. A rectangular window 6*b*, through which an operator is allowed to access a cover 43*a* of the collection box 43, is provided on a right side of the partition plate 6*a*. The operator can see the collection box 43 from outside via the window 6*b*.

Figure 10:
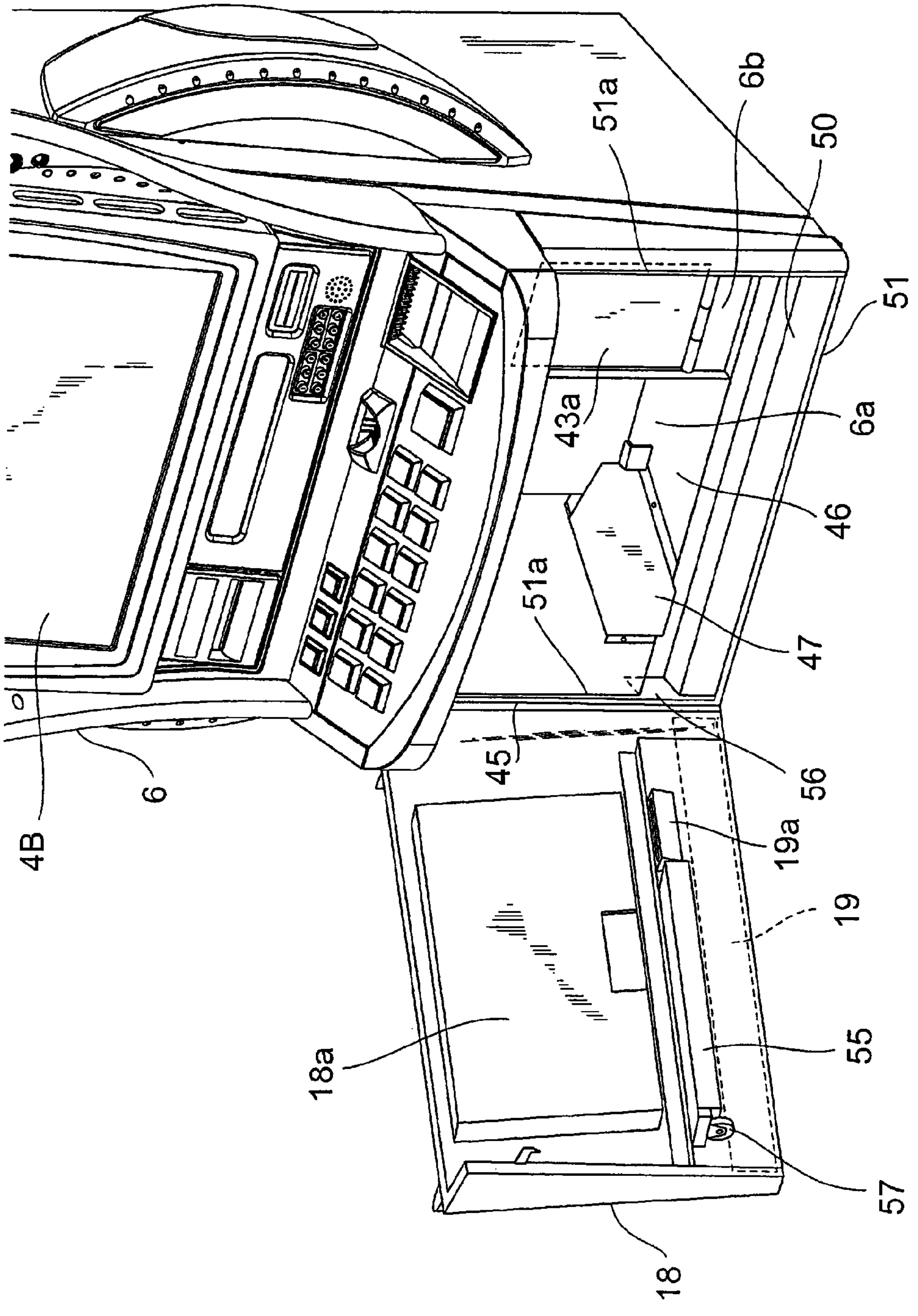
FIG. 10 is a perspective view showing a condition in which a lower front door (a second opening and closing door) is opened.

As shown in FIG. 10, the lower front door (the second opening and closing door) 18 for opening and closing a part of the upper front door 6 is provided in a front lower portion of the upper front door 6. A left end of the lower front door 18 is supported on a front of a left end of the upper front door (the first opening and closing door) 6 via a hinge 45. By opening the lower front door 18, a rectangular opening 46 appears and, the partition plate 6*a* of the upper front door 6 being disposed to a rear of the opening 46, the coin passing chute 47 for paying out the coins into the coin tray 19 is fixed to the partition plate 6*a*. Furthermore, the operator can unlock the cover 43$a$ of the collection box 43 through the rectangular window 6$b$ provided in the partition plate 6$a$. After the unlocking, by pulling the cover 43$a$ down and forward, the operator can collect the bills in the collection box 43 via the window 6$b$.

In this way, the coin tray 19 is fixed to a front lower end of the lower front door 18, which is mainly used for the bill collection or the like. The coin tray 19 extending over an approximately whole width of the lower front door 18, the coins paid out from the heretofore described coin hopper (not shown) disposed to the rear of the opening 41 pass through the chute 47 and, after passing through the coin tray chute 19$a$ disposed on the right side as seen from the rear surface 18$a$ of the lower front door 18, are accumulated in the coin tray 19. In a case in which the coins are accumulated beyond an upper end of the coin tray 19, in the event that a maintenance of the gaming machine 1 or an operation of taking the bills out of the collection box 43 inside the gaming machine 1 is necessary, as shown in FIG. 8, even though the upper front door 6 or the lower front door 18 is opened, as the coin tray 19 is installed on the lower front door (the second opening and closing door) 18, it is possible to smoothly open the upper front door 6 or the lower front door 18. Also, even in a condition in which the upper front door 6 or the lower front door 18 is opened, as the coin tray 19 is no longer in contact with the operator, the coin tray 19 not being an impediment to the operation in the cabinet 3, an operation effectiveness is improved. The coin tray 19 is one in which are accumulated not only the coins but also game media, such as medals, tokens, tickets or the like, paid out from the cabinet 3, or in which are placed belongings (for example, cigarettes, a handbag or the like) which belong to the player.

Figure 11:
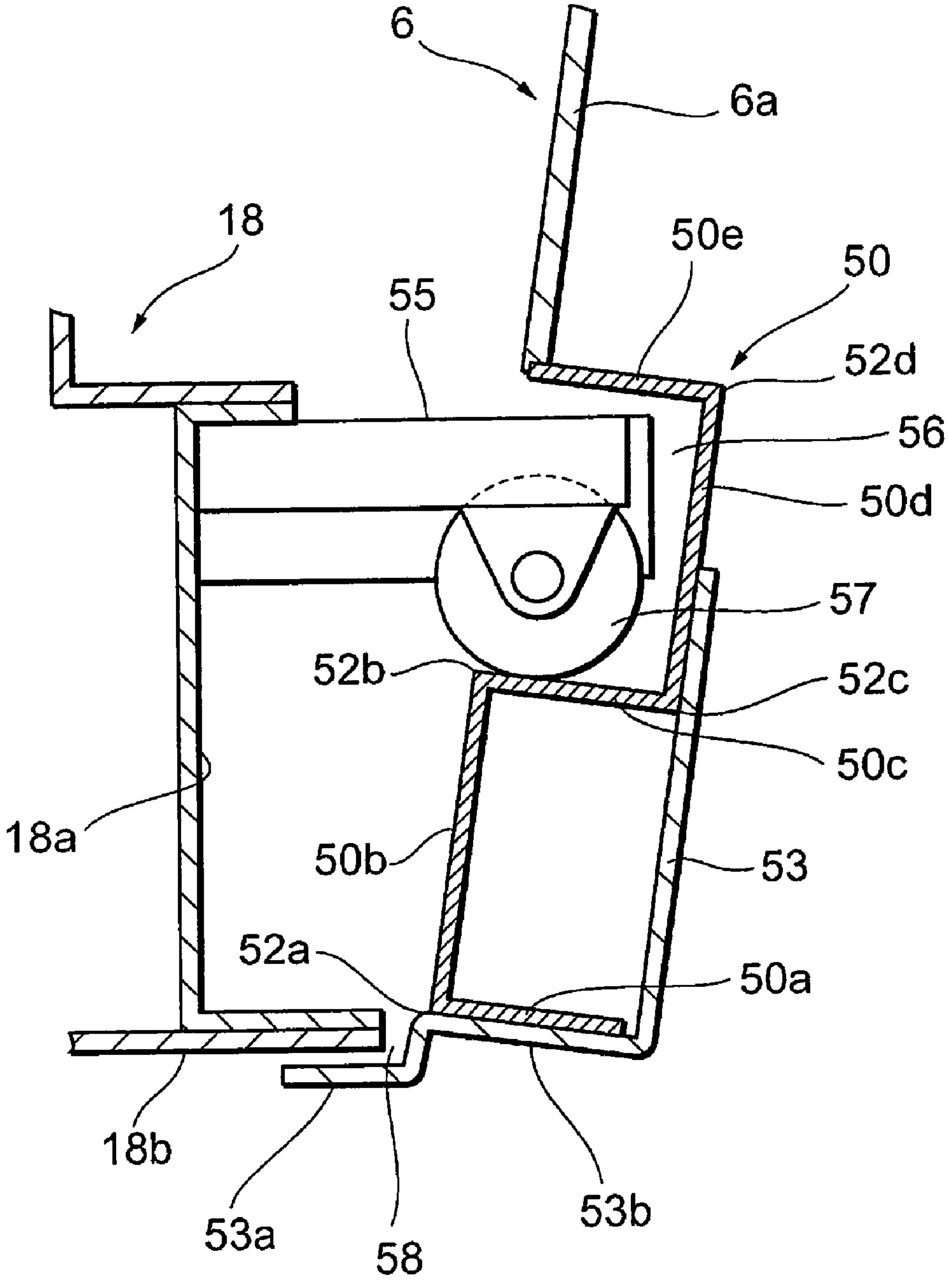
FIG. 11 is an enlarged sectional view of a main portion of a boundary portion between the upper front door and the lower front door.

As shown in FIGS. 10 and 11, a reinforcing member 50 created by a bending formation is provided at a lower end of the partition plate 6$a$ fixed to the upper front door 6. The reinforcing member 50 is connected in such a way as to span both side portions 51$a$ of a frame 51 formed on a peripheral edge of the rectangular opening 46 which appears when the lower front door 18 is opened. An upper end of the reinforcing member 50 is fixed by welding to the lower end of the partition plate 6$a$ of which a peripheral edge is fixed to the frame 51. Also, by the reinforcing member 50 being provided, as it is possible to stabilize the frame 51 of the upper front door 6, it is possible to reduce a distortion of the frame 51.

As the reinforcing member 50 is formed bending along bending lines 52$a$ to 52$d$ extending in a spanning direction, it is possible to achieve a rigidity of the reinforcing member 50 with a simple configuration. Specifically, the reinforcing member 50, as well as being bent into an S-shape along the first to fourth bending lines 52$a$ to 52$d$, is configured of a first plate piece 50$a$ extending in an approximately horizontal direction, a second plate piece sob bent in such a way as to stand approximately upright at a front end of the first plate piece 50$a$, a third plate piece 50$c$ bent inward from an upper end of the second plate piece 50$b$ and extending in the approximately horizontal direction, a fourth plate piece 50$d$ bent approximately upright at a rear end of the third plate piece 50$c$, and a fifth plate piece 50$e$ bent outward from an upper end of the fourth plate piece 50$d$ and extending in the approximately horizontal direction. The first plate piece 50$a$ positioned on a lower end side is fixed by welding to a back plate 53 of which both ends are fixed to the frame 51, and a leading end of the fifth plate piece 50$e$ positioned on an upper end side is fixed by welding to the lower end of the partition plate 6$a$. The bending formation extending in the spanning direction is not limited to the heretofore described one. It is sufficient that the reinforcing member 50 is formed bending at least once.

Furthermore, on the rear surface 18$a$ of the lower front door (the second opening and closing door) 18, a counter 55, protruding toward the opening 46 and extending in the horizontal direction, for counting the coins inserted from the coin slot 12, is provided above a roller 57. Then, a front end of the counter 55, when the lower front door 18 is in a closed condition, enters an inside of a recessed portion 56 formed in a squared U-shape cross-section by the third plate piece 50$c$, the fourth plate piece 50$d$ and the fifth plate piece 50$e$. By this part, even in the event that a wire is inserted from a bottom gap 58 between the upper front door 6 and the lower front door 18, as it is stopped by the counter 55, it being possible to stop an intrusion of the wire, it is possible to prevent a dishonest behavior of opening the doors with malicious intent and so on. Furthermore, as the roller 57 to be described hereafter is supported by the counter 55, when the lower front door 18 is in the closed condition, it is possible to increase a strength with respect also to a weight of the coin tray 19 and the lower front door 18.

Also, the fifth plate piece (an interruption portion) 50$e$ bent toward the lower front door (the second opening and closing door) 18 from the fourth plate piece 50$d$ is provided at the upper end of the reinforcing member 50. By part of the interruption portion (the fifth plate piece) 50$e$, even in the event that the wire or the like is inserted from the gap 58, as the further intrusion of the wire is stopped, it is possible to prevent the dishonest behavior of opening the doors with malicious intent and so on.

Also, the second plate piece (an occlusion portion) 50$b$ extending in the spanning direction, being provided in a lower portion of the reinforcing member 50, is disposed in such a way as to make contact with the back plate 53. By part of the occlusion portion (the second plate piece) 50$b$, even in the event that the wire or the like is inserted from the gap 58, as the further intrusion of the wire is stopped, it is possible to prevent the dishonest behavior of opening the doors with malicious intent and so on. Furthermore, as the first plate piece 50$a$ is bonded to a lower portion 53$b$ of the back plate 53, it being possible to stop the intrusion of the wire, it is possible to further strengthen a countermeasure to the dishonest behavior.

Also, a tongue piece 53$a$ extending in such a way as to overlap a bottom surface 18$b$ of the lower front door 18 is provided at a lower end of the back plate 53. By part of the tongue piece 53$a$, even in the event that the wire or the like is inserted from the gap 58, as the further intrusion of the wire is stopped, it is possible to prevent the dishonest behavior of opening the doors with malicious intent and so on.

Furthermore, on rear side of the lower front door (the second opening and closing door) 18, the roller 57 acting as a protrusion is attached to the counter 55, in such a way as to be mounted on the reinforcing member 50 provided in the frame 51. Also, the roller 57 is positioned on an upper end side on a rear side of the coin tray 19 provided in a lower portion of the lower front door 18. Therefore, when the lower front door 18 is in the closed position, the roller 57 is supported on the third plate piece 50$c$ of the reinforcing member 50. Consequently, it is possible to disperse the weight of the coin tray 19 and the lower front door 18, and a load in a case in which the coins or the like are contained in the coin tray 19. Furthermore, by adopting the rotatable roller 57, as wear is reduced, it is possible to smoothly carry out the opening and closing operation of the lower front door 18.

Figure 12:
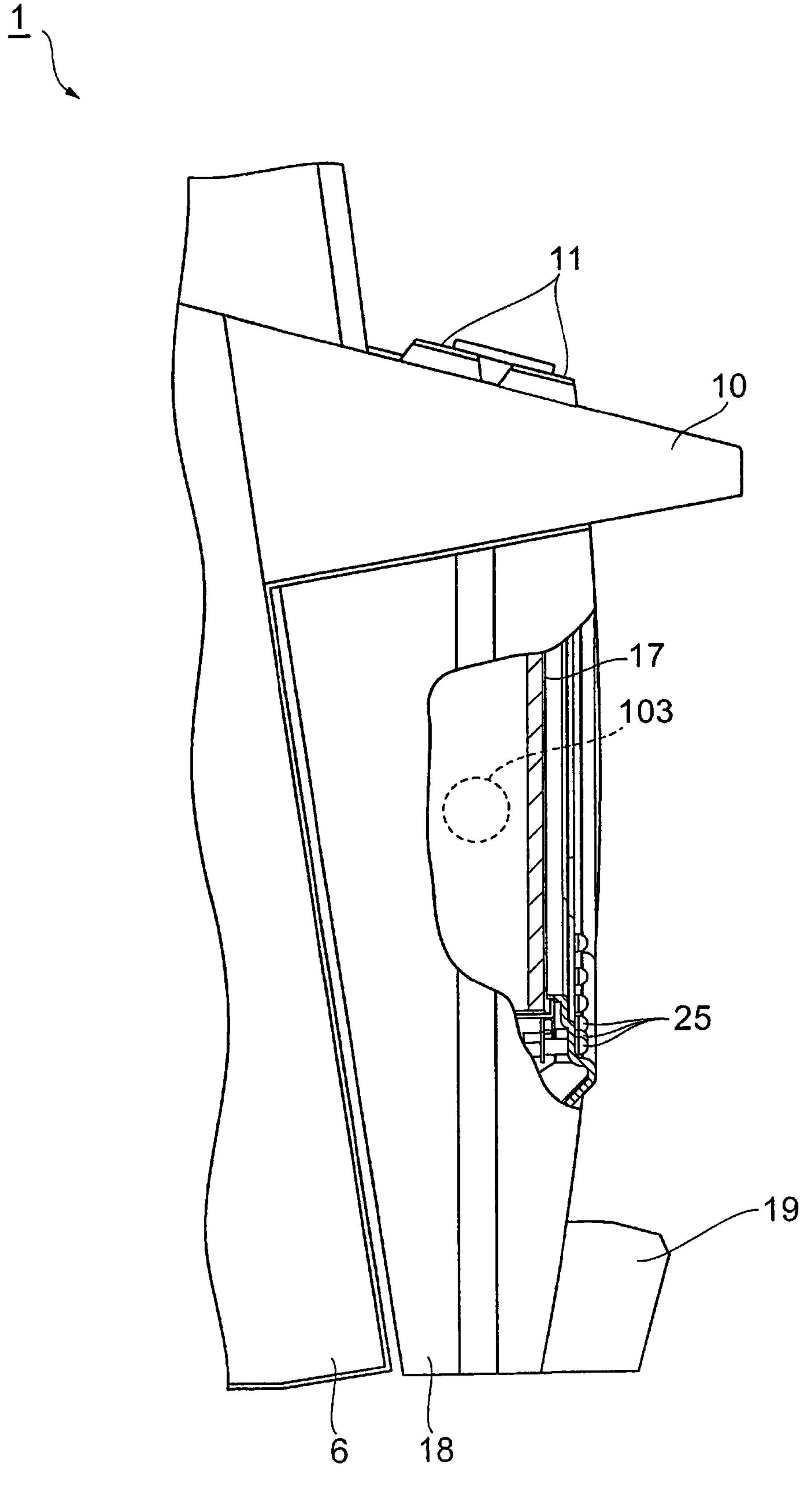
FIG. 12 is an enlarged fragmentary sectional view of a main portion of the lower front door.

Furthermore, as shown in FIG. 12, the upper front door 6 is disposed inclined rearward, the waist panel (an effect portion) 17 is provided on a front surface of the lower front door 18, and an upper portion of the lower front door 18 protrudes forward of the upper front door 6. As the upper front door 6 is disposed inclined rearward, even when the upper front door 6 is opened, by part of the weight of the upper front door 6, it is possible to prevent a situation in which the upper front door 6 is abruptly opened fully. Furthermore, as the upper portion of the lower front door 18 protrudes forward of the upper front door 6, by positioning the lower front door 18 perpendicular to a cabinet bottom surface, as it is possible to make the waist panel 17, on which effect details are displayed, approximately perpendicular to the horizontal direction, it being possible to make the effect details on the waist panel 17 easily viewable even to a remote spectator, it is possible to secure a housing space on a rear surface of the lower front door 18.

Also, the waist panel 17 on which the effect details are displayed is lit by a light emitting device (for example, the cold cathode tube, a fluorescent lamp, an LED lamp or the like) 103 disposed on the rear surface of the lower front door 18. The housing space provided on the rear surface of the lower front door 18, formed by protruding the upper portion of the lower front door 18 forward of the lower portion thereof, can be used as a radiation space of the cold cathode tube 103. It is also acceptable that the waist panel 17 on which the effect details are displayed is a liquid crystal panel or the like.

Operation Table, Waist Panel and Under Lamps

Figure 13:
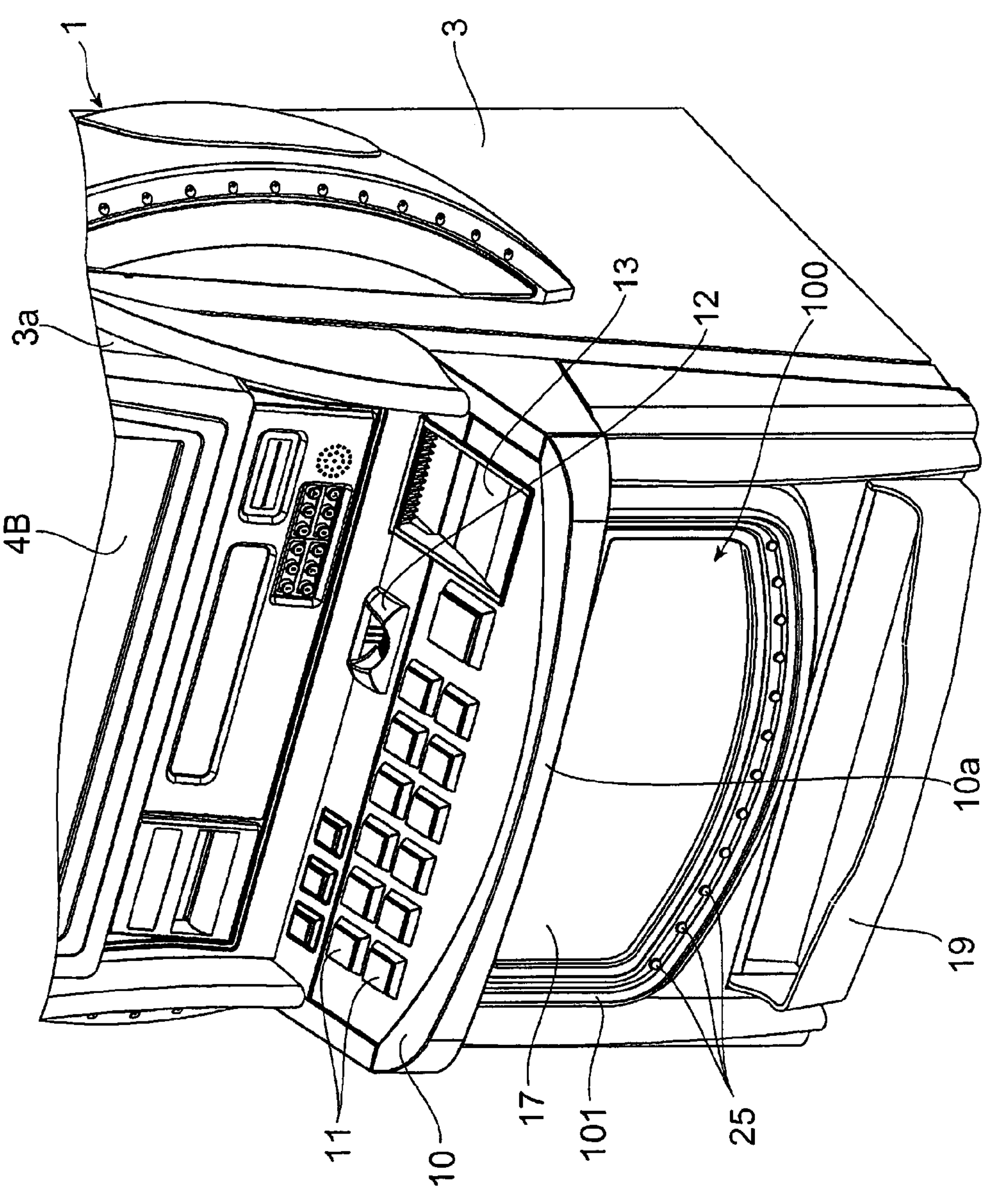
FIG. 13 is a perspective view showing in enlarged dimension a lower portion of the gaming machine.
Figure 14:
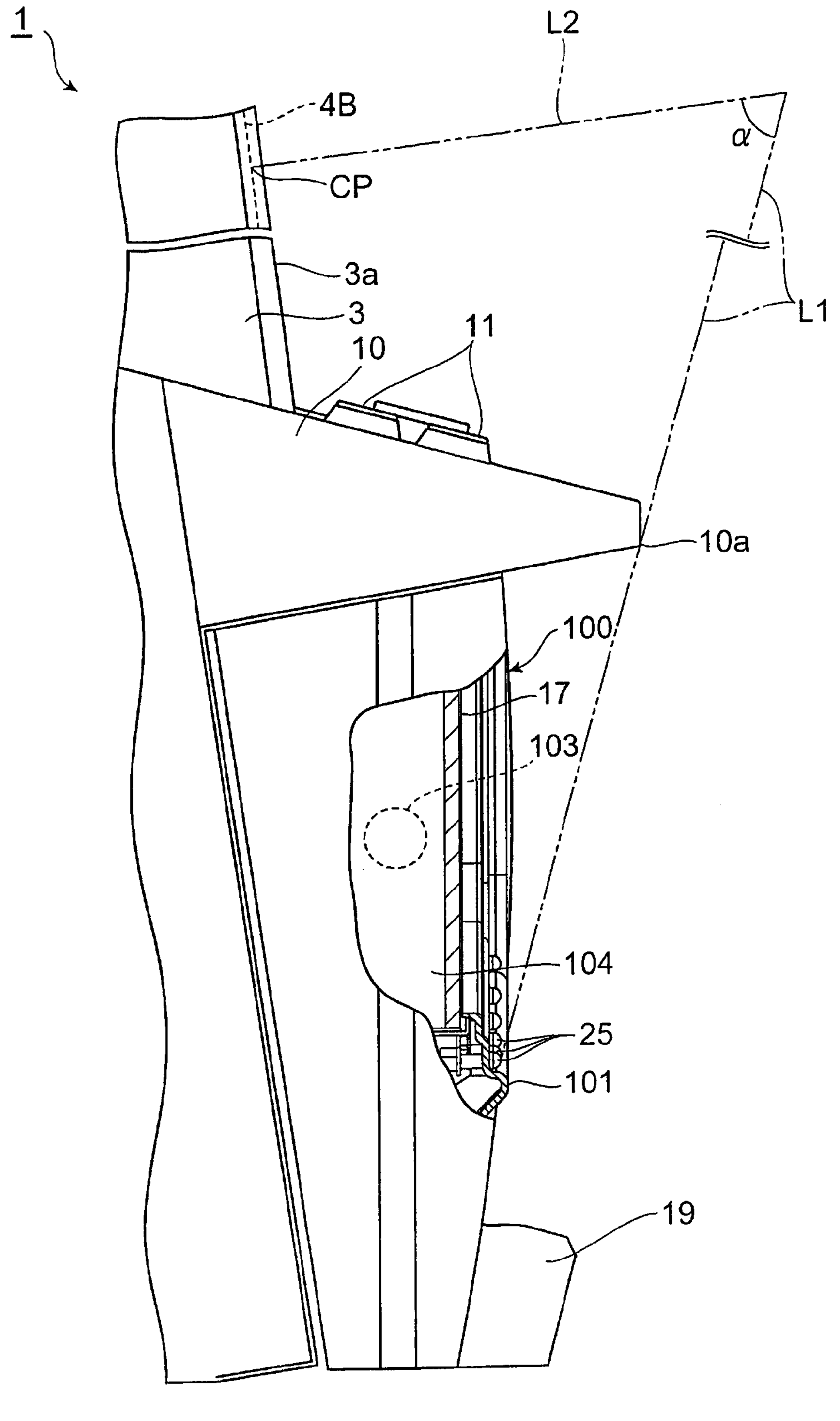
FIG. 14 is a side view, partially broken away, of a front side of a lower portion of a cabinet.

As shown in FIGS. 13 and 14, the operation table (a protruding portion) 10, being disposed on a front surface 3*a* of the cabinet 3, protrudes forward. An upper surface of the operation table 10, being inclined in such a way that a player P (refer to FIG. 15) side is lower than a cabinet 3 side, is designed in such a way that it is easy for the player P to put a hand on it and lean. Furthermore, on the operation table 10, the various operation buttons 11 are arranged as the operation portion instructing an execution of the game, and furthermore, the coin slot 12 and the bill accepter 13 are provided.

A lower display portion 100 is provided below the operation table 10 of the cabinet 3. The lower display portion 100, being in a position posterior to an anterior extremity 10*a* of the operation table 10, is configured of the waist panel 17, a frame 101 surrounding the waist panel 17 along an outer edge of the waist panel 17, a plurality of the under lamps (the light emitting portions) 25 fixed to the frame 101 along the lower edge of the waist panel 17, and the fluorescent lamp 103 radiating light toward the waist panel 17 from a rear side of the waist panel 17.

The waist panel 17 is formed of a film, on which an image such as a logo showing an appellation of the gaming machine 1, a character or the like is displayed, and a transparent acrylic plate being superimposed. The waist panel 17, being disposed at a lower front of the cabinet 3, is positioned between a fluorescent lamp box 104 provided inside the cabinet 3 and the frame 101. A pair of right and left fluorescent lamp sockets being fixed to the fluorescent lamp box 104, pins of the fluorescent lamp 103 are inserted in the fluorescent lamp sockets. Light radiated from the fluorescent lamp 103 is transmitted through the waist panel 17, highlighting an image such as the logo, the character or the like. As a result, it becoming easy for the image displayed on the waist panel 17 to become visible to a spectator A watching a slot game from diagonally behind the player P, the gaming machine 1 is distinguished from another machine, improving the degree of advertising.

An outer side of the frame 101 is slightly more protuberant than an inner side thereof close to the waist panel 17. The lower edge of the waist panel 17 curves gently, and a lower portion of the frame 101 also curves following a shape of the waist panel 17. In the lower portion, as well as on the inner side of the frame 101, the under lamps 25 are disposed along the lower edge of the waist panel 17. The under lamps 25, being full color LED's in which unitary LED elements capable of emitting light of three primary colors (red, blue and green) are combined, are fixed onto an LED substrate mounted with an LED drive circuit. Also, the coin tray 19 in which are accumulated the coins (the game media) paid out based on a result of the slot game is provided below the under lamps 25. The under lamps 25, as well as lighting the waist panel 17 from below, light the coin tray 19 from above.

Figure 15:
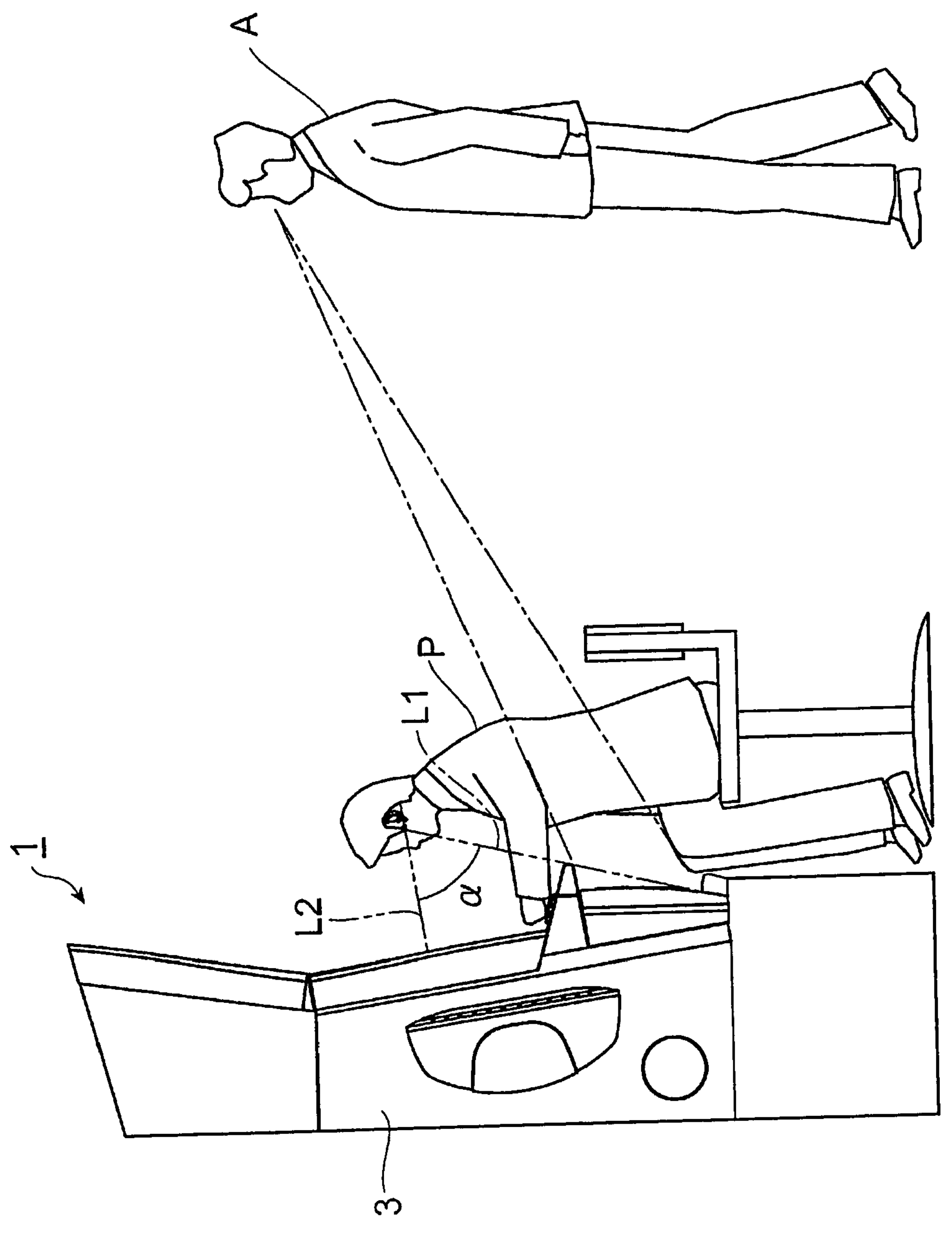
FIG. 15 is a side view showing a condition in which the player is operating the gaming machine, and a spectator is watching a slot game.

The under lamps 25 and the operation table 10 are disposed in such a way that an extension L1 of a straight line connecting the under lamps 25 and the anterior extremity 10*a* of the operation table 10 forms an acute angle $\alpha$ with respect to a perpendicular line L2 from the variable display portion 4B passing through a center CP of the variable display portion 4B, as seen from a side of the cabinet 3. As the player P plays the slot game focusing most closely on the middle variable display portion 4B, which displays an execution condition of the slot game, a disposition of the variable display portion 4B is determined in consideration of a sight line of the player P. As shown in FIG. 15, by disposing the under lamps 25 and the operation table 10 in the heretofore described way based on the disposition of the variable display portion 4B, some of the light emitted from the under lamps 25 toward the player P, being intercepted by the operation table 10, becomes unlikely to reach the player P's eyes.

According to the gaming machine 1, by causing the under lamps 25 to flash, or emitting light of various colors, it is possible to advertise the gaming machine 1 to the spectator A diagonally behind the player P. Furthermore, even though the light is emitted from the under lamps 25 so as to advertise to the spectator A, as some of the light is intercepted by the operation table 10, it is unlikely to reach the player P's eyes. As a result, it being possible to balance the advertising to the spectator A by the light from the under lamps 25 with a reduction in the fatigue of the player P's eyes, it is possible to, while attracting the spectator A, allow the player P to concentrate on the game without imposing an excessive strain on him or her. Furthermore, as the player P can carry out an operation of the slot game while putting a hand on the operation table 10, even in the event that he or she plays the slot game in the same position for a long time, it is possible to reduce a physical fatigue of the player P during the slot game.

Furthermore, the under lamps 25 are disposed along the lower edge of the waist panel 17 in such a way as to light up the waist panel 17 (refer to FIGS. 13 and 14). As a result, the waist panel 17, as it is lit by the light emitted from the under lamps 25, becomes easily spotted by the spectator A. As a result, the degree of advertising to the spectator A by part of the waist panel 17 is improved.

Furthermore, in the event that the disposition of the variable display portion 4B displaying the game details is determined, it is possible to easily determine a disposition relationship between the under lamps 25 and the operation table 10, and a dimension of the operation table 10 protruding forward from the cabinet 3. As a result, it is also possible to easily apply them to other various models of gaming machines.

Furthermore, as the under lamps 25 are disposed above the coin tray 19, it is possible to increase a quantity of light around the coin tray 19.

Indirect Illumination

Figure 16:
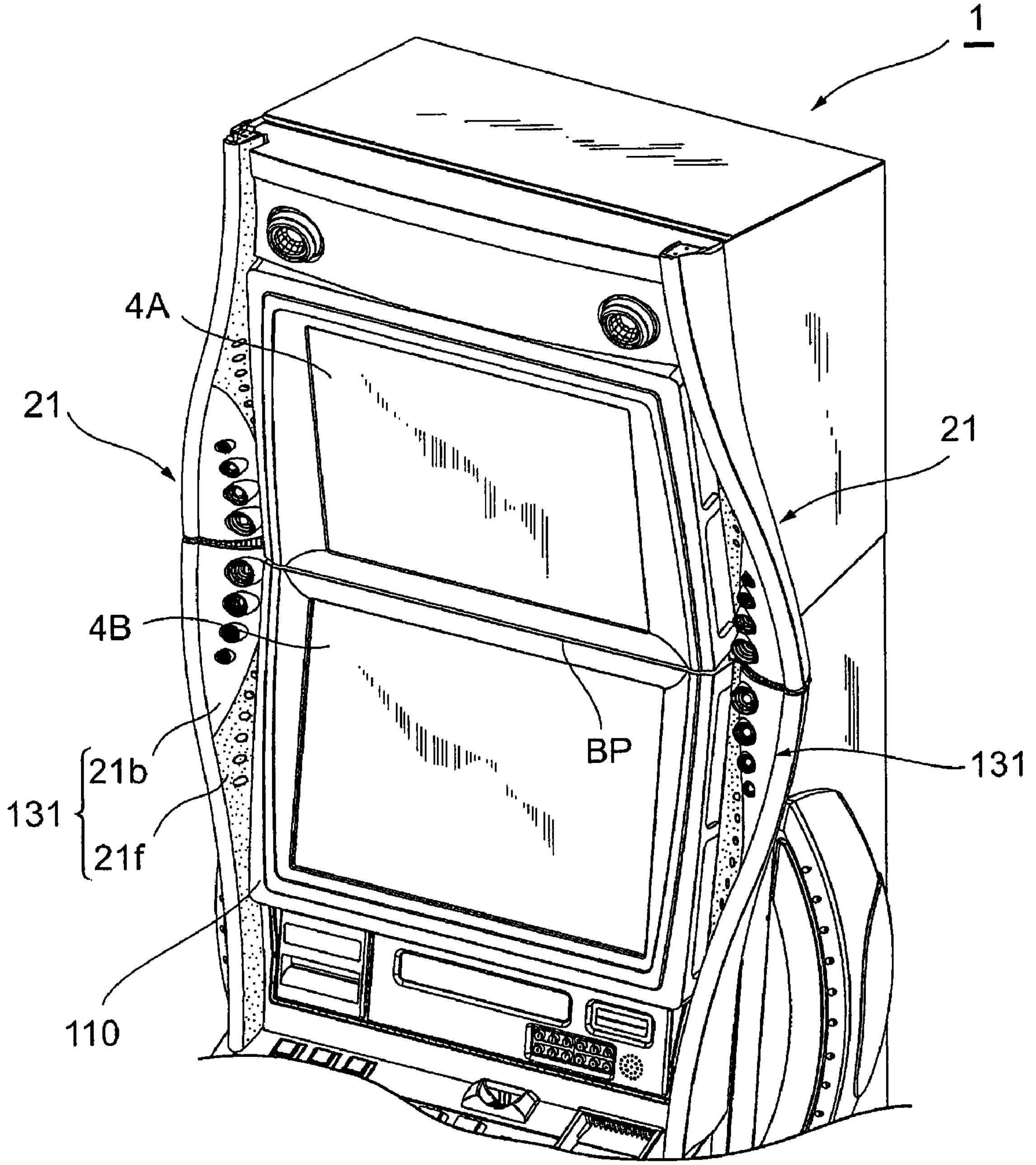
FIG. 16 is a perspective view of the gaming machine according to the embodiment.
Figure 17:
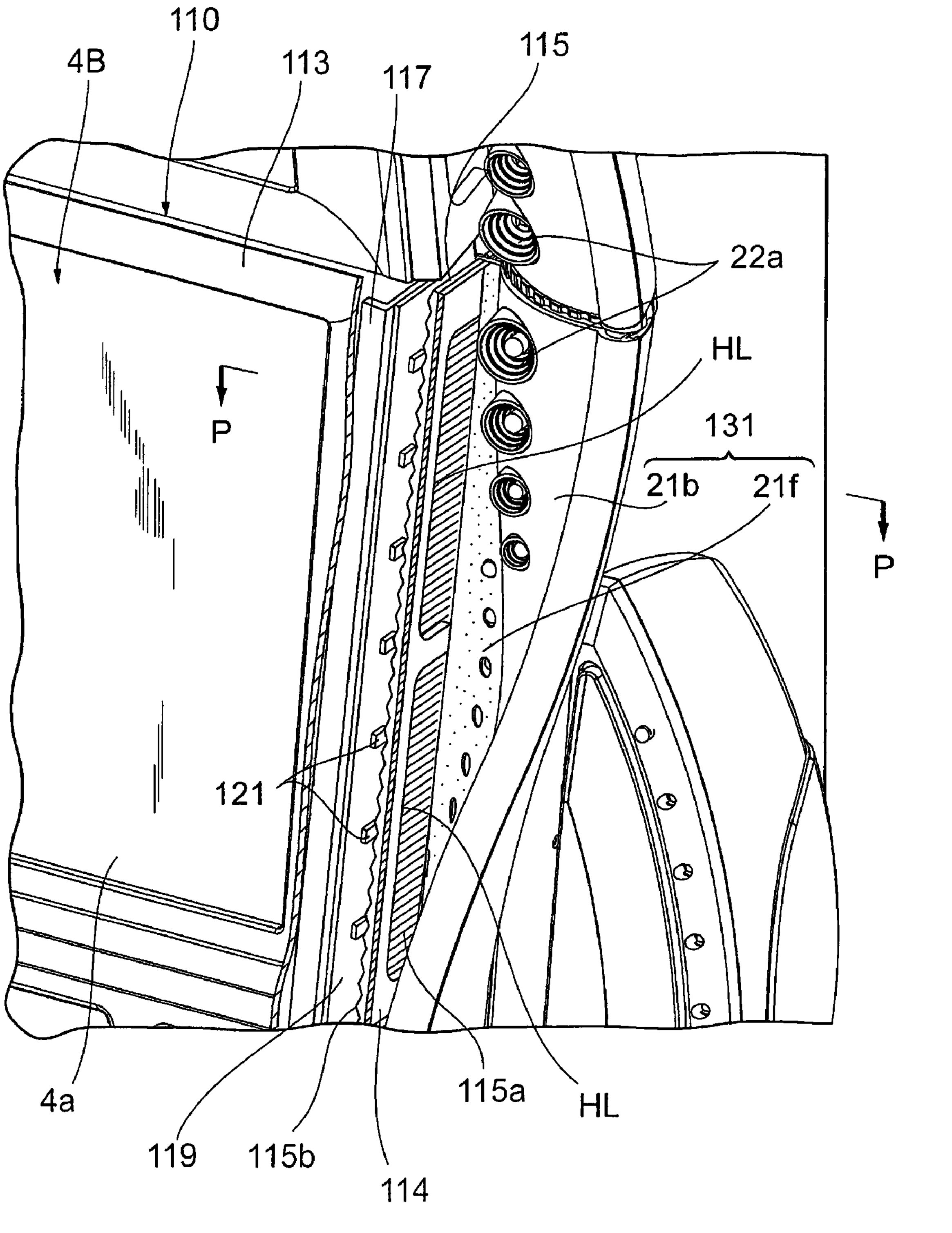
FIG. 17 is a perspective view showing in enlarged dimension a right side of a variable display portion.
Figure 18:
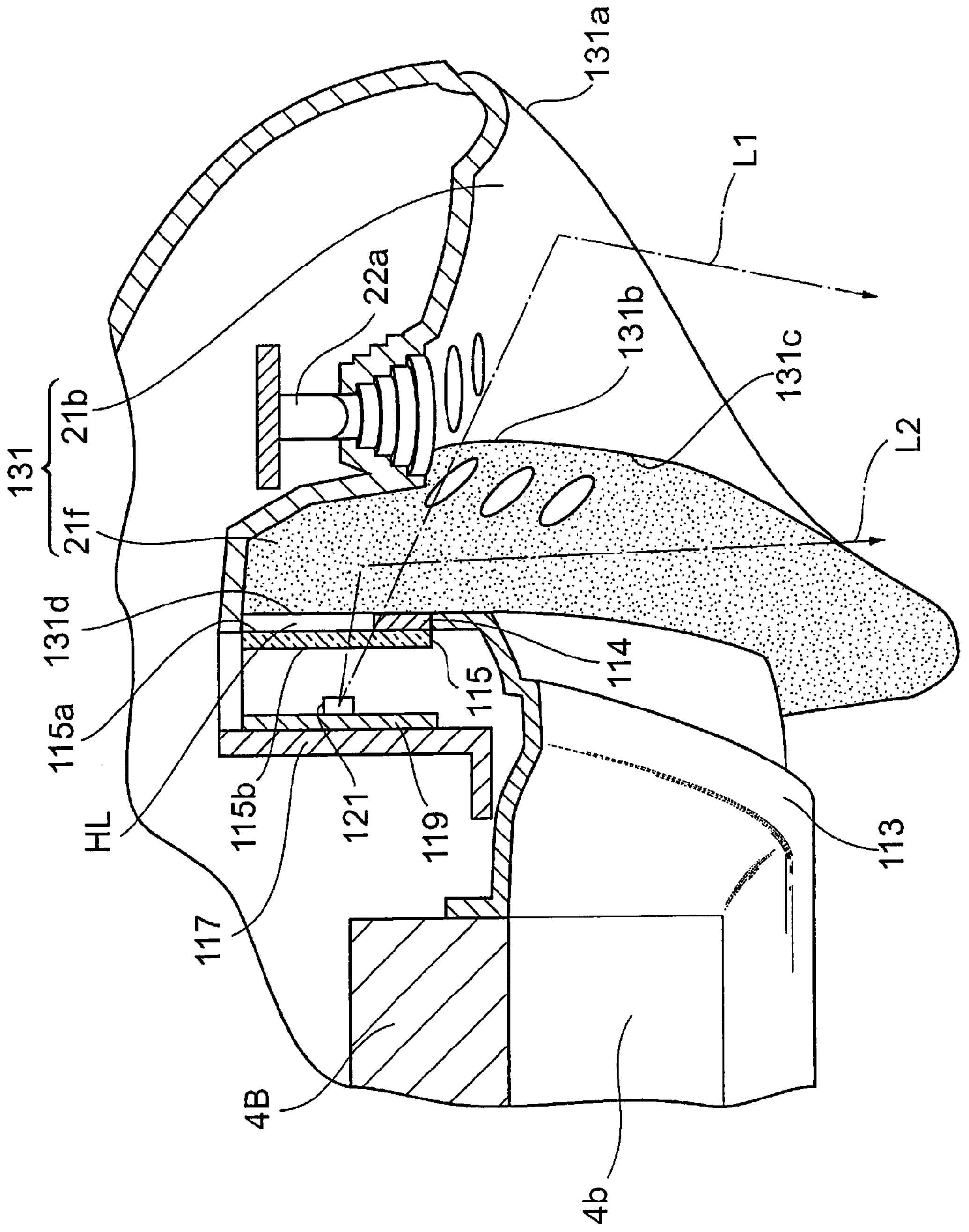
FIG. 18 is a sectional view along P-P line of FIG. 17.

As shown in FIGS. 16 to 18, the middle variable display portion 4B is the liquid crystal panel, and a rectangular peripheral frame 110 is fixed to a peripheral edge of the variable display portion 4B. The peripheral frame 110 is configured of a front light interception plate 113, made of a resin, which is looped along a front surface FP2 of the variable display portion 4B, side light interception plates 114, extending in the up and down direction along side edges of the front light interception plate 113, which are fixed to right and left side portions of the front light interception plate 113, and an acrylic transparent plate 115 adhering to a rear of each side light interception plate 114. Two side light interception plates 114, being perpendicular to the front light interception plate 113, are each formed with notch holes HL, notched on a rear, arranged in the up and down direction. The transparent plate 115 has a flat outer surface 115*a* in contact with the side light interception plate 114 and a corrugated inner surface 115*b*.

A bracket 117 extending in the up and down direction is provided on a rear side of the front light interception plate 113, and an LED substrate 119 extending in the up and down direction in such a way as to face each transparent plate 115 is fixed to the bracket 117. The LED substrate 119, as well as being mounted with an LED drive circuit, is mounted with a plurality of full color LED's 121 in a longitudinal direction. The full color LED's 121 are configured by combining unitary LED elements capable of emitting light of three primary colors (red, blue and green). Some of the light emitted from the full color LED's 121 is intercepted by the front light interception plate 113 and the side light interception plates 114, while the other light, after being refracted by the corrugated inner surfaces 115*b* of the transparent plates 115, is transmitted through the transparent plates 115, furthermore, passes through the notch holes HL, and is radiated toward sides of the peripheral frame 110.

Figure 19:
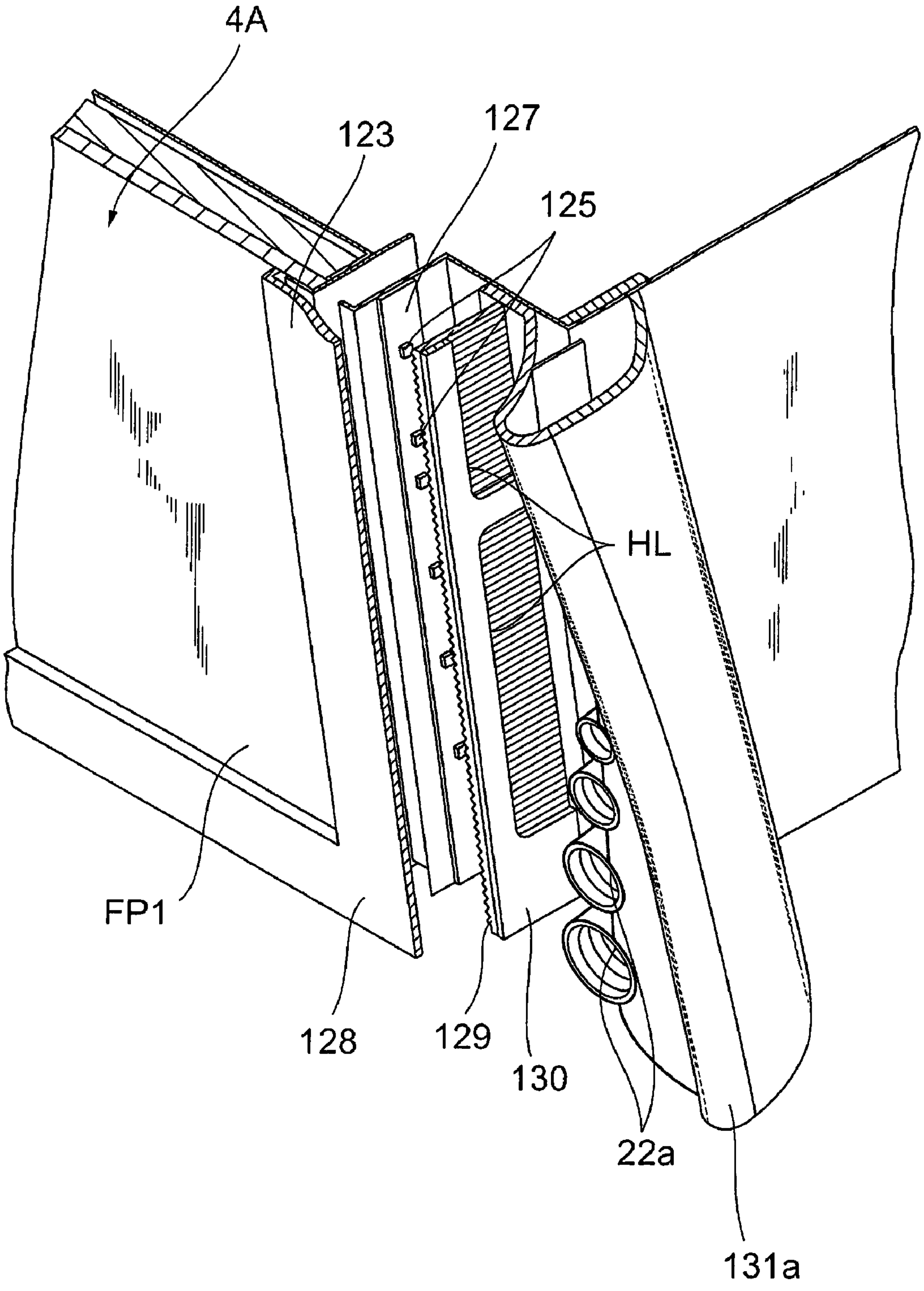
FIG. 19 is a perspective view showing in enlarged dimension a right side of an upper variable display portion.

As shown in FIG. 19, the upper variable display portion 4A is also the liquid crystal panel in the same way as the variable display portion 4B, and a rectangular peripheral frame 123 is also fixed to a peripheral edge of the variable display portion 4A. An LED substrate 127 mounted with a plurality of full color LED's (a light emitting portion) 125 is disposed inside the peripheral frame 123. In the same way as the peripheral frame 110 surrounding the peripheral edge of the variable display portion 4B, the peripheral frame 123 having a front light interception plate 128, side light interception plates 130 and transparent plates 129, some of light emitted from the full color LED's 125 is intercepted by the front light interception plate 128 and the side light interception plates 130, and the other light, after being transmitted through the transparent plate 129, passes through notch holes HL, and is radiated toward sides of the peripheral frame 123.

As shown in FIGS. 16 to 19, the inclined portions 21 protruding bow-like laterally across a whole of the variable display portion 4A and the variable display portion 4B are formed in the right and left end portions of the cabinet 3. The inclined portions 21 each being configured of the inclined surface 21*a* and the thick frame 21*c*, a reflecting surface 21*b* made of a member, on which a resin is chromeplated in such a way as to reflect the light, is formed on a part of the inclined surface 21*a* and the thick frame 21*c*. Furthermore, a diffusely reflecting surface 21*f*, of which a surface is satin finished to form a plurality of fine irregularities, is formed in the other area of the inclined surface 21*a*. A reflecting portion 131 is configured of the reflecting surface 21*b* and the diffusely reflecting surface 21*f*. Furthermore, the eight main side lamps 22*a*, being arranged in the up and down direction on the reflecting surface 21*b*, decrease in size gradually toward the top or the bottom from the center.

The diffusely reflecting surfaces 21*f* and the reflecting surfaces 21*b* are planarly symmetrical across a vertically overlapping boundary surface BP (refer to FIG. 16) of the variable display portion 4A and the variable display portion 4B. Each diffusely reflecting surface 21*f* is formed on an inner side close to the variable display portion 4A or the variable display portion 4B, while each reflecting surface 21*b* is formed in a position, on an outer side far from the variable display portion 4A or the variable display portion 4B, closer to the boundary surface BP in the up and down direction. Furthermore, the diffusely reflecting surface 21*f* increases in width as it goes away from a center of the inclined portion 21, while the reflecting surface 21*b* decreases in width as it goes away from the center of the inclined portion 21.

An outer end portion 131*a* (refer to FIGS. 18 and 19) of the reflecting surface 21*b* is positioned in such a way as to be approximately flush with the front surfaces 4*a* and 4*b* of the variable display portion 4A and the variable display portion 4B. An inner end portion 131*b* of the reflecting surface 21*b* is in a position, posterior to the front surfaces 4*a* and 4*b* of the variable display portion 4A and the variable display portion 4B, closer to the variable display portion 4A and the variable display portion 4B than the outer end portion 131*a*. In this way, the inner end portion 131*b* of the reflecting surface 21*b* being positioned rearward of the outer end portion 131*a*, the reflecting surface 21*b* is inclined toward the variable display portion 4A and the variable display portion 4B detached rearward from the front surfaces 4*a* and 4*b* of the variable display portion 4A and the variable display portion 4B.

An outer end portion 131*c* of the diffusely reflecting surface 21*f* is continuous with the inner end portion 131*b* of the reflecting surface 21*b*, and furthermore, the transparent plates 115 and 129 are fixed to an inner end portion 131*d* of the diffusely reflecting surface 21*f*. The diffusely reflecting surface 21*f* is inclined in such a way that the inner end portion 131*d* is in a position posterior to the outer end portion 131*c*, and is in a position closer to the variable display portion 4A and the variable display portion 4B.

In the gaming machine 1, a light effect is carried out by causing the full color LED's 121 and 125 inside the peripheral frames 110 and 123 to flash, or emit light of various colors. Some of the light emitted from the full color LED's 121 and 125, being intercepted by the front light interception plates 113 and 128 and side light interception plates 114 and 130 of the peripheral frames 110 and 123, is unlikely to reach the player's eyes. The other light, after being transmitted through the transparent plates 115 and 129, passes through the notch holes HL, and is reflected by the reflecting portions 131 of the inclined portions 21. Reflected beams of light L1 and L2 are visible to the spectator watching the slot game from diagonally behind the player, improving the advertising of the gaming machine 1.

In the gaming machine 1, as the full color LED's 121 and 125 are disposed on a farther inside the cabinet 3 than the front surfaces 4*a* and 4*b* of the upper variable display portion 4A and the middle variable display portion 4B, it is difficult for the full color LED's 121 and 125 to be visible to the player. Furthermore, the quantity of the light reflected off the reflecting surface 131, configured of the light-reflecting member, is more suppressed than that of the light radiated from the full color LED's 121 and 125, reducing the strain on the player's eyes. As a result, the effect due to the light from the full color LED's 121 and 125 becomes possible while reducing the strain on the player's eyes. Furthermore, as the full color LED's 121 and 125 are disposed on the inner side of the cabinet 3, it does not happen that the full color LED's 121 and 125 are damaged by the player touching them.

Furthermore, the diffusely reflecting surfaces 21*f* being formed in the reflecting portions 131 of the inclined portions 21, the quantity of the light L2 reflected off the diffusely reflecting surface 21*f* is more suppressed than that of the light L1 reflected off the reflecting surface 21*b*. For this reason, a glare which the player feels is reduced, making it easier to allow the player to concentrate on the game.

Furthermore, the reflecting portions 131 are disposed along the right and left peripheral edges of the variable display portion 4A and the variable display portion 4B. The player and the surrounding spectators are focusing most closely on the variable display portion 4A and the variable display portion 4B, on which are displayed the information relating to the game. The right and left side edges of the variable display portion 4A and the variable display portion 4B facing the places in which the reflecting portions 131 are disposed, the quantity of light in the vicinity of the side edges of the variable display portion 4A and the variable display portion 4B is increased by the lights L1 and L2 reflected off the reflecting portions 131. As a result, the variable display portion 4A and the variable display portion 4B being accentuated, it is possible to improve the degree of advertising of the gaming machine 1 to the spectators while suppressing the strain on the player's eyes.

Furthermore, the full color LED's 121 and 125, being disposed inside the peripheral frames 110 and 123 and in such a way as to face the reflecting portions 131, are contiguous with the variable display portion 4A and the variable display portion 4B. The variable display portion 4A, the variable display portion 4B and the full color LED's 121 and 125 receiving a power supply from a common power source, by the full color LED's 121 and 125 coming near to the variable display portion 4A and the variable display portion 4B, it becomes easy to bring the wiring together. Furthermore, by the full color LED's 121 and 125 being disposed inside the peripheral frames 110 and 123, the variable display portion 4A and the variable display portion 4B are also accentuated by light leaking from the peripheral frames 110 and 123, enabling the improvement in the degree of advertising of the gaming machine 1.

The reflecting surfaces 21*b* of the reflecting portions 131 are disposed on right and left sides of the variable display portion 4A and the variable display portion 4B. Furthermore, the reflecting portions 21*b* are inclined toward the variable display portion 4A and the variable display portion 4B as they go away from the front surfaces 4*a* and 4*b* of the variable display portion 4A and the variable display portion 4B toward a rear of the cabinet 3. As a result, it becomes easy for the light L1 reflected by the reflecting surfaces 21*b* to reach the eyes of the spectator positioned diagonally behind the player, improving the degree of advertising to the spectator while suppressing the strain on the player's eyes.

Gaming Machine Display Device

Figure 20:
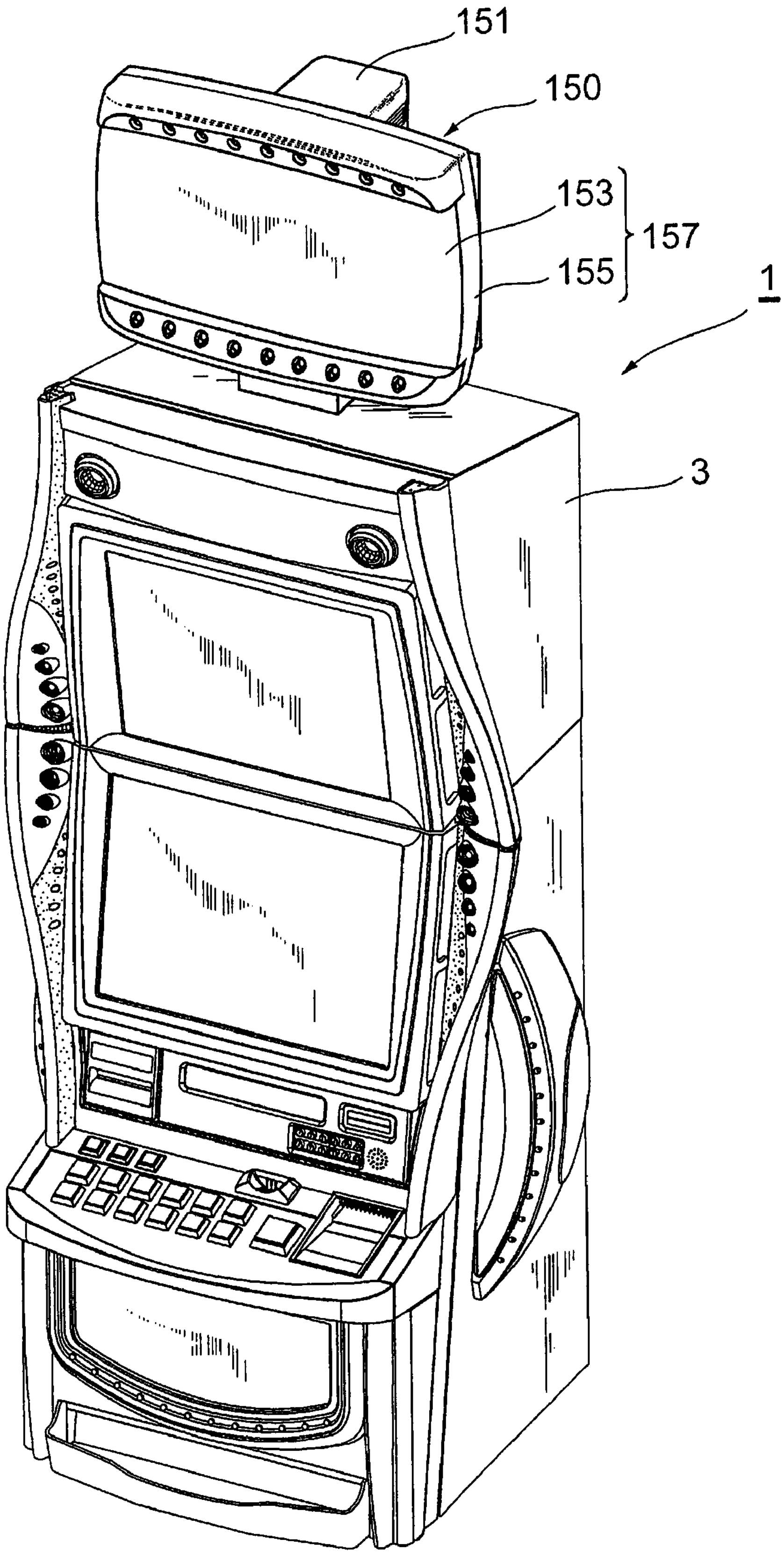
FIG. 20 is a perspective view of the gaming machine to which a gaming machine display device is attached.
Figure 21:
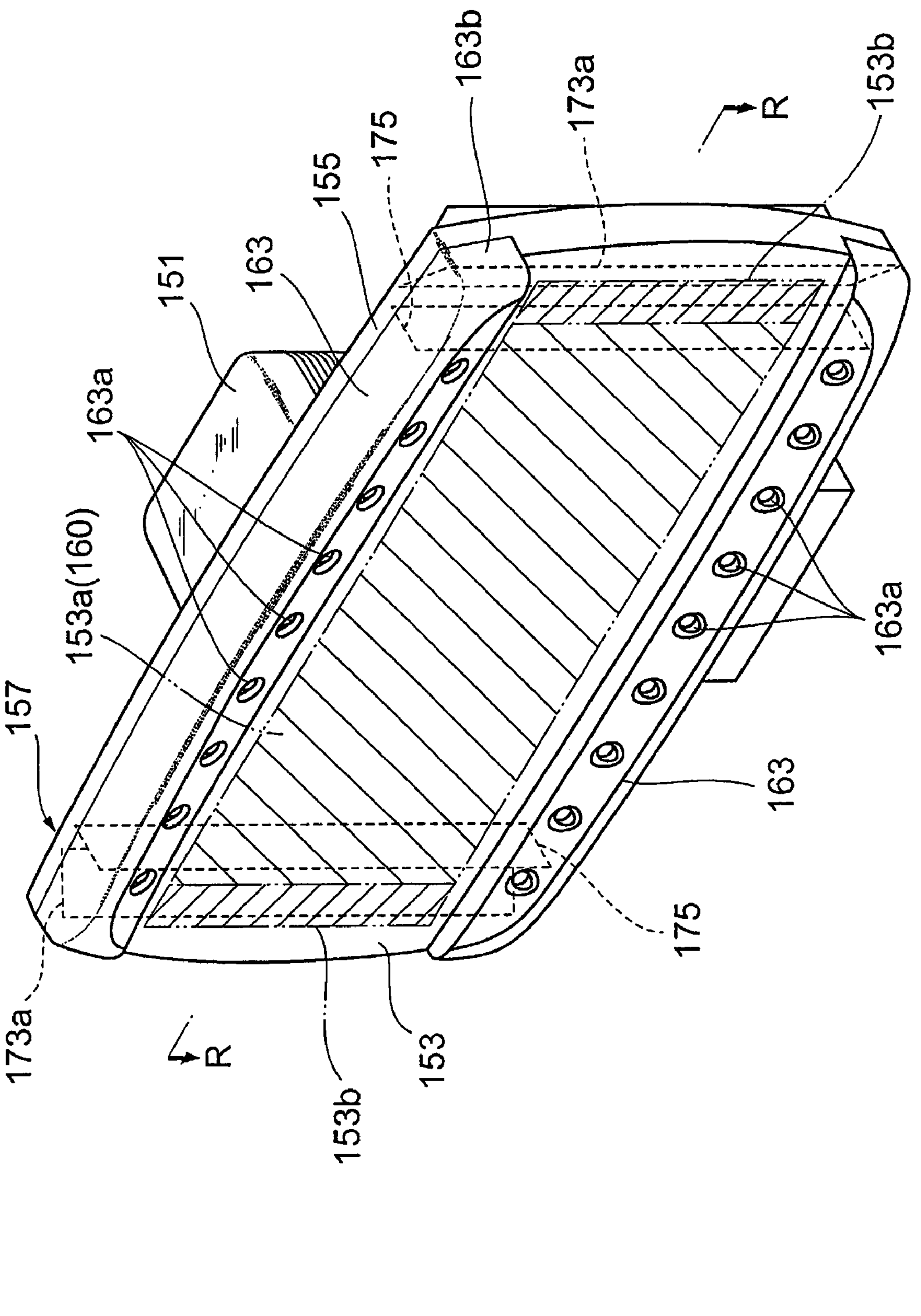
FIG. 21 is a perspective view of the gaming machine display device.
Figure 22:
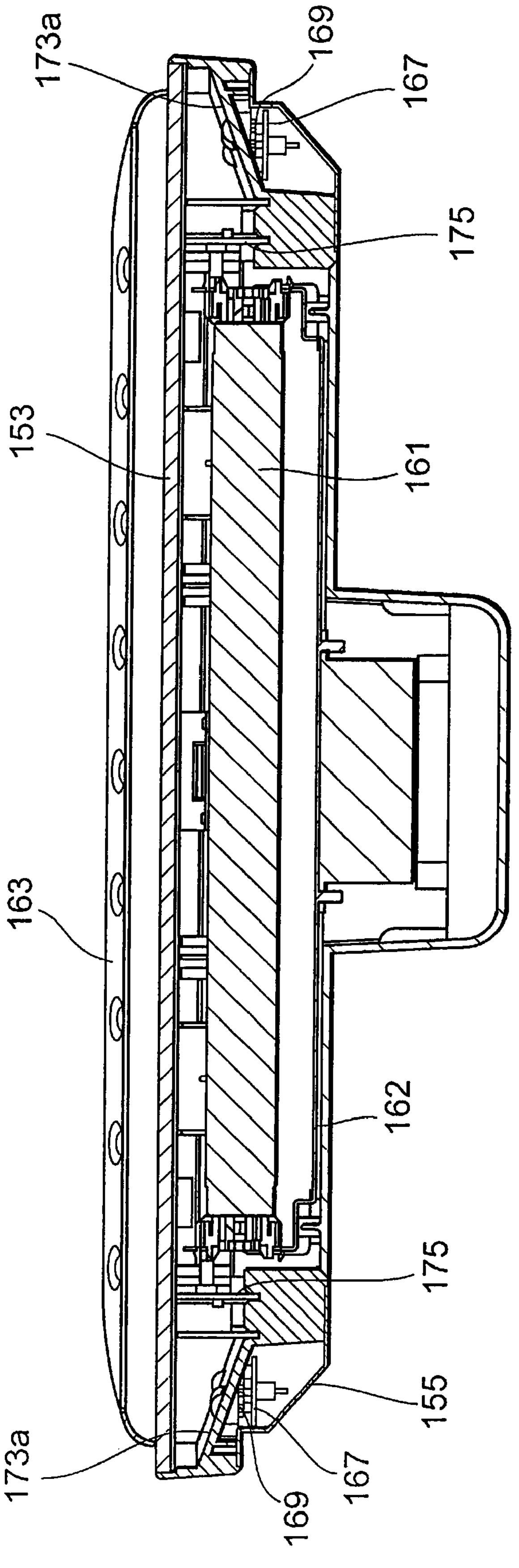
FIG. 22 is a sectional view along R-R line of FIG. 21.
Figure 23:
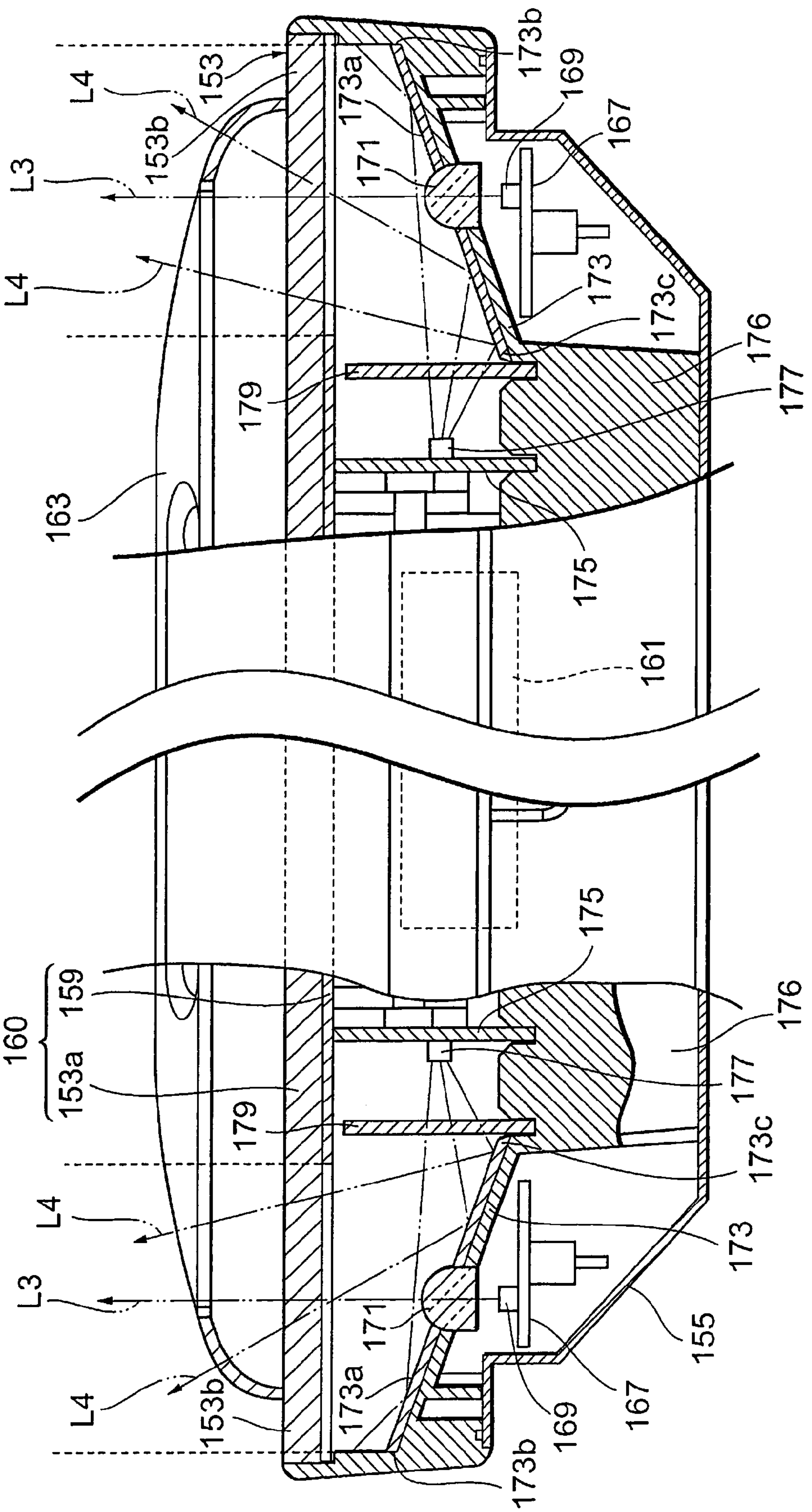
FIG. 23 is a sectional view showing in enlarged dimension right and left side portions of the gaming machine display device.

As shown in FIG. 20, a gaming machine display device 150 is fixed to an upper end of the cabinet 3 of the gaming machine 1 via a support 151. The gaming machine display device 150, as shown in FIGS. 21 to 23, has a display device casing (a cabinet) 157 configured of a transparent acrylic plate 153 on a front and an opaque rear cover 155 on a rear. A film 159 (refer to FIG. 23), on which is displayed a logo showing an appellation of the slot game or a character image, is disposed on a rear of the acrylic plate 153 and in an approximate center of the acrylic plate 153. A fluorescent lamp box 162 (refer to FIG. 22) housing a fluorescent lamp 161 is furnished rearward of the film 159. The film 159 is fixed sandwiched between the acrylic plate 153 and the fluorescent lamp box 162. A display portion 160, which displays the information relating to the game, is configured of a central portion 153*a* of the acrylic plate 153 overlapping the film 159, and the film 159. Light radiated from the fluorescent lamp 161 is transmitted through the display portion 160, causing the image displayed on the film 159 to stand out.

An LED unit 163 extending along an upper edge of the acrylic plate 153 is fixed to an upper portion of the display device casing 157. The LED unit 163, as well as being chromeplated, has a horizontally long casing 163*b*, on a front surface of which is mounted a plurality of lens bodies 163*a*, an LED substrate, which is housed in the casing 163*b* and extends in a longitudinal direction of the casing 163*b*, and a plurality of white LED's mounted on the LED substrate. A similar LED unit 163 is also provided in a lower portion of the display device casing 157. White light L3 emitted from the white LED's in the LED unit 163 is transmitted through the lens bodies 163*a*, and radiated forward.

LED substrates 167 (refer to FIGS. 22 and 23) extending in the up and down direction are fixed to right and left side portions of the rear cover 155, and a plurality of white LED's 169 facing forward are mounted on each LED substrate 167. An oblique light portion 173 mounted with a plurality of lens bodies 171 in a longitudinal direction of each LED substrate 167 is provided between the LED substrate 167 and the acrylic plate 153. The white light L3 emitted from the white LED's 169 is transmitted through the lens bodies 171 of the oblique light portion 173 and the acrylic plate 153, and radiated forward. Furthermore, a reflecting surface 173*a*, on which a resin is chromeplated in such a way as to be able to reflect the light, is formed on a front surface of the oblique light portion 173. The reflecting surface 173*a*, as well as facing the acrylic plate 153, is inclined in such a way that an outer end 173*b* on a side far from the display portion 160 is close to the acrylic plate 153, and an inner end 173*c* is far from the acrylic plate 153.

LED substrates 175 extending in the up and down direction are disposed closer to a center than the right and left oblique light portions 173, and on a rear side of the display portion 160. The LED substrates 175 are fixed to a plate-like bracket 176. The bracket 176, being fixed to an inner wall surface of the rear cover 155, protrudes forward from the inner wall surface of the rear cover 155. A plurality of full color LED's (light emitting portions) 177, facing toward the reflecting surface 173*a* of each oblique light portion 173, are mounted on each LED substrate 175. Translucent lacteous plates 179 are each fixed to the bracket 176, between the LED substrate 175 and the reflecting surface 173*a*. Light emitted from the full color LED's 177, after being transmitted through the lacteous plates 179, is reflected by the reflecting surfaces 173*a*. Light L4 reflected off the reflecting surfaces 173*a* is transmitted through right and left end portions 153*b* of the acrylic plate 153, and radiated forward.

In the gaming machine display device 150, as the full color LED's 177 are disposed inside the display device casing 157, it is difficult for them to be visible to the player. Furthermore, the quantity of the light L4 reflected from the reflecting surfaces 173*a* being more suppressed than that of the light radiated from the full color LED's 177, the strain on the player's eyes is reduced. As a result, an effect due to the light from the full color LED's 177 becomes possible while reducing the fatigue of the player's eyes. Furthermore, as the full color LED's 177 are disposed in the display device casing 157, it does not happen that the player touches and breaks the full color LED's 177.

Furthermore, the reflecting surfaces 173*a* are disposed along side edges of the display portion 160 which displays the information relating to the game. A player, who is wondering which gaming machine to select, is focusing on not only the variable display portion 4B and the variable display portion 4A of the gaming machine 1, but also the display portion 160 of the gaming machine display device 150. As the right and left side edges of the display portion 160 face places in which the reflecting surfaces 173*a* are disposed, a quantity of light in a vicinity of the side edges of the display portion 160 is increased by the light L4 reflected off the reflecting surfaces 173*a*, and the display portion 160 is accentuated, so it is possible to improve the degree of advertising of the gaming machine 1 to the spectator while suppressing the strain on the player's eyes.

Furthermore, the reflecting surfaces 173*a* are inclined toward the display portion 160 detached rearward from the acrylic plate 153 disposed on the front side of the display device casing 157. As a result, it becomes easy for the light L4 reflected by the reflecting surfaces 173*a* to reach the eyes of the spectator positioned diagonally behind the player, improving the degree of advertising to the spectator while suppressing the strain on the player's eyes.

Speakers

As shown in FIG. 3, between the variable display portion 4B and the operation table 10, laterally protruding speakers 23A and 23B are provided, as an effect device executing an effect of the game, respectively on both right and left side surfaces of the cabinet 3. The speaker 23A is installed on the right side surface of the cabinet 3, while the speaker 23B is installed on the left side surface of the cabinet 3. The speaker 23A is disposed in an area which appears rearward of the laterally opening front door (the opening and closing door) 6 when the front door 6 is in an opened condition in which it protrudes in a lateral direction of the cabinet 3.

Figure 24:
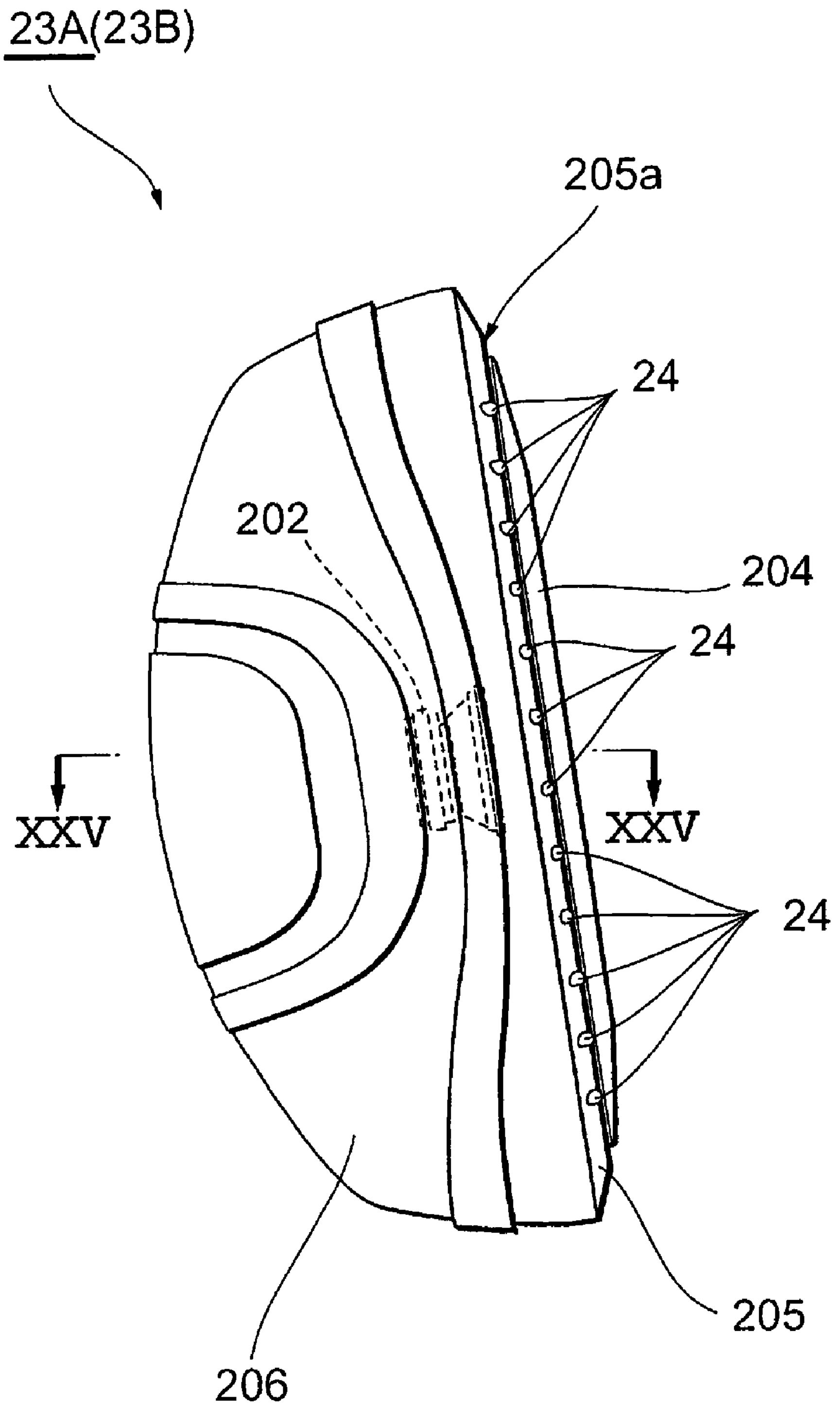
FIG. 24 is a side view showing in enlarged dimension a speaker in FIG. 2.
Figure 25:
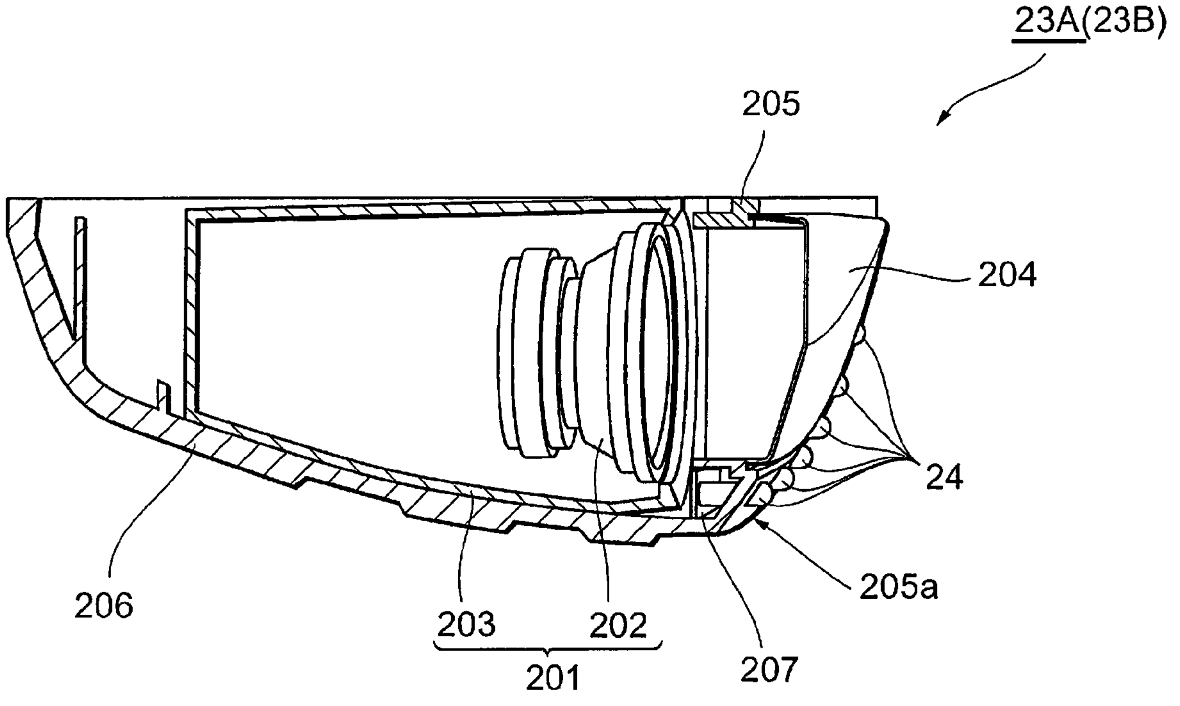
FIG. 25 is a sectional view along XXV-XXV line of FIG. 24.
Figure 26:
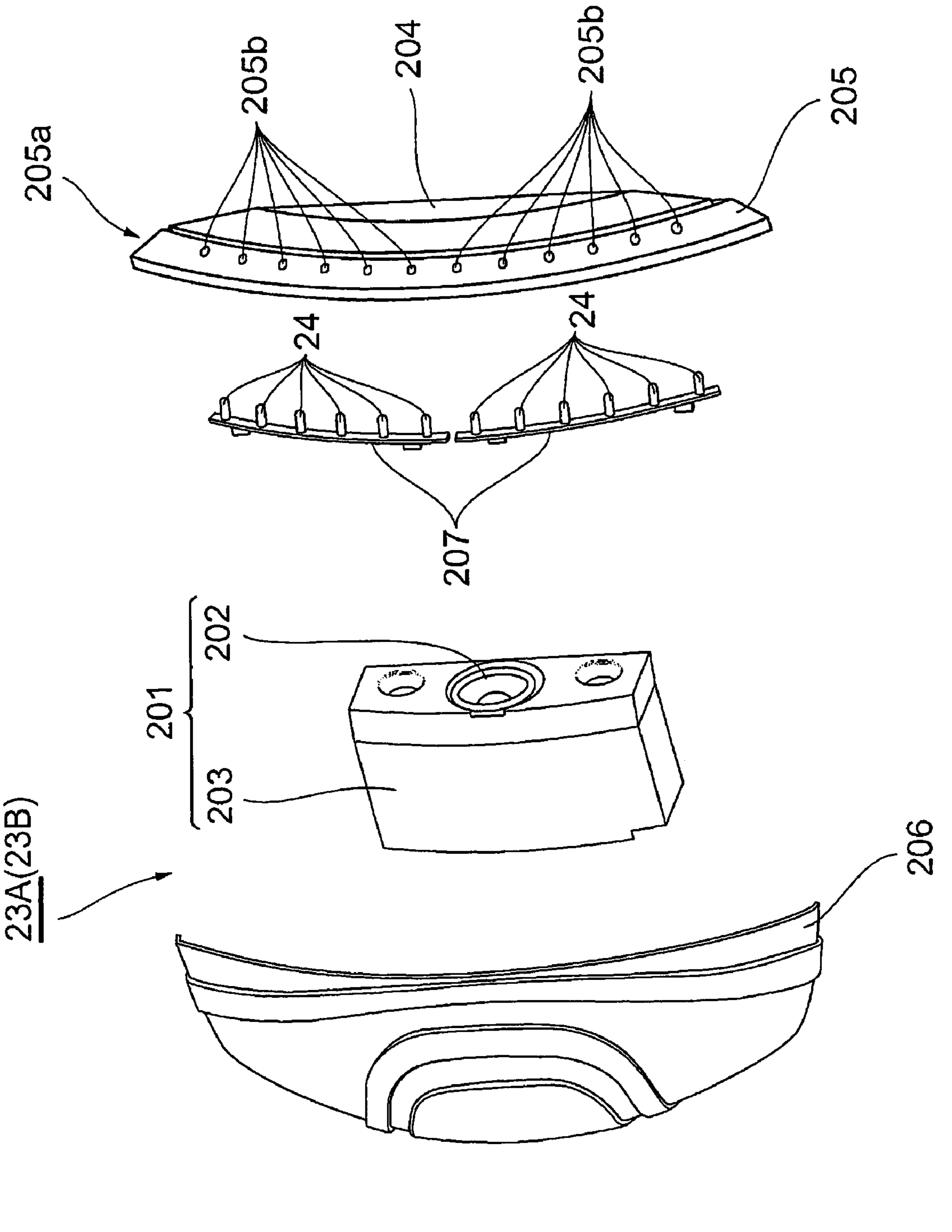
FIG. 26 is an exploded perspective view of the speaker shown in FIG. 24.
Figure 27:
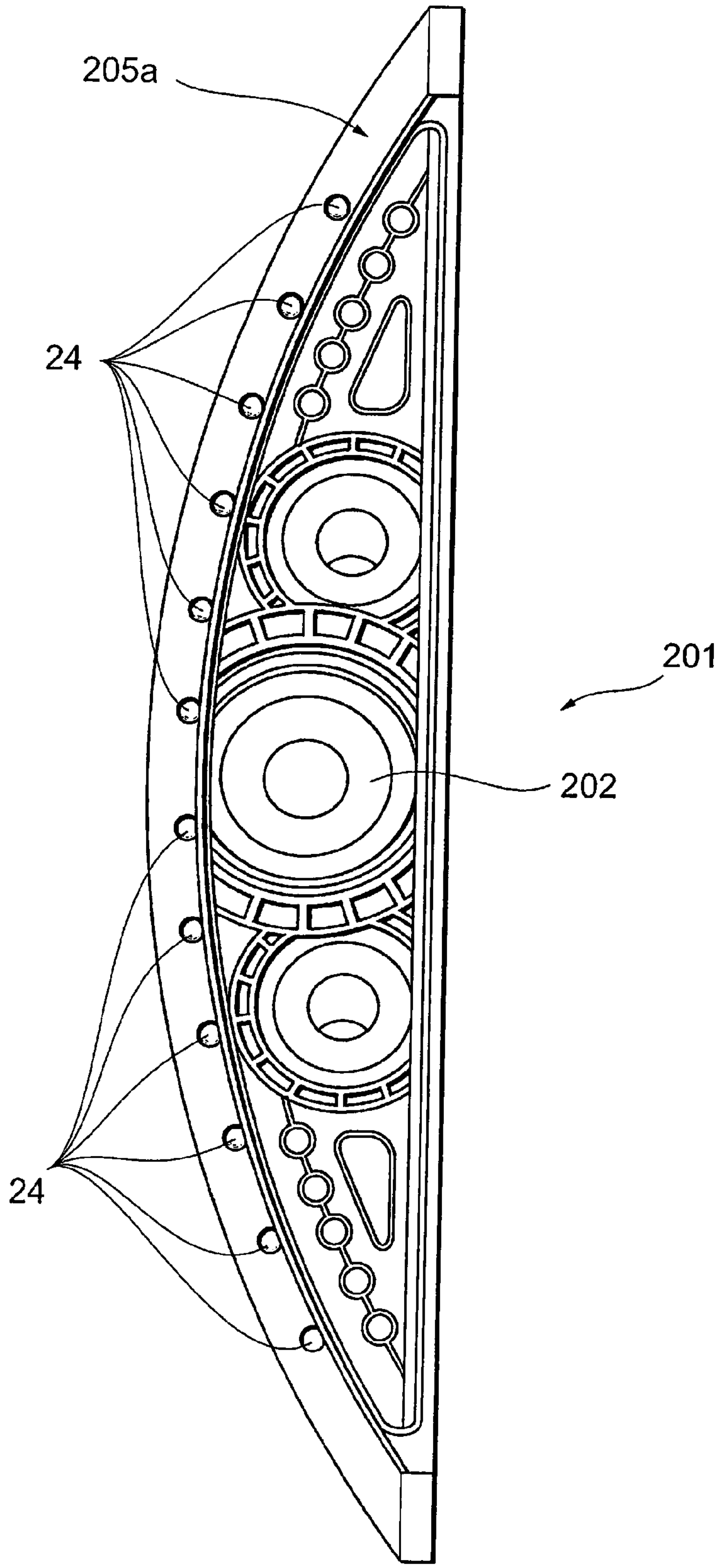
FIG. 27 is a front view showing the speaker in a condition in which a net is removed.

FIG. 24 is a side view showing in enlarged dimension the speaker in FIG. 2, FIG. 25 is a sectional view along line XXV-XXV of FIG. 24, FIG. 26 is an exploded perspective view of the speaker shown in FIG. 24, and FIG. 27 is a front view showing the speaker in a condition in which a net is removed. The speakers 23A and 23B being formed in an bow shape protruding laterally, as shown in FIGS. 25 to 27, a sound source portion 201 emitting a sound is disposed in each speaker 23A and 23B. The sound source portion 201 includes a speaker main body 202 and a speaker box 203 housing the speaker main body 202. The speaker main body 202 has a front surface fixed to a front wall of the speaker box 203, and the speaker box 203 is fixed to each side surface of the cabinet 3.

The speaker main box 202 is disposed at a height equivalent to or greater than that of the operation table 10 and equivalent to or less than that of the variable display portion 4B. Also, the speakers 23A and 23B are inclined in such a way that upper portions tilt rearward, and the speaker main bodies 202 in the speakers 23A and 23B are disposed in such a way that front surfaces of the speaker main bodies 202 are parallel to the front surface of the variable display portion 4B. In this way, by inclining the speaker main bodies 202 diagonally upward, and directing the sound emitted from the speaker main bodies 202 toward the player, it is possible to improve a sound effect for the player.

Figure 28:
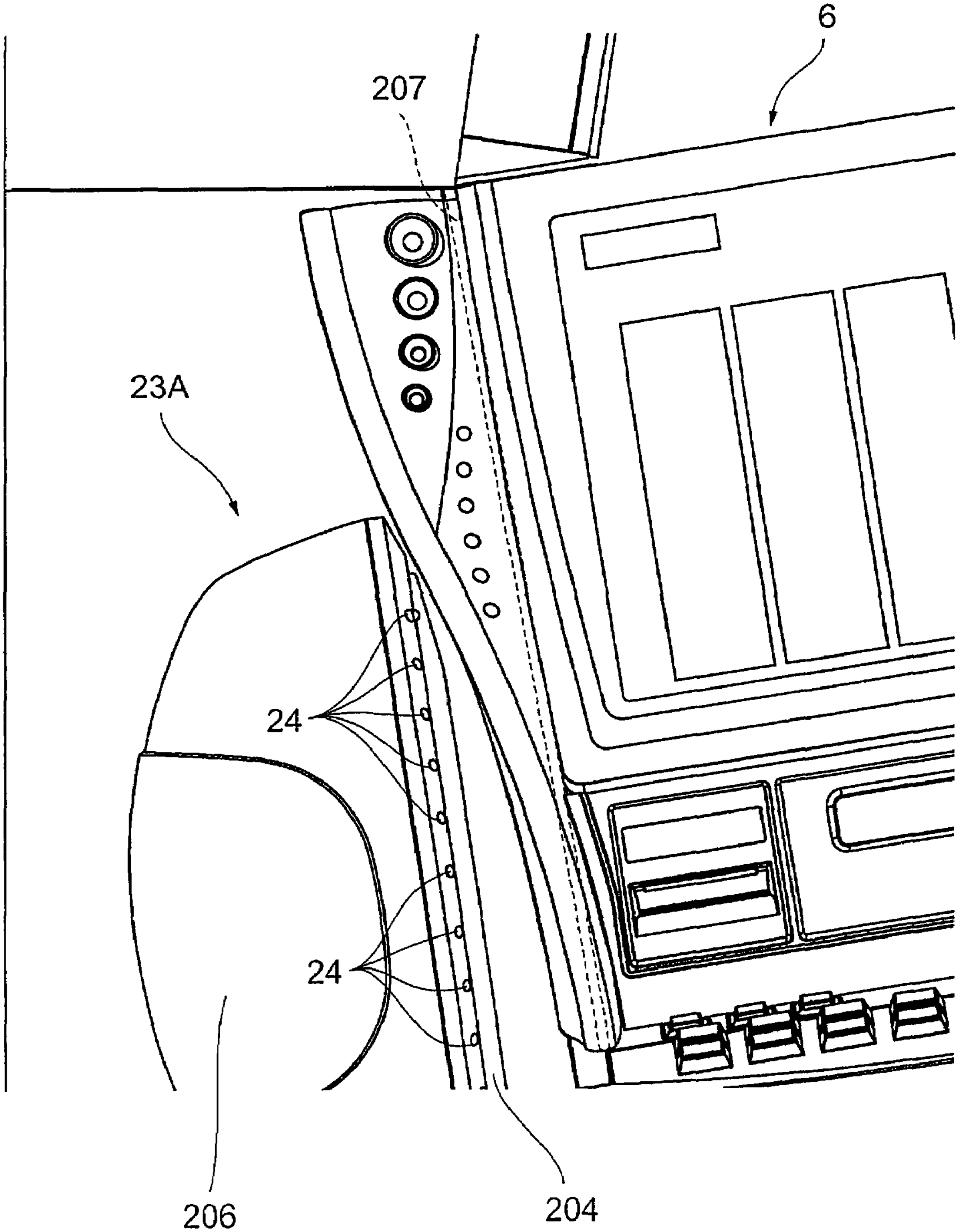
FIG. 28 is a right side view showing a condition in which the front door is opened.

FIG. 28 is a right side view showing a condition in which the front door is opened. The front door 6, which can pivot in the approximately horizontal direction via a hinge 207 extending in an approximately vertical direction, and open and close, is provided on the front surface of the cabinet 3, and the speaker 23A is disposed rearward of the hinge 207. Specifically, the speaker 23A is disposed in a position in which the speaker 23A is not an impediment when opening and closing the front door 6. By this part, even in a case in which the front door 6 is fully opened, as it is possible to avoid a contact of the front door 6 with the speaker 23A, it is possible to prevent a damage due to a hitting of the front door 6 against the speaker 23A.

The speakers 23A and 23B, as shown in FIGS. 24 to 27, each further include a net 204 covering a front surface of the sound source portion 201, a frame 205 to which the net 204 is fixed, and a rear side portion cover 206 covering aside surface and a rear surface of the sound source portion 201. The net 204 is fixed to a front end portion of the rear side portion cover 206 via the frame 205, and the frame 205 and the rear side portion cover 206 are attached to each side surface of the cabinet 3.

The frame 205, configuring a peripheral portion of the front surface of each speaker 23A and 23B, is disposed at a front of the sound source portion 201. Also, an outer peripheral portion (a corner portion) of the frame 205 forms an inclined surface 205*a* inclined with respect to each side surface of the cabinet 3. The inclined surface 205*a* extends in such a way as to go away from each side surface of the cabinet 3 diagonally behind the cabinet. That is, the inclined surface 205*a* forms an inclined surface facing diagonally forward.

Openings 205*b* (refer to FIG. 26) for exposing the speaker lamps (light sources) 24 are formed in the inclined surface 205*a* of the frame 205. One of the heretofore described light emitting portions 20 is disposed in the outer peripheral portion of the front surface of each speaker 23A and 23B. The light emitting portion 20 has the inclined surface 205*a* and the speaker lamps 24.

Figure 29:
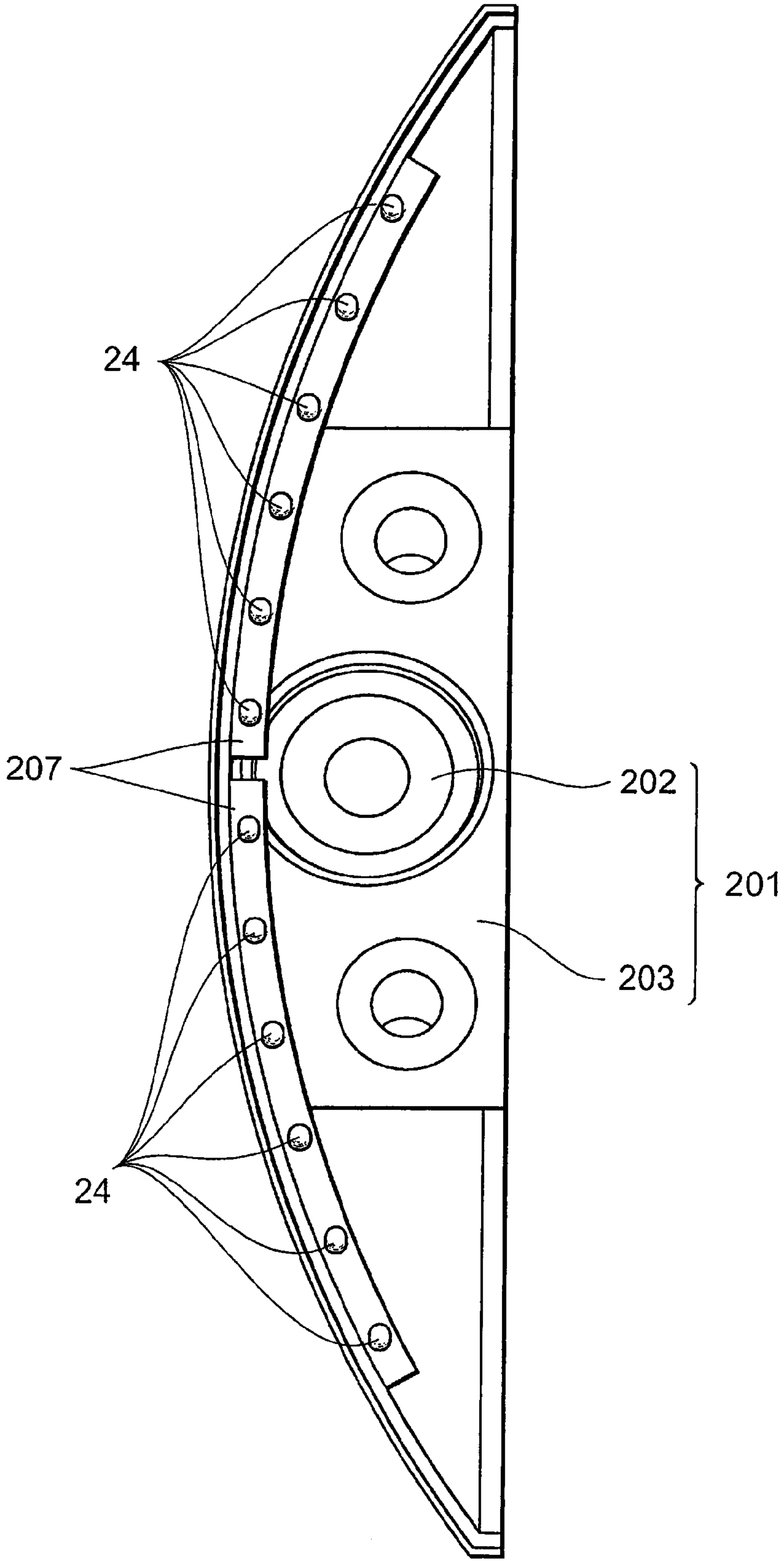
FIG. 29 is a front view showing a disposition of a sound source portion, a substrate and speaker lamps in the speaker.

The speaker lamps 24, being fixed onto the substrate 208 as shown in FIGS. 25 and 26, are disposed, in the up and down direction, along the outer peripheral portion of each speaker 23A and 23B. FIG. 29 is a front view showing a disposition of the sound source portion, the substrate and the speaker lamps in the speaker. The substrate 208, as shown in FIG. 29, is fixed to the front of the sound source portion 201. Some of the speaker lamps 24 are disposed in a position overlapping the sound source portion 201, in the front view. By this part, it is possible to reduce a width in a lateral direction of the gaming machine 1.

Figure 30:
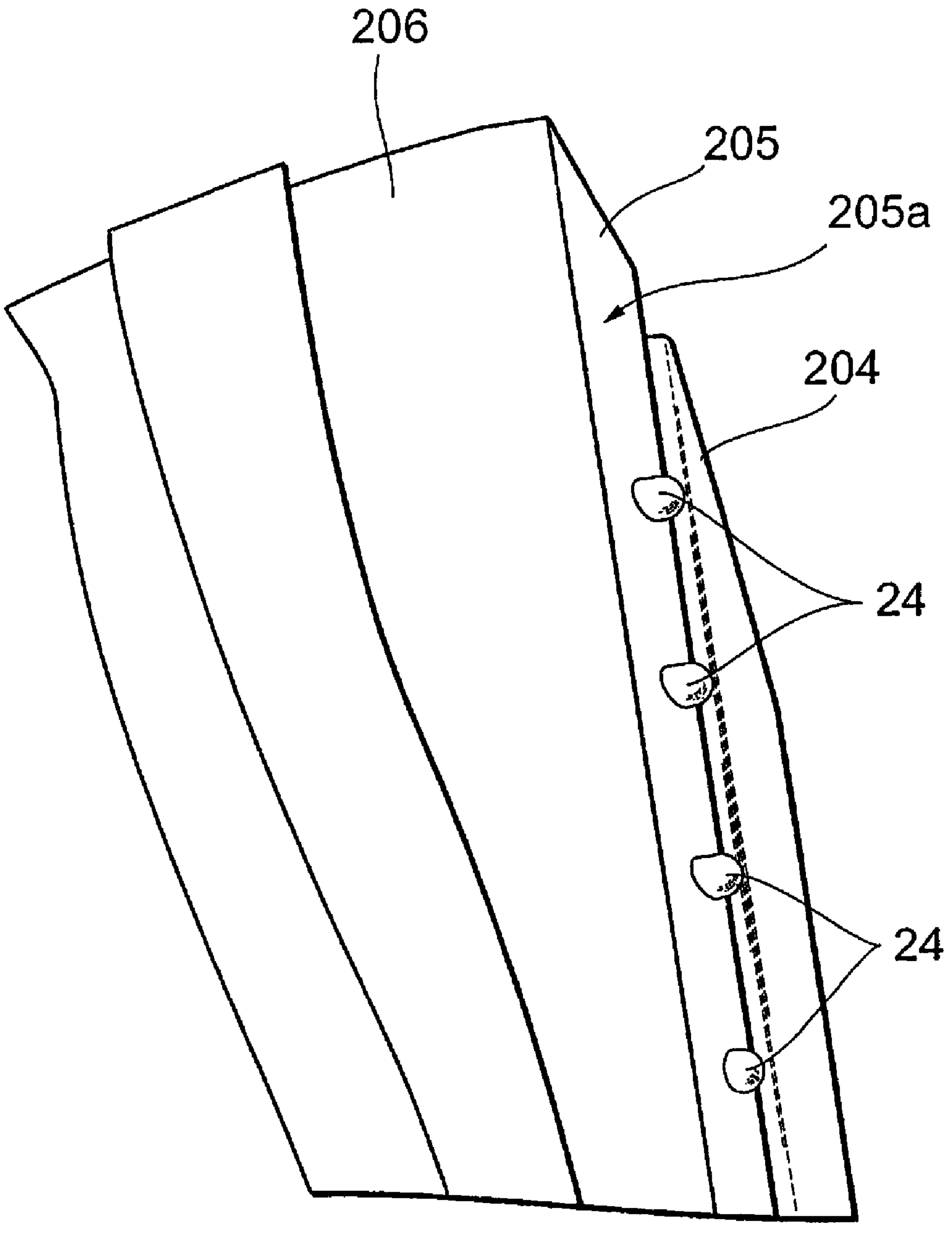
FIG. 30 is a side view showing in enlarged dimension an inclined surface and the speaker lamps.
Figure 31:
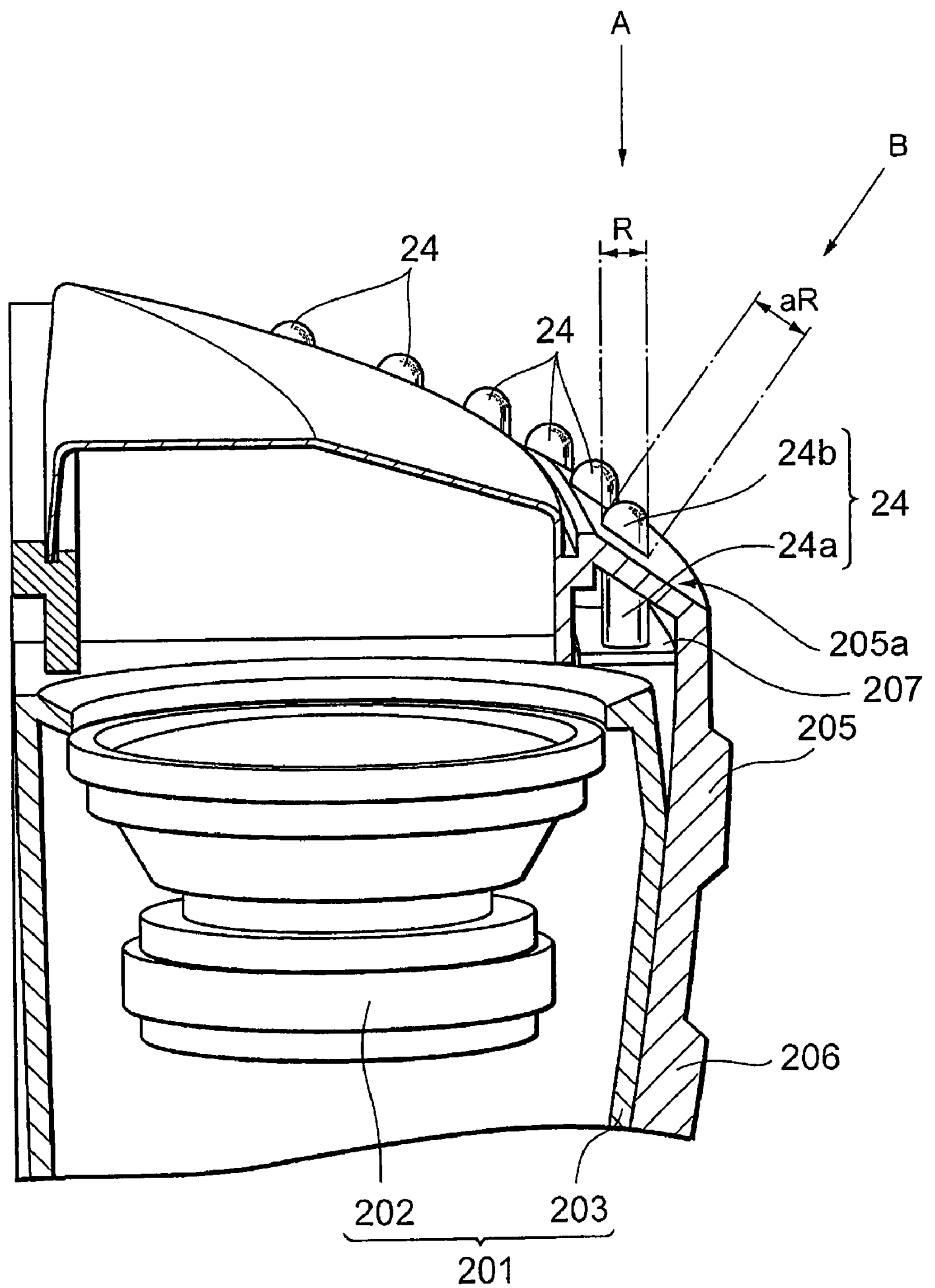
FIG. 31 is a sectional view showing in enlarged dimension the inclined surface and the speaker lamps.
Figure 32:
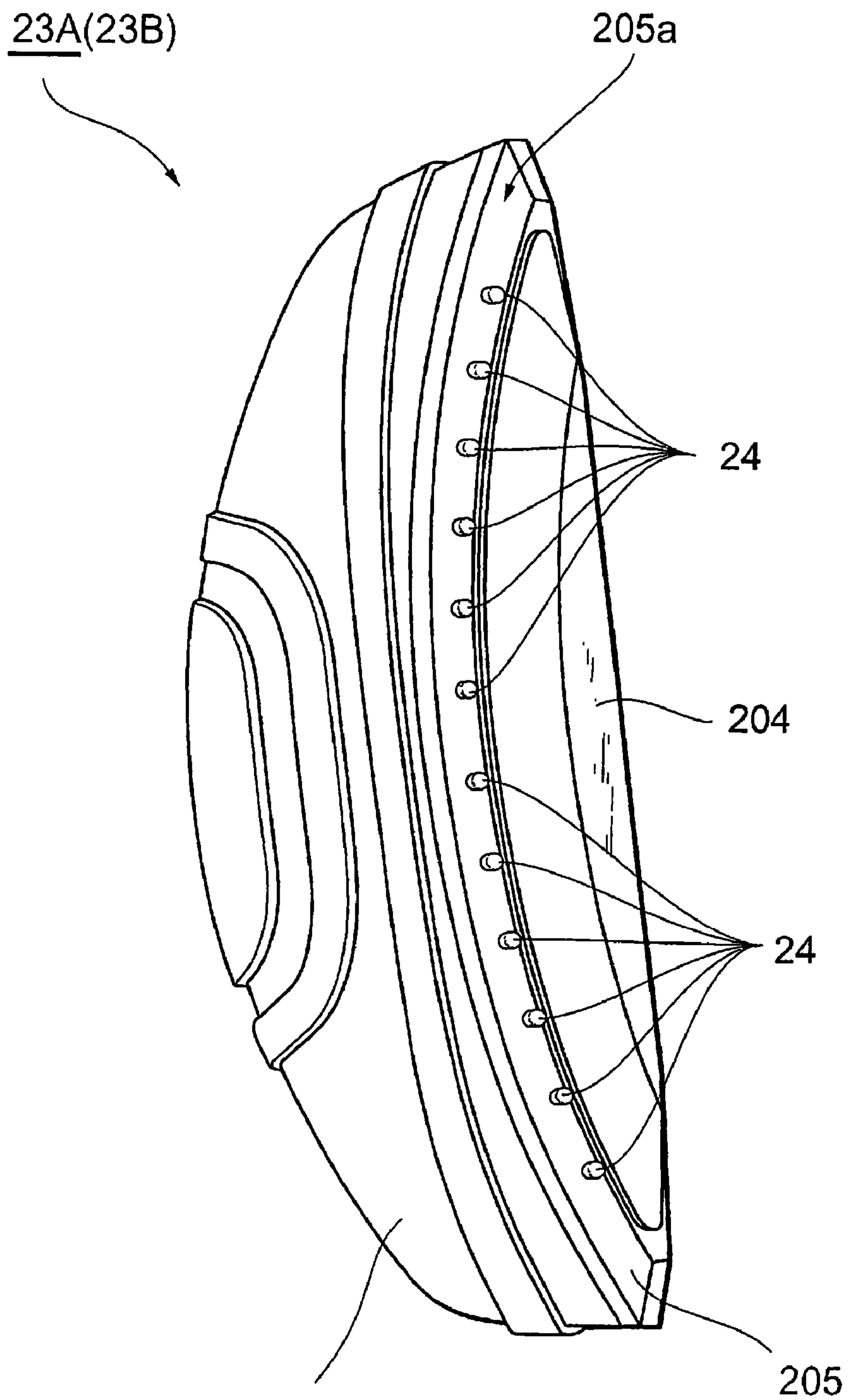
FIG. 32 is a perspective view showing the speaker shown in FIG. 24 from a direction facing the inclined surface.

FIG. 30 is a side view showing in enlarged dimension the inclined surface and the speaker lamps, FIG. 31 is a sectional view showing in enlarged dimension the inclined surface and the speaker lamps, and FIG. 32 is a perspective view showing the speaker shown in FIG. 24 from a direction facing the inclined surface. Each speaker lamp 24, as shown in FIG. 31, having a cylindrical body 24*a*, is disposed in such a way that an axial direction of the cylindrical body 24*a* follows a front and rear direction of the cabinet 3. Also, a leading end 24*b* of each speaker lamp 24 is formed in a spherical shape. The substrate 208 being fixed to an outer edge of a front surface of the speaker box 203, a main surface of the substrate 208 faces toward the front of the cabinet 3. As shown in FIGS. 30 to 32, the speaker lamps 24 are placed in a condition in which they protrude forward from the inclined surface 205*a*. That is, an axis of each speaker lamp 24 and the inclined surface 205*a* intersect at a prescribed angle, and a part of each cylindrical body 24*a*, and the leading ends 24*b*, are exposed from the inclined surface 205*a*.

Next, a description will be given of a visibility of the speaker lamps 24 in a case in which the gaming machine 1 is looked at by the spectators around the gaming machine 1. As shown in FIG. 31, in a case of looking at the speaker lamps 24 from a front of the gaming machine 1 (a direction A), a size of a light emitting range of each speaker lamp 24 looks approximately the same as a size of a diameter R of the speaker lamps 24. Also, in a case of looking at the speaker lamps 24 from diagonally in front of the gaming machine 1, specifically, from a direction facing the inclined surface 205*a* (a direction B), the size of the light emitting range of each speaker lamp 24 becomes aR, larger than the diameter R of the speaker lamps 24. By this part, as it becomes easy for the spectator in a position approximately facing the inclined surface 205*a* to focus on the speaker lamps 24, it is possible to improve the degree of advertising of the gaming machine 1.

Figure 33:
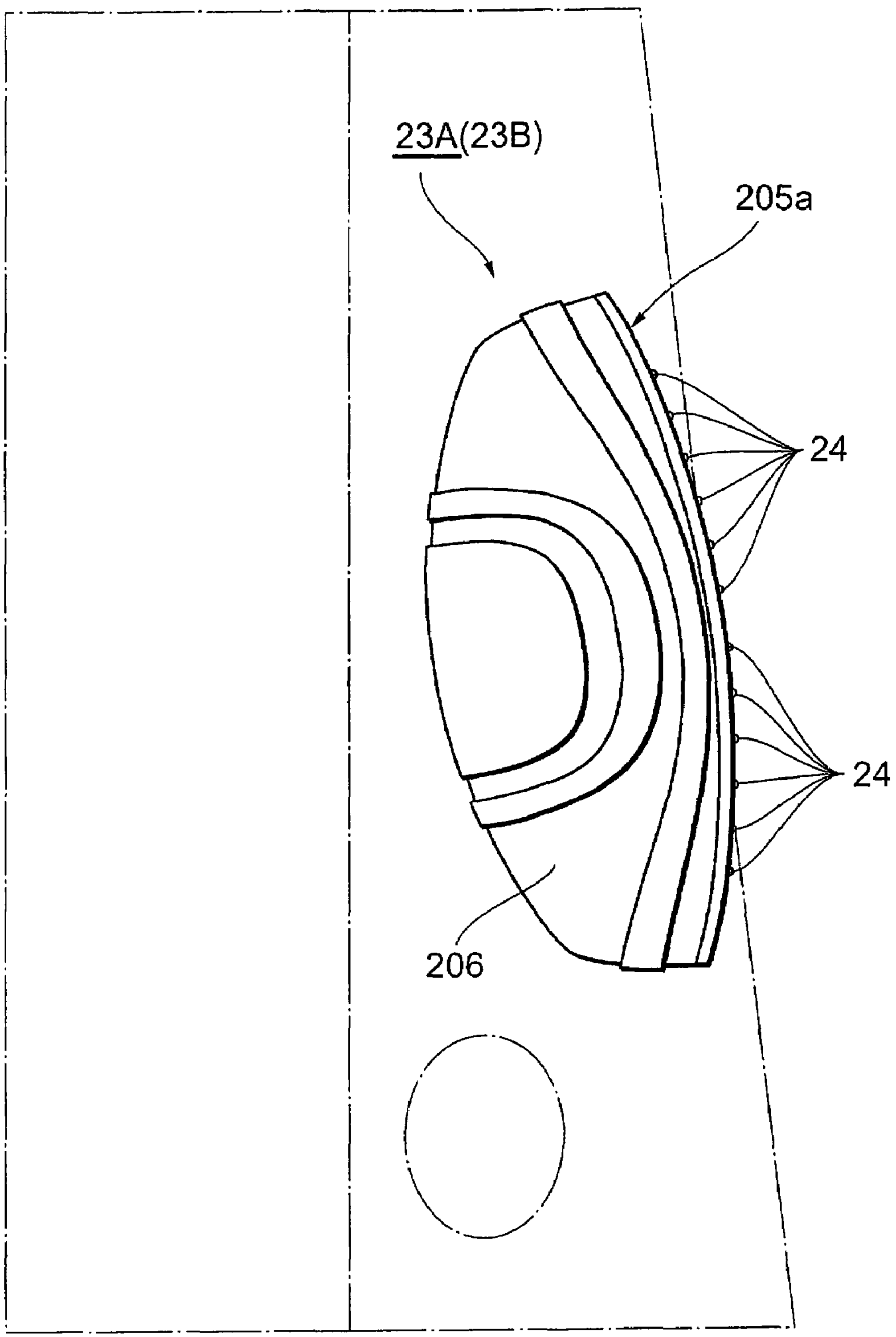
FIG. 33 is a perspective view showing the speaker shown in FIG. 24 from diagonally behind the gaming machine.

FIG. 33 is a perspective view showing the speaker shown in FIG. 24 from diagonally behind the gaming machine 1. A front outer corner portion of each speaker 23A and 23B forming the inclined surface 205*a* inclined rearward, as the speaker lamps 24 are disposed on the inclined surface 205*a*, it is possible to see the speaker lamps 24 from diagonally behind the gaming machine 1. In this way, it being possible to widen a range in which the light from the speaker lamps 24 can be seen, diagonally behind the gaming machine 1, it is possible to enhance the degree of appeal of the gaming machine 1 to the spectator diagonally behind the gaming machine 1.

In this way, in the gaming machine 1 of the embodiment, as the speaker 23A is disposed in the area posterior to the front door 6 which appears when the front door 6 is put in the opened condition and projects in the lateral direction of the cabinet 3, it is possible to, while improving the sound effect, make efficient use of an open space between cabinets of adjacent gaming machines 1. Although the gaming machine 1 is configured in such a way as to include the speaker 23A as an "effect device", it is also acceptable to configure a gaming machine including another effect device such as, for example, a light emitting device or a monitor. Also, it is also acceptable that the front door 6 is one which pivots in the approximately horizontal direction, or one which slides in the approximately horizontal direction.

Also, the gaming machine 1 including the variable display portion 4B, disposed on the front surface of the cabinet 3, which displays the information relating to the game, and the operation table 10, disposed on the front surface of the cabinet 3, which has the operation portion instructing the execution of the game, the variable display portion 4B is disposed above the operation table 10, and the speaker main bodies 202 are disposed at the height equivalent to or greater than that of the operation table 10 and equivalent to or less than that of the variable display portion 4B. By this part, it being possible to dispose the speaker main bodies 202 in a vicinity of the player, it is possible to further improve the sound effect for the player.

Also, the variable display portion 4B, being disposed inclined in such a way as to tilt rearward toward the player, is disposed in such a way that the front surfaces of the speaker main bodies 202 are parallel to the front surface of the variable display portion 4B. By inclining the variable display portion 4B diagonally upward and facing it toward the player, the player can see the display portion from a comfortable position. Furthermore, by disposing the speaker main bodies in such a way as to be parallel to the variable display portion 4B and facing them toward the player, it is possible to further improve the sound effect for the player.

Also, as the gaming machine 1 includes the speakers 23A and 23B as the effect devices, it is possible to carry out an effect by part of the sound emitted from the sound source portions 201 in the speakers 23A and 23B. Also, as the effect devices disposed lateral to the cabinet 3 are used as the sound source portions 201, unlike a case of a light effect due to the light emitting device or an image effect using the monitor, the player, without needing to move his or her sight line in order to look at the laterally disposed effect devices, can concentrate on the game.

Also, as the sound source portions 201 are provided on both right and left side surfaces of the cabinet 3, a distance between the sound source portions 201 can be widened in comparison with a hitherto known one and, as well as it being possible to improve a sound effect such as a stereo effect due to the sound source portions 201 (particularly, the speaker main bodies 202) or a surround effect, it is possible to make effective use of open spaces on both sides in a right and left direction of the cabinet.

Also, according to the gaming machine 1, as the variable display portion 4B is disposed on the front surface of the cabinet 3, and the speaker lamps 24 are installed on the side surfaces of the cabinet 3, without the light from the speaker lamps 24 impeding the game of the player, it is possible to carry out the advertising of the gaming machine 1 to the spectators around the gaming machine 1.

Also, the speaker lamps 24 are installed in such a way as to protrude forward from the inclined surfaces 205*a* inclined with respect to the side surfaces of the cabinet 3 and facing diagonally forward. By this part, the light emitting portions of the speaker lamps 24 look wider when looking at the speaker lamps 24 from a position which is diagonally in front of the cabinet 3 and approximately faces the inclined surfaces 205*a*, than when looking at the speaker lamps 24 from in front of the cabinet 3. As a result, as it becomes easy for the spectator in the position approximately facing the inclined surfaces 205*a* to focus on the speaker lamps 24, it is possible to improve the effect of advertising of the gaming machine 1.

As the speaker lamps 24 are installed at prescribed intervals from a lateral end of the variable display portion 4B, as well as it becoming more difficult for the light from the speaker lamps 24 to enter the player's field of vision, it is possible to further improve the effect of advertising to the spectator watching the gaming machine 1 from afar.

Also, as the speaker lamps 24 are disposed at the height equivalent to or greater than that of the operation table 10 and equivalent to or less than that of the variable display portion 4B, by disposing the variable display portion 4B and the speaker lamps 24 at the same height as the sight line of the spectator, it is possible to immediately focus the sight line of the spectator focusing on the speaker lamps 24 on the variable display portion 4B. Also, by disposing the speaker lamps 24 in such a way as to be parallel to the variable display portion 4B, it is possible to immediately focus the sight line of the spectator focusing on the speaker lamps 24 on the variable display portion 4B.

Also, the speaker lamps 24 are disposed on the front surfaces of the sound source portions 201 protruding laterally from the side surfaces of the cabinet 3. That is, the speaker lamps 24 are disposed in the position overlapping the sound source portions 201, in the front view. By this part, it is possible to reduce the width in the lateral direction of the gaming machine 1. For example, even in a case of increasing a diameter of the speaker main bodies 202 in the sound source portions 201 in order to eliminate a lack of low-pitched sound production and improve a sound quality, it is possible to reduce the width in the lateral direction of the gaming machine 1.

Although some of the speaker lamps 24 and the speaker main bodies 202 are disposed in a height position equivalent to or higher than the operation table 10 and equivalent to or lower than the variable display portion 4B, it is also acceptable to dispose the speaker lamps 24 and the speaker main bodies 202 in another height position.

Top Lamp

Figure 34:
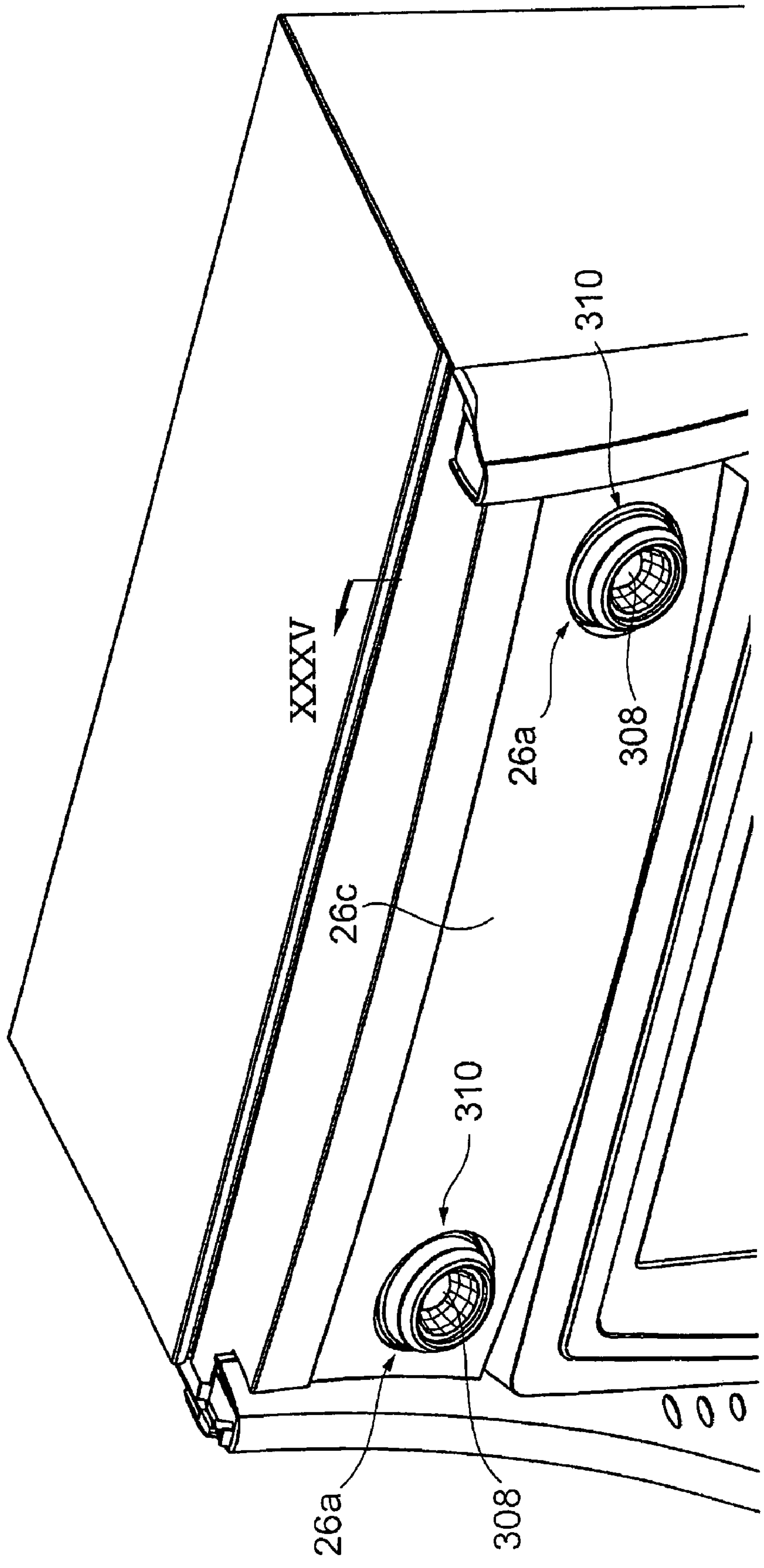
FIG. 34 is an enlarged view showing a main portion of a top lamp of the gaming machine in FIG. 1.
Figure 35:
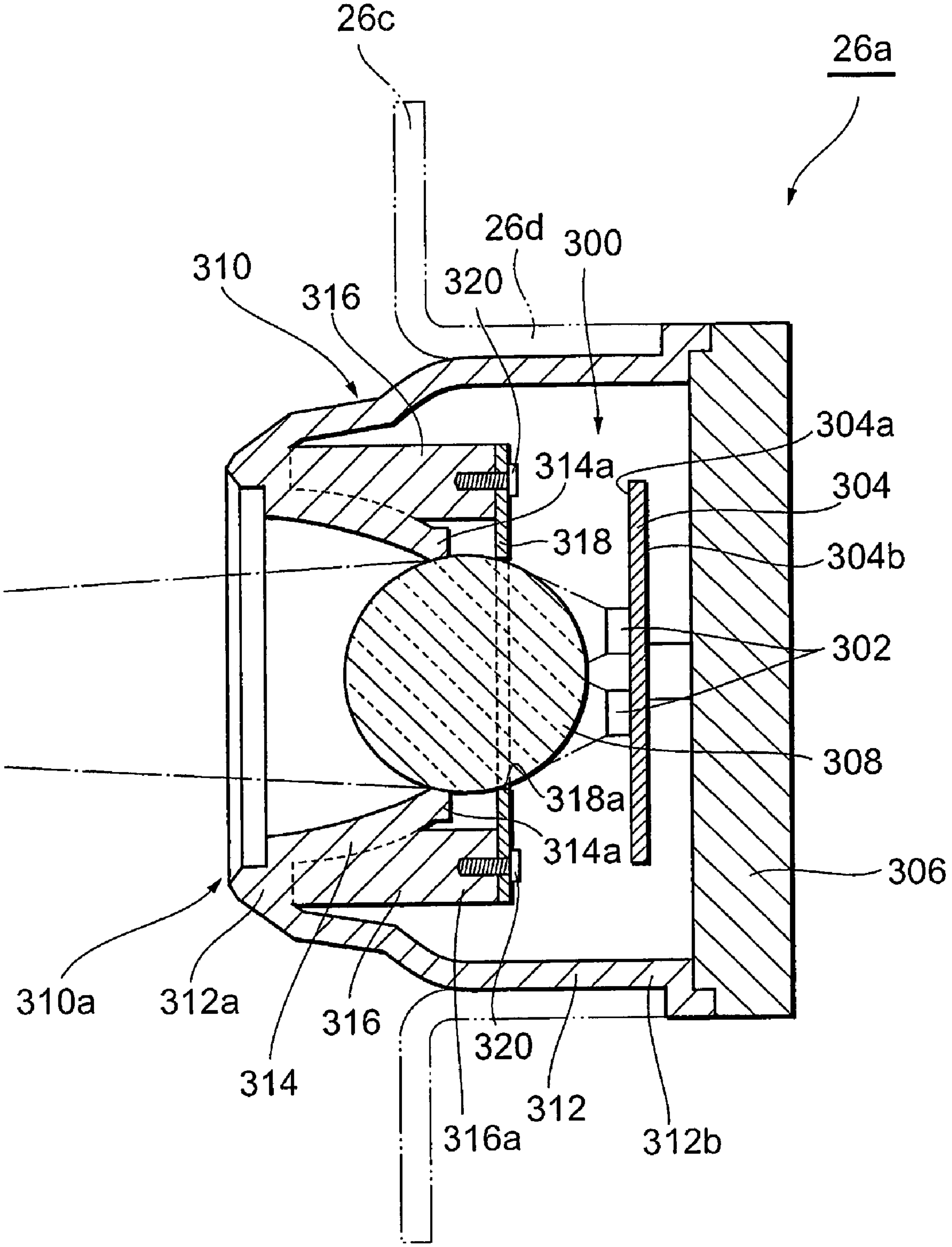
FIG. 35 is a sectional view of the top lamp shown in FIG. 34 taken along line XXXV-XXXV.

A detailed description will be given, while referring to FIGS. 34 and 35, of the heretofore described power lamps 26*a* of the top lamp 26.

A cover plate 26*c* is disposed at a front of the top lamp 26, and the power lamps 26*a* are provided in such a way as to protrude from the cover plate 26*c*. The power lamps 26*a*, being lamps emitting light in the approximately horizontal direction, are each configured of a power lamp light emitting portion (a light emitting portion) 300 emitting the light, and a lens barrel (a light interception portion) 310 which causes the light from the power lamp light emitting portion 300 to emerge from an emergence opening 310*a*.

The power lamp light emitting portion 300 is configured of a substrate 304 provided with four LED's (light sources) 302, a support 306 which supports the substrate 304, and a lens 308 through which light from the LED's 302 is transmitted. The substrate 304 being disposed approximately vertically in such a way as to face the emergence opening 310*a* of the lens barrel 310, the four LED's 302 are provided on a front surface 304*a* thereof, aligned in two vertical and horizontal arrays. These LED's 302 being full color type LED's, a control of a lighting, a flashing or an emission color thereof is carried out by a not-shown signal circuit.

The support 306, supporting the substrate 304 from a rear surface 304*b* thereof, is fixed to a part of the heretofore described cabinet 3. A lens 308, being a spherical lens (a ball lens), is disposed to a front of and in proximity to the four LED's 302. For this reason, light emerging from each LED 302 is transmitted through the lens 308, and heads toward the emergence opening 310*a* of the lens barrel 310. The light emerging from each LED 302 is refracted when transmitted through the lens 308, and emitted as converging light heading in the approximately horizontal direction.

The lens barrel 310, having an approximately cylindrical shape extending in the approximately horizontal direction, is fitted in a lamp installation portion 26*d* formed in a tubular shape in such a way as to warp rearward from the cover plate 26*c*. The lens barrel 310, surrounding the substrate 304 and the lens 308 in the power lamp light emitting portion 300 in an integrated manner, causes the light from the power lamp light emitting portion 300 to emerge from the emergence opening 310*a*, which is a front side opening.

The lens barrel 310 has an outer cylinder 312 on an outer side and an inner cylinder 314 positioned on an inner side of the outer cylinder 312. The outer cylinder 312, having an approximately cylindrical shape, decreases in diameter gently toward a front. A rear end portion 312*b* of the outer cylinder 312 is fixed to the heretofore described support 306 of the power lamp light emitting portion 300. The inner cylinder 314, being provided in such a way as to enter an inside from a front end portion 312*a* of the outer cylinder 312, has a funnel shape decreasing in diameter toward a rear.

A pair of supports 316 is formed, in upper and lower positions of the inner cylinder 314, between the outer cylinder 312 and the inner cylinder 314. Each support 316, also being a pole-like portion extending rearward from the front end portion 312*a* of the outer cylinder 312, passes between the outer cylinder 312 and the inner cylinder 314, and extends to a position posterior to a rear end portion 314*a* of the inner cylinder 314. A portion between the pair of supports 316 being bridged by a plate 318 parallel to the heretofore described substrate 304 of the power lamp light emitting portion 300, the plate 318 is fixed by a screw 320 to an end surface of a rear end portion 316*a* of each support 316.

A circular hole 318*a* being formed in a center of the plate 318, the heretofore described lens 308 is fitted from a front side into the circular hole 318*a*. The lens 308, being in contact with the rear end portion 314*a* of the inner cylinder 314 positioned forward of the lens 308, is supported in such a way as to be sandwiched from a front and rear direction by the rear end portion 314*a* of the inner cylinder 314 and the plate 318.

In this kind of power lamp 26*a*, when the LED's 302 of the power lamp light emitting portion 300 emit light, the light, as well as being caused to fall incident on the lens 308 disposed forward of the LED's 302, is refracted in the lens 308, and becomes the converging light. That is, the light from the LED's 302, by being transmitted through the lens 308, is caused to converge, and becomes high linearity light heading in the approximately horizontal direction. Then, the light transmitted through the lens 308, by way of the inside of the inner cylinder 314, is caused to emerge from the emergence opening 310*a* of the lens barrel 310.

That is, in each power lamp 26*a*, as the LED's 302 and the lens 308 of the power lamp light emitting portion 300 are surrounded by the lens barrel 310, only the light, among the beams of light caused to emerge from the LED's 302, which has been transmitted through the lens 308, is caused to emerge from the emergence opening 310*a*, and the other light is intercepted by the lens barrel 310. Consequently, a radiation area of the emergent light from the power lamp light emitting portion 300 of the power lamp 26*a* is limited to an area of the converging light (refer to dashed-dotted lines in FIG. 35) heading toward an approximately horizontal front from the lens 308.

For this reason, the player who, facing the display portion 4 and the operation buttons 11 (the operation portion) of the operation table 10 which are disposed at the front of the gaming machine 1, plays the game in a position immediately below the power lamps 26*a*, is out of the radiation area of the power lamps 26*a*, and the light from the power lamps 26*a* is not radiated on the player. By that part, the light from the power lamps 26*a* not entering the player's field of vision, the reduction in the fatigue of the player is realized, and also, the player can concentrate on the game.

Also, as the light from the power lamps 26*a* is caused to converge in the approximately horizontal direction using the lens 308, in comparison with a case in which the light is dispersed, it is more difficult for the emergent light from the power lamp light emitting portion 300 to head toward a lower side where the player is. That is, a situation, in which the light from the power lamp light emitting portion 300 enters the player's field of vision, is more effectively avoided by part of the lens 308. In addition, it is easy for the light caused to converge by the lens 308 to reach far, increasing a degree of advertising of the light to a spectator far away. Moreover, as the power lamps 26*a* use the full color LED's 302 as the light sources of the power lamp light emitting portion 300, it being possible to realize various light effects which cannot be realized with monochromatic light sources, it is possible to improve a dramatic effect.

It not always being necessary that a light interception portion such as the lens barrel is provided in such a way as to surround a periphery of the power lamp light emitting portion, it is sufficient to have an aspect in which the light interception portion is interposed between the power lamp light emitting portion and the player in such a way as to be able to intercept at least some of light heading toward a player side. However, in a case in which the light interception portion surrounds the periphery of the power lamp light emitting portion, as a situation of the light leaking from the light interception portion can be avoided with a higher accuracy in comparison with a case in which the light interception portion does not surround the periphery, it is preferable in that it is possible to more reliably avoid a situation in which the light from the power lamp light emitting portion enters the player's field of vision.

Next, a detailed description will be given, while referring to FIGS. 36 to 38, of the strip-shaped lamp 26*b* of the top lamp 26.

Between the heretofore described power lamps 26*a* disposed on both sides of the top lamp 26, a recessed portion 330 extending right and left over an approximately whole length between the power lamps 26*a* is provided on a rear side of the cover plate 26*c*. The recessed portion 330 being provided in such a way as to be recessed rearward with respect to the front surface of the cabinet 3 provided with the top lamp 26, the upper display portion 4A positioned below the top lamp 26 and the like, a cross-section thereof is approximately rectangular.

The recessed portion 330, being partitioned into two right and left portions by three walls 332 perpendicular to the cover plate 26*c*, is divided into a right recessed portion 330A and a left recessed portion 330B, each of which is sandwiched by a pair of the walls 332. A light source unit 340, which emits light, and a reflecting plate 350, which reflects the light from the light source unit 340, are housed inside each of the right recessed portion 330A and the left recessed portion 330B. The strip-shaped lamp (the light emitting portion) 26*b* is configured of the recessed portion 330, the light source unit 340 and the reflecting plate 350.

The light source unit 340, being disposed in such a way as to extend in the right and left direction in a height position approximately halfway between the recessed portions 330A and 330B, is configured of a reed-shaped substrate 342 and six LED's (light sources) 344 installed at equal intervals on a substrate surface in an extending direction of the substrate 342. The substrate 342 extends horizontally, and is inclined in such a way that the surface thereof faces diagonally upward. Each LED 344 provided on the substrate 342 being, for example, a white LED, a control of a lighting or a flashing is carried out by a not-shown signal circuit. Supposing that a straight line connecting the LED 344 and a lower edge 330*a* of the recessed portion 330 is designated as a straight line L (refer to FIG. 37), the LED 344 is in a position in which the straight line L intersects with a perpendicular line from the front surface of the cabinet 3 (for example, a perpendicular line 4*p* from a display surface 4*s* of the upper display portion 4A) at an acute angle $\gamma$.

The reflecting plate 350, being a member made by bending forming a stainless plate material, is configured of a support 352, which supports the light source unit 340 from below, and a reflecting portion 354 positioned on an upper side of the support 352. The support 352, being provided in such a way as to stand up from a bottom surface 330*b* of the recessed portion 330, supports the substrate 342 of the light source unit 340 from a rear surface side thereof. The reflecting portion 354 extends diagonally upward and forward from an upper end portion 352*a* of the support 352 positioned on a rear side of the light source unit 340. The reflecting portion 354, bending downward at a bending portion 354*c* in a vicinity of a center between a lower end portion 354*a* and an upper end portion 354*b* thereof, is divided into a first reflecting portion 354A below the bending portion 354*c* and a second reflecting portion 354B above the bending portion 354*c*.

Herein, front surfaces of the first reflecting portion 354A and the second reflecting portion 354B being made reflective and forming reflecting surfaces 356A and 356B respectively, the reflecting surface 356A of the first reflecting portion 354A is inclined at an inclined angle (a first inclined angle) $\alpha$ with respect to a horizontal plane H, while the reflecting surface 356B of the second reflecting portion 354B is inclined at an inclined angle (a second inclined angle) $\beta$ with respect to the horizontal plane H. As described heretofore, as the reflecting portion 354 bends downward at the bending portion 354*c*, the inclined angle $\beta$ of the reflecting surface 356B of the second reflecting portion 354B is smaller than the inclined angle $\alpha$ of the reflecting surface 356A of the first reflecting portion 354A.

Some of the light from the LED's 344 of each light source unit 340 is reflected off the reflecting surfaces 356A and 356B of the reflecting portion 354, and heads toward an opening of the recessed portion 330 which is an emergence opening of the strip-shaped lamp 26*b*. At this time, as the second reflecting portion 354B is positioned on a side farther away from the LED's 344 than the first reflecting portion 354A, and the inclined angle $\beta$ of the reflecting surface 356B of the second reflecting portion 354B is smaller than the inclined angle $\alpha$ of the reflecting surface 356A of the first reflecting portion 354A, light reflected off the reflecting surface 356A of the first reflecting portion 354A, and light reflected off the reflecting surface 356B of the second reflecting portion 354B, shift up or down, and travel in approximately the same direction.

Next, a description will be given of a visibility of the light in the strip-shaped lamp 26*b*.

As the spectator in a standing position faces the gaming machine 1, a height of an eye line of a spectator M1 being on the same order as a height of the strip-shaped lamp 26*b*, the light caused to emerge in the horizontal direction from the strip-shaped lamp 26*b* reaches the spectator. That is, as shown by an arrow L1 of FIG. 37, the light from the LED's 344 of the light source unit 340 directly reaches the spectator M1 via the cover plate 26*c* fitted in the emergence opening of the strip-shaped lamp 26*b* (that is, the opening of the recessed portion 330). Also, apart from the direct light L1 from the LED's 344, as shown by arrows L2 and L3 of FIG. 37, lights L2 and L3 from the LED's 344, reflected off the reflecting portion 354, reach the spectator M1 via the cover plate 26*c*. As the reflecting portion 354 has the first reflecting portion 354A and the second reflecting portion 354B, the lights L2 and L3 reflected off them reach the spectator M1 in two upper and lower tiers, the upper reflected light L3 and the lower reflected light L2.

Figure 36:
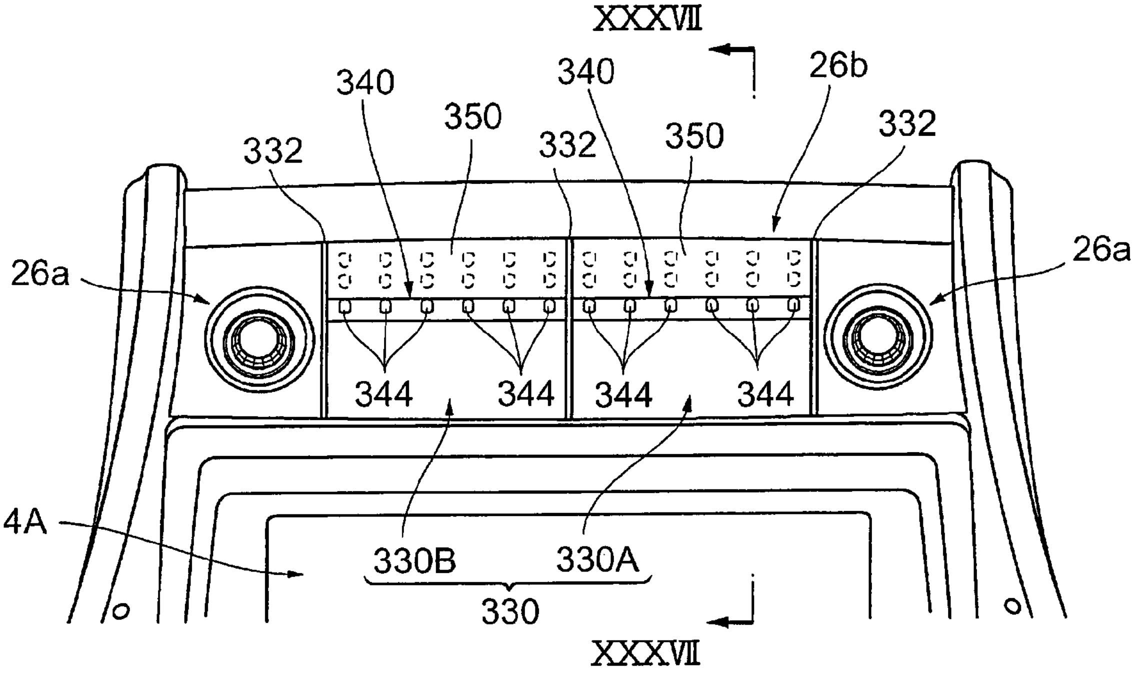
FIG. 36 is a front view of the top lamp in FIG. 34 with a cover plate omitted.

Consequently, as shown in FIG. 36, three-tiered light of the light L1 emitted from the LED 344 and the lights L2 and L3 reflected off the reflecting portion 354 is visible to the spectator. For this reason, in the strip-shaped lamp 26*b*, three-tiered light from the right recessed portion 330A and three-tiered light from the left recessed portion 330B are visible from the eye line of the spectator. As the partition wall 332 between the right recessed portion 330A and the left recessed portion 330B is thin, it appearing to the spectator that the light from the right recessed portion 330A and the light from the left recessed portion 330B are continuous, strip-shaped light divided into three vertical tiers is visually perceived as a whole of the strip-shaped lamp 26*b*.

Meanwhile, as the player in a sitting position faces the gaming machine 1, a height of an eye line of a player M2 is several tens of centimeters below the strip-shaped lamp 26*b*, and is slightly above the straight line L connecting the LED's 344 and the lower edge 330*a* of the recessed portion 330. For this reason, the player M2 can visually perceive the light emitted from the LED's 344, but cannot visually perceive the light reflected off the reflecting portion 354. This is because the light reflected off the first reflecting portion 354A becomes invisible by approximately overlapping the light emitted from the LED's 344, and because the light reflected off the second reflecting portion 354B is not reflected in a direction of the view point of the player.

Figure 38:
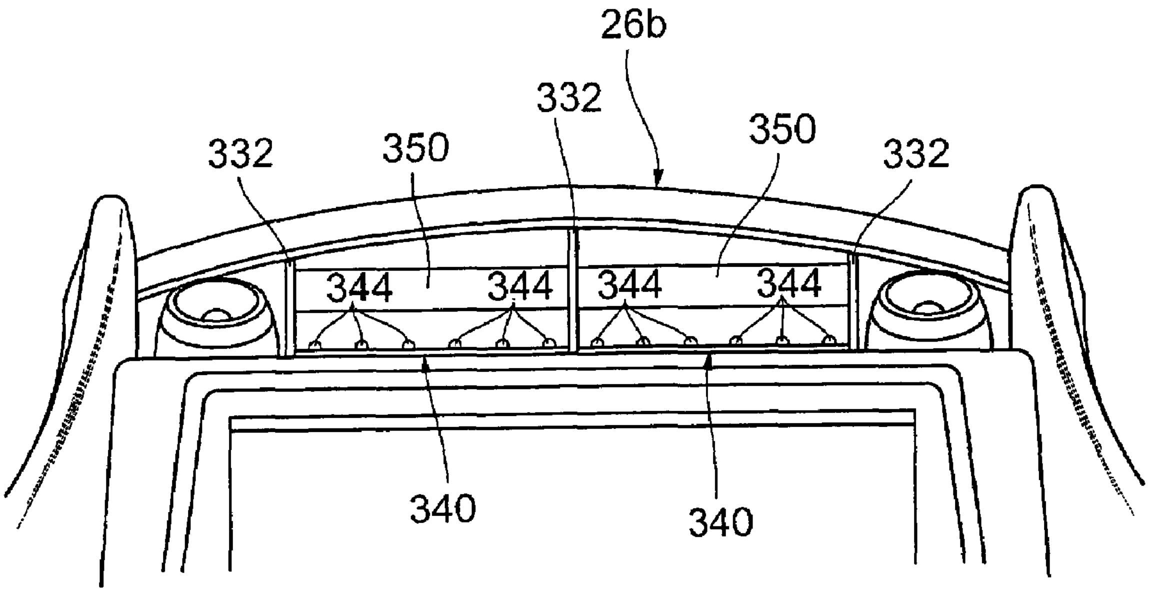
FIG. 38 is a view showing the strip-shaped lamp of FIG. 36 visible to the player.

Consequently, as shown in FIG. 38, only one tier of the light emitted from the LED's 344 is visible to the player. For this reason, in the strip-shaped lamp 26*b*, one tier of light from the right recessed portion 330A and one tier of light from the left recessed portion 330B being visible from the eye line of the player, one strip-shaped beam of light is visible as the whole of the strip-shaped lamp 26*b*.

As described heretofore, in the strip-shaped lamp 26*b* of the gaming machine 1, three strip-shaped beams of light are visible to the spectator, while only one strip-shaped beam of light is visible to the player. For this reason, in the strip-shaped lamp 26*b*, a quantity of light heading toward the player is smaller than a quantity of light heading toward the spectator. That is, a quantity of light entering the player's field of vision from the strip-shaped lamp 26*b* is reduced, by which part the fatigue of the player who continues the game is reduced.

Also, as the reflecting portion 354 has the first reflecting portion 354A and the second reflecting portion 354B, the reflected light from the LED's 344 is heading toward the spectator through two paths L2 and L3. For this reason, in comparison with a case in which the reflected light from the LED's 344 heads toward the spectator through one path, the quantity of light from the strip-shaped lamp 26*b* is increased, and a light emitting area is widened, improving a degree of advertising of the strip-shaped lamp 26*b*. Moreover, by an apparent number of light sources being increased by a mirror image of the LED's 344 due to the reflecting portion 354, it is possible to reduce a number of LED's 344 actually used to ⅓, realizing a reduction in a number of parts and an energy saving.

Furthermore, in the strip-shaped lamp 26*b*, as the LED's 344 of the light source unit 340 are disposed in such a way that the straight line L connecting each LED 344 and the lower edge 330*a* of the recessed portion 330 intersects with the perpendicular line from the front surface of the cabinet 3 at the acute angle ◘, a majority of the light from the LED's 344 heading toward the player is intercepted by the lower edge 330*a* of the recessed portion 330, effectively reducing the quantity of light heading toward the player.

Figure 39:
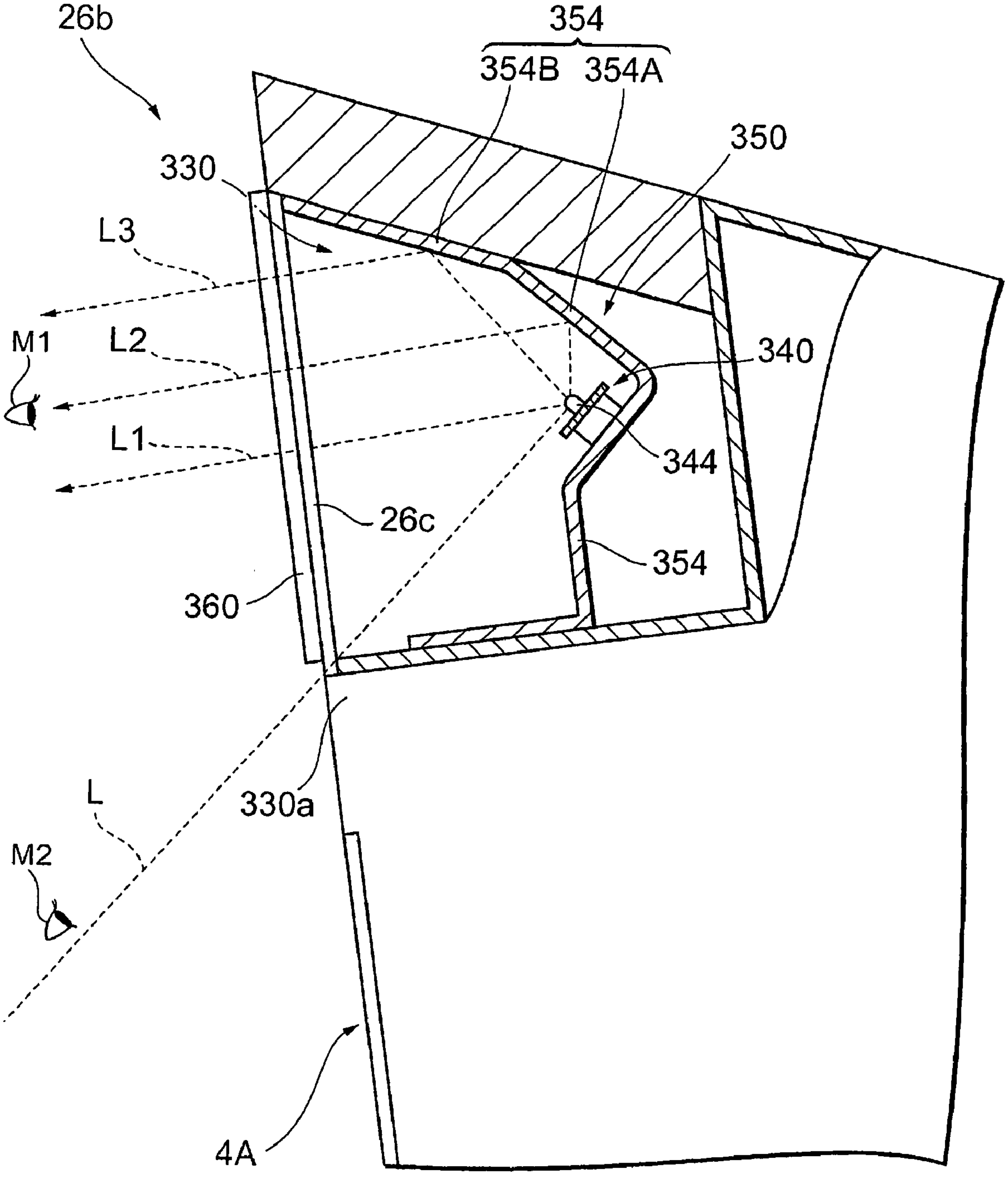
FIG. 39 is a sectional view showing a strip-shaped lamp of a different aspect.

In order to adjust the quantity of light from the strip-shaped lamp 26*b*, as shown in FIG. 39, it is acceptable that a polarizing filter 360 is affixed to a surface of the cover plate 26*c*. The polarizing filter 360, being affixed in such a way as to cover a whole of the cover plate 26*c*, transmits light falling incident at a nearly vertical angle, and intercepts light falling incident at a prescribed incidence angle or greater. For this reason, a spectator, whose eye line has approximately the same height as a height of the polarizing filter 360, can visually perceive the emergent light from the strip-shaped lamp 26*b* to the same degree as in a case in which there is no polarizing filter 360. Meanwhile, the emergent light from the strip-shaped lamp 26*b* being intercepted by the polarizing filter 360, a player who looks up at the polarizing filter 360 from below can hardly visually perceive the light from the strip-shaped lamp 26*b*. Consequently, by adopting this kind of polarizing filter 360, a quantity of light entering the player's field of vision from the strip-shaped lamp 26*b* is more effectively reduced, realizing a further reduction in the fatigue of the player.

Figure 40:
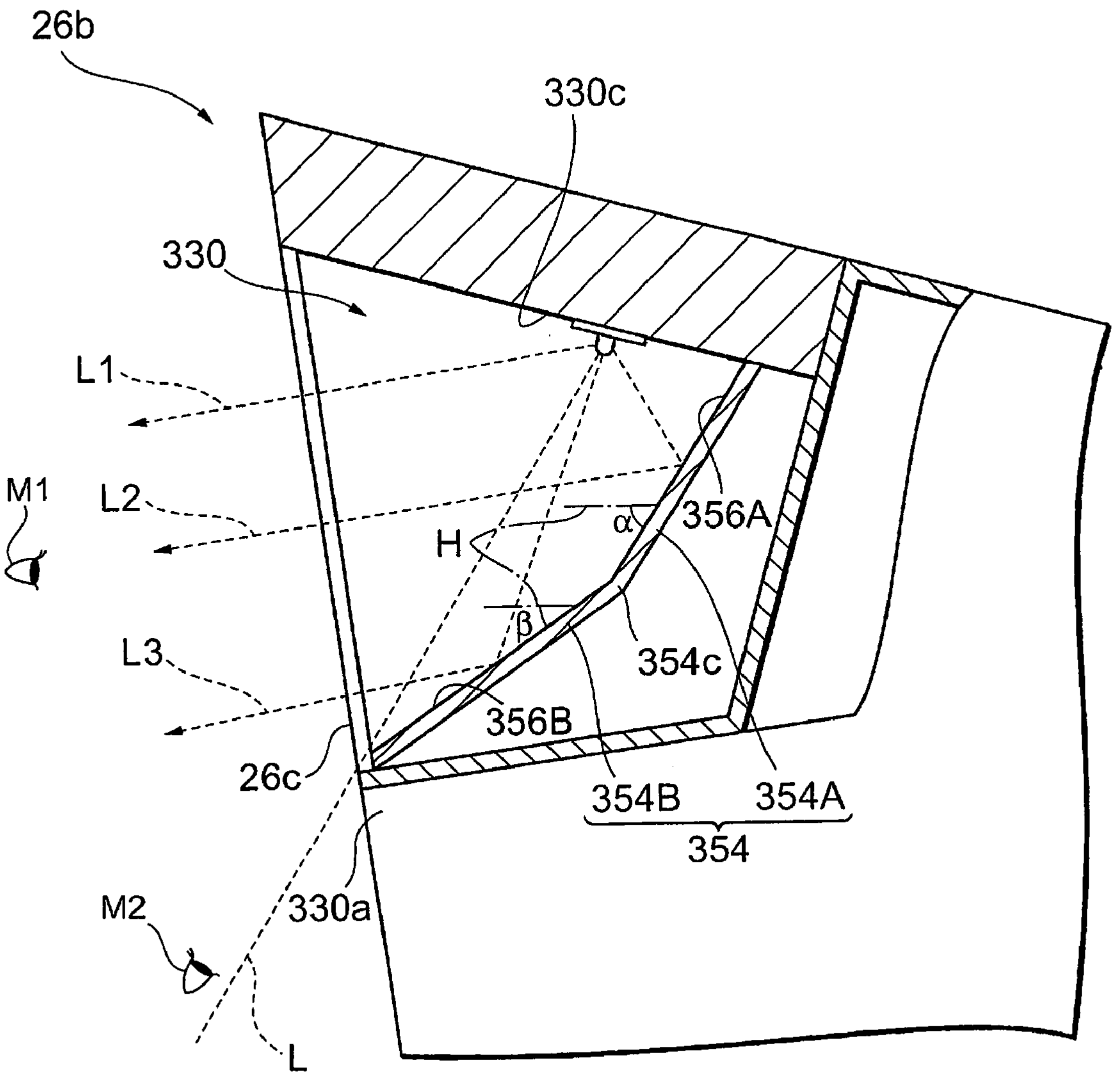
FIG. 40 is a view showing a strip-shaped lamp of a different aspect.

As shown in FIG. 40, it is also acceptable that the heretofore described strip-shaped lamp 26*b* has an aspect in which a positional relationship between the light source unit 340 and the reflecting plate 350 is reversed. That is, in the strip-shaped lamp 26*b* shown in FIG. 40, the light source unit 340 being installed on a ceiling plane 330*c* of the recessed portion 330, the reflecting portion 354 is disposed below the light source unit 340.

In the reflecting portion 354, a portion thereof above the bending portion 354*c* forms the first reflecting portion 354A having the reflecting surface 356A of the inclined angle α, and a portion below the bending portion 354*c* forms the second reflecting portion 354B having the reflecting surface 356B of the inclined angle β. That is, in the same way as the heretofore described embodiment, the second reflecting portion 354B is positioned on a side farther away from the LED's 344 than the first reflecting portion 354A, and the inclined angle β of the reflecting surface 356B of the second reflecting portion 354B is smaller than the inclined angle α of the reflecting surface 356A of the first reflecting portion 354A.

In the heretofore described strip-shaped lamp 26*b* too, in the same way as in the heretofore described embodiment, the light emitted from the LED's 344 and the three-tiered beams L1, L2 and L3 of the light reflected off the reflecting portion 354 are visible to the spectator M1, and only the light emitted from the LED's 344 is visible to the player M2. This is because the light reflected off the reflecting portion 354 is not reflected in the direction of the view point of the player M2 which is slightly above the straight line L connecting each LED 344 and the lower edge 330*a* of the recessed portion 330.

Figure 37:
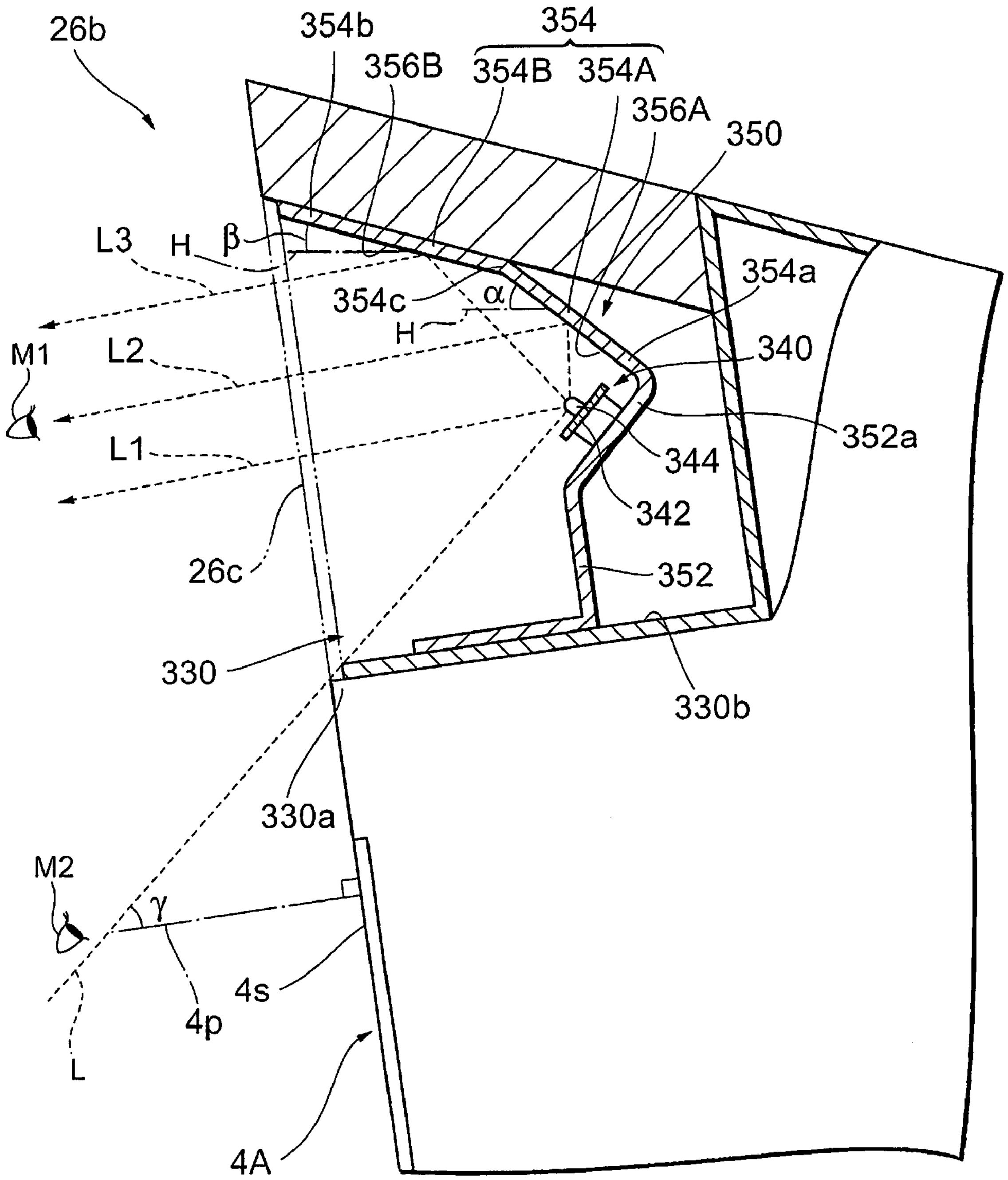
FIG. 37 is a sectional view of a strip-shaped lamp shown in FIG. 36 taken along line XXXVII-XXXVII.

That is, in the strip-shaped lamp 26*b* of the aspect shown in FIG. 40 too, in the same way as the strip-shaped lamp 26*b* shown in FIG. 37, three strip-shaped beams of light are visible to the spectator, while only one strip-shaped beam of light is visible to the player, and the quantity of light heading toward the player is smaller than the quantity of light heading toward the spectator. For this reason, the quantity of light entering the player's field of vision from the strip-shaped lamp 26*b* is reduced, realizing the reduction in the fatigue of the player who continues the game.

Hereafter, a detailed description will be given, while referring to the drawings, of another embodiment of the invention.

Figure 41:
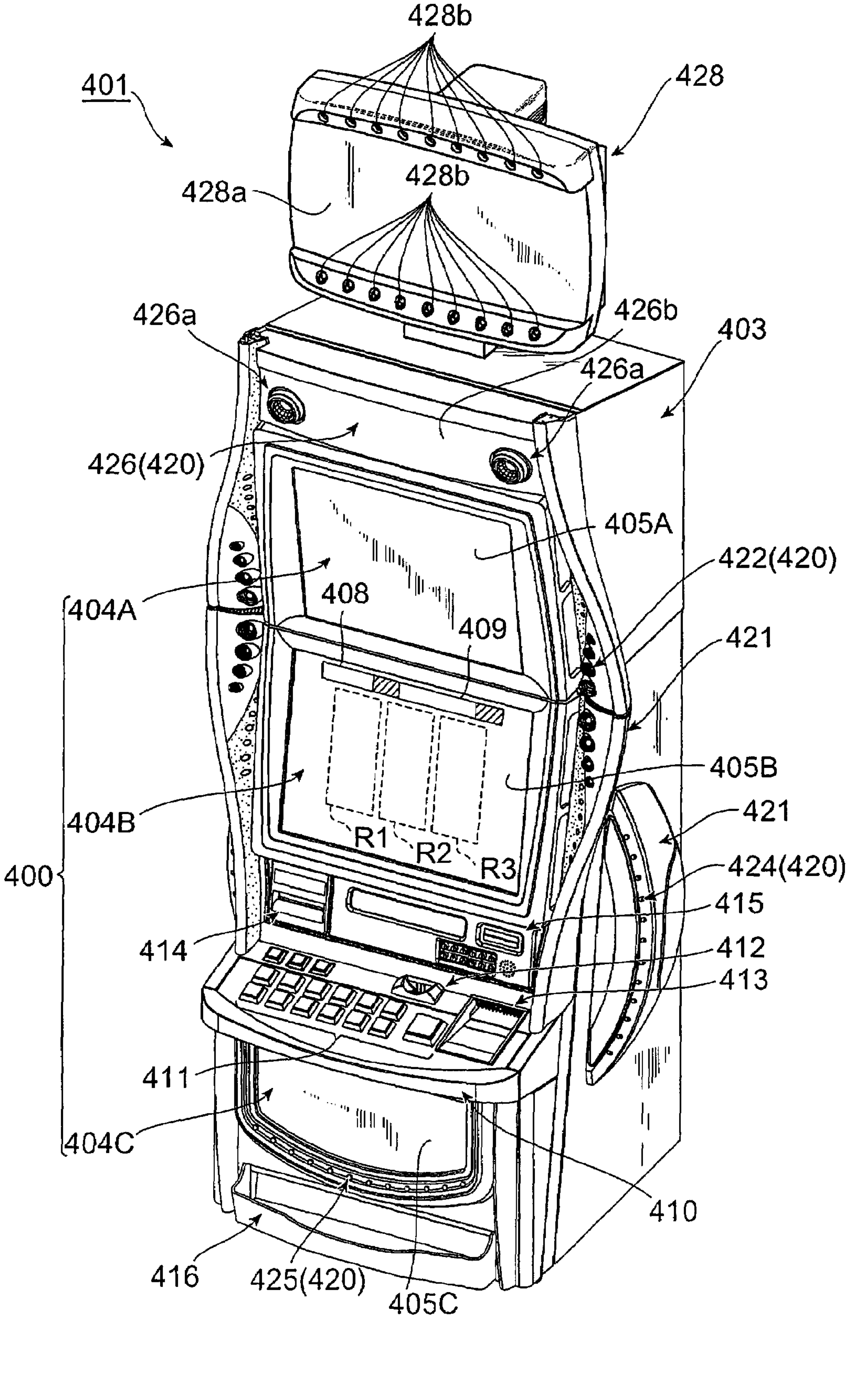
FIG. 41 is a perspective view showing a gaming machine according to another embodiment of the invention.

As shown in FIG. 41, a gaming machine 401, being an upright type slot machine installed in a game arcade such as a casino, has a cabinet 403 for housing electrical or mechanical parts for executing a prescribed game aspect. A display portion 404 for displaying information relating to a game including, for example, an upper display portion 404A, a middle variable display portion 404B and a lower display portion 404C, the display portions 404A to 404C are attached to a front surface of the vertically long cabinet 403. The upper display portion 404A, having a liquid crystal panel 405A disposed above the variable display portion 404B, displays, for example, an effect image, an introduction of game details, an explanation of game rules and the like by part of the liquid crystal panel 405A. The lower display portion 404C, being disposed below the variable display portion 404B, has a plastic panel 405C on which an image is printed, and lights up the plastic panel 405C by part of a backlight.

The variable display portion 404B for displaying an execution condition of the game having the transparent liquid crystal panel 405B fixed to a front door of the cabinet 403, it is possible for a player to see symbols of three reels R1, R2 and R3, disposed inside the cabinet 403, from outside via the liquid crystal panel 405B. A plurality of pay lines traversing the variable display portion 404B horizontally and diagonally are printed in areas of the variable display portion 404B corresponding to the three reels R1, R2 and R3. Furthermore, a payout quantity display portion 408 and a credit quantity display portion 409 are displayed in an upper portion of the variable display portion 404B. The middle variable display portion 404B, being inclined in such a way that the upper portion tilts rearward, is configured in such a way that the player can play in a comfortable position.

An operation table 410 protruding forward being provided at a front of the cabinet 403, between the middle variable display portion 404B and the lower display portion 404C, as an operation portion which instructs an execution of the game, various kinds of operation button 411, such as a BET button, a COLLECT button, a START button, a STOP button and the like, are arranged on the operation table 410. A coin slot 412 and a bill accepter 413 are provided on the operation table 410. A ticket printer 414 and a card reader 415 are provided between the operation table 410 and the middle variable display portion 404B. Furthermore, a coin tray 416 is provided in a lowermost portion of the cabinet 403.

Also, a light emitting portion 420 is disposed in the cabinet 403 of the gaming machine 401 in such a way as to surround a game area including the upper display portion 404A, the middle variable display portion 404B, the lower display portion 404C and the operation table 410. The light emitting portion 420 is configured of side lamps 422, which are provided on oblique light bases 421 protruding bow-like laterally from right and left end portions of the cabinet 403 across the upper display portion 404A and the variable display portion 404B, speaker lamps 424, which are provided on edges of bow shaped speakers 423 protruding laterally from right and left end portions of the cabinet 403 in positions near the operation table, under lamps 425, which are provided on a lower edge of the lower display portion 404C, and a top lamp 426 which, being provided above the upper display portion 404A, has power lamps 426*a* disposed on both sides and a strip-shaped lamp 426*b* arranged in a center in a horizontal direction. The light emitting portion 420 creates an intriguing illumination by a lamp control.

In the heretofore described gaming machine 401, by supplementing light from the display portion 404 and the operation buttons 411 on the operation table 410 with light from the light emitting portion 420 disposed in such a way as to surround the game area, in cooperation with the light from the display portion 404 in the game area and the light from the operation buttons 411 on the operation table 410, it is possible, using the light, to markedly improve a degree of advertising of the gaming machine 401 to a spectator. Furthermore, by appropriately changing a lighting condition or a flashing condition of the light emitting portion 420, it is possible, using the light, to easily distinguish the gaming machine 401 from another machine. By this part, it is possible to create an intriguing gaming machine.

The gaming machine 401 further includes a topper effect device 428 (an effect device) mounted on the cabinet 403. The topper effect device 428, having a rectangular board shape, is disposed in such a way as to be approximately parallel to the liquid crystal panel 405A of the upper display portion 404A.

A plastic panel 428*a*, on which an image is printed, being fitted in a front surface of the topper effect device 428, a configuration is such that the plastic panel 428*a* is lit up by a built-in backlight 498 (not shown in FIG. 41). Also, on the front surface of the topper effect device 428, a plurality of LED's 428*b* are disposed at equal intervals along upper and lower sides of the plastic panel 428*a*.

Next, a description will be given, while referring to FIGS. 42 to 45, of an internal configuration of the heretofore described gaming machine 401.

Figure 42:
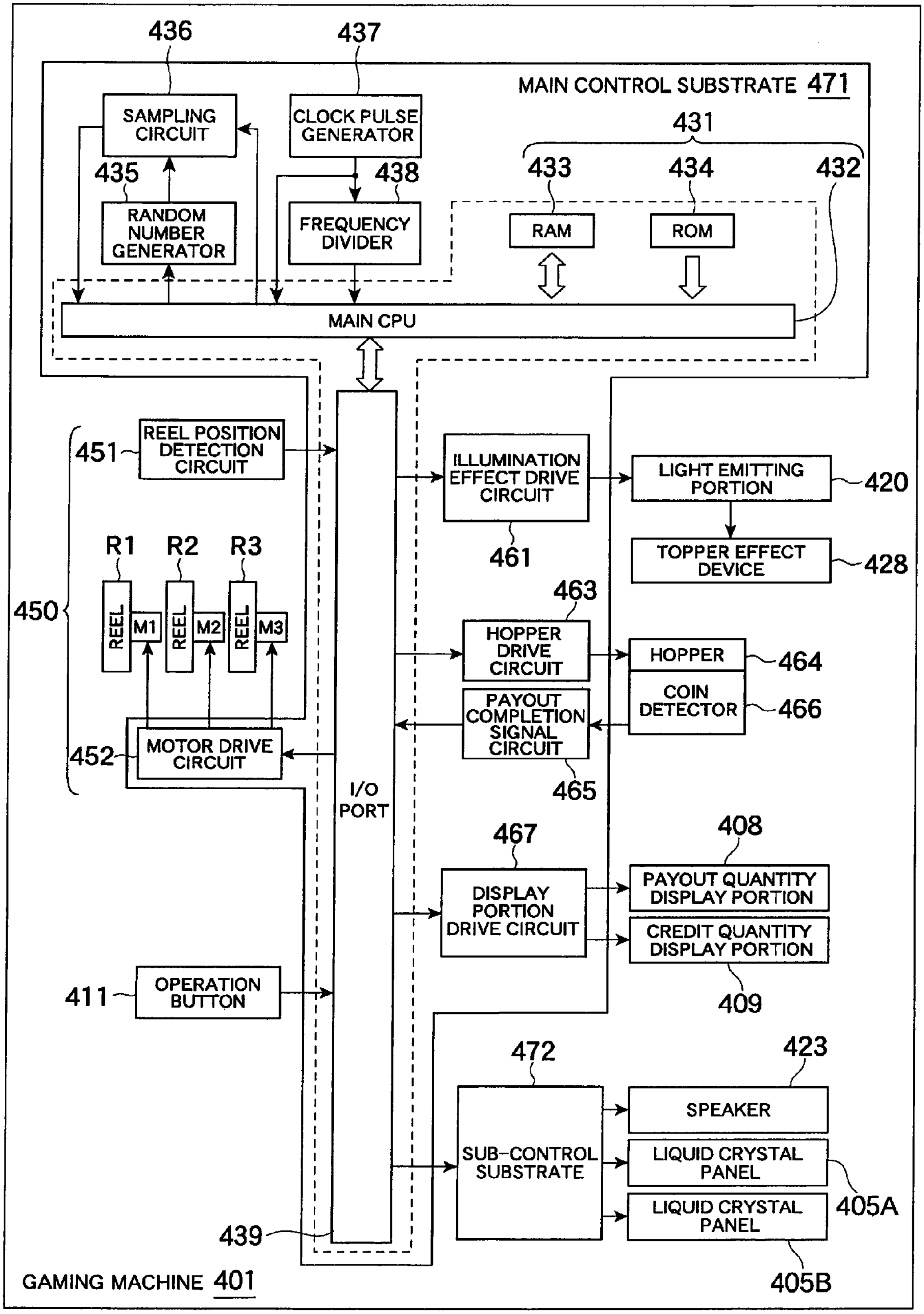
FIG. 42 is a block diagram showing an internal configuration of a whole of the gaming machine shown in FIG. 1.

FIG. 42 is a block diagram showing an internal configuration of a whole of the gaming machine 401. As shown in FIG. 42, the gaming machine 401 has a plurality of components centered around a main control substrate 471 including a microcomputer 431. The main control substrate 471, having the microcomputer 431, a random number generator 435, a sampling circuit 436, a clock pulse generator 437 and a frequency divider 438, has an illumination effect drive circuit 461, a hopper drive circuit 463, a payout completion signal circuit 465 and a display portion drive circuit 467.

The microcomputer 431 has a main CPU 432, an RAM 433 and an ROM 434. The main CPU 432, operating in accordance with a program stored in the ROM 434, by carrying out a reception and a transmission of a signal from and to another component via an I/O port 439, carries out an operation control of the whole of the gaming machine 401. Data and programs used when the main CPU 432 operates are stored in the RAM 433 and, for example, as well as a random number sampled by the sampling circuit 436, to be described hereafter, being temporarily held after a start of the game, code numbers of the reels R1, R2 and R3 and symbol numbers are stored therein. A program, which the main CPU 432 executes, and permanent data are stored in the ROM 434.

The random number generator 435, operating in accordance with an instruction from the main CPU 432, generates random numbers in a certain range. The sampling circuit 436, in accordance with an instruction from the main CPU 432, as well as extracting an optional random number from among random numbers generated by the random number generator 435, inputs the extracted random number into the main CPU 432. The clock pulse generator 437 generates a standard clock pulse for operating the main CPU 432, and the frequency divider 438 inputs a signal, in which the standard clock pulse is divided by a certain frequency, into the main CPU 432.

Also, a reel drive unit 450 is connected to the main control substrate 471. The reel drive unit 450 has a reel position detection circuit 451, which detects a position of each reel R1, R2 and R3, and a motor drive circuit 452 which inputs a drive signal into motors M1, M2 and M3 for rotating the reels R1, R2 and R3 respectively. By the drive signal being input from the motor drive circuit 452, the motors M1, M2 and M3 are operated to rotate the reels R1, R2 and R3 respectively.

Furthermore, the operation buttons 411, including the STOP button for inputting an instruction to stop the reel R1, R2 or R3, the START button, the COLLECT button, the BET button and the like, being connected to the main control substrate 471, a signal corresponding to a button recessed portion is input into the main CPU 432 via the I/O port 439.

Figure 43:
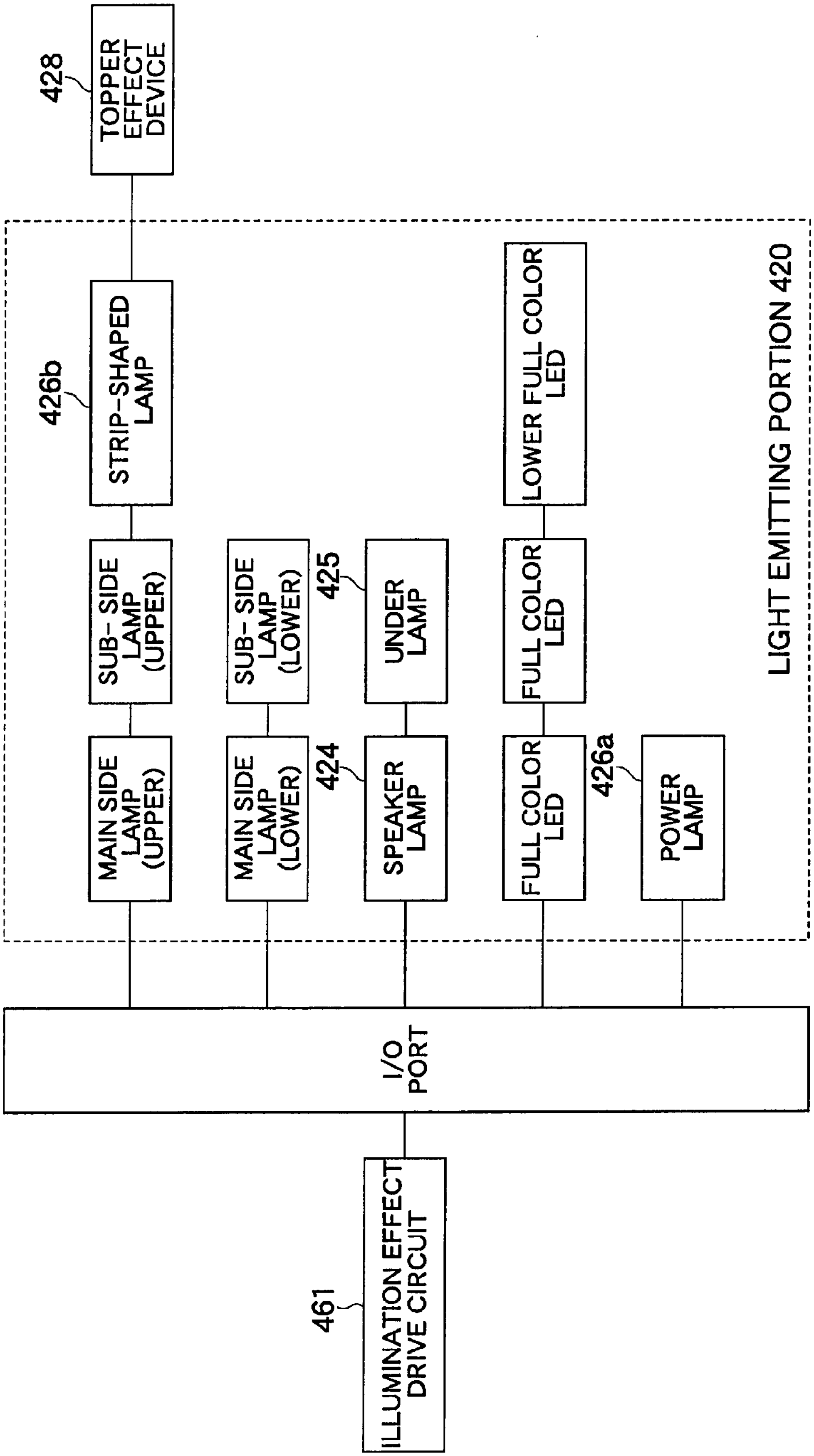
FIG. 43 is a block diagram showing a configuration of a light emitting portion shown in FIG. 2.

The illumination effect drive circuit 461 transmits an effect signal for causing the heretofore described light emitting portion 420 and topper effect device 428 to carry out an illumination effect. The light emitting portion 420, as shown in FIG. 43, is configured of a plurality of lamps including the heretofore described speaker lamps 424, under lamps 425, power lamps 426*a* and strip-shaped lamp 426*b*, and LED's. Main side lamps and sub-side lamps shown in FIG. 43 configure the heretofore described side lamps 422 provided on the oblique light bases 421. Also, full color LED's shown in FIG. 43 being attached to the liquid crystal panel 405B and decorating both right and left sides of the liquid crystal panel 405B, the lower full color LED's light up the coin tray 416. The topper effect device 428 is serially connected to the illumination effect drive circuit 461 via the light emitting portion 420 of this kind of configuration.

The hopper drive circuit 463 driving the hopper 464 in accordance with a control of the main CPU 432, the hopper 464, carrying out an operation for carrying out a payout of a coin, pays the coin out into the coin tray 416. The payout completion signal circuit 465 receives data of a coin quantity value from a coin detector 466 connected thereto and, in the event that the quantity value reaches data of a set quantity value, inputs a signal informing of a coin payout completion into the main CPU 432. The coin detector 466 counts a quantity of coins paid out by the hopper 464, and inputs data of the counted quantity value into the payout completion signal circuit 465. The display portion drive circuit 467 controls a display operation of each kind of display portion such as the payout quantity display portion 408 and the credit quantity display portion 409.

Figure 44:
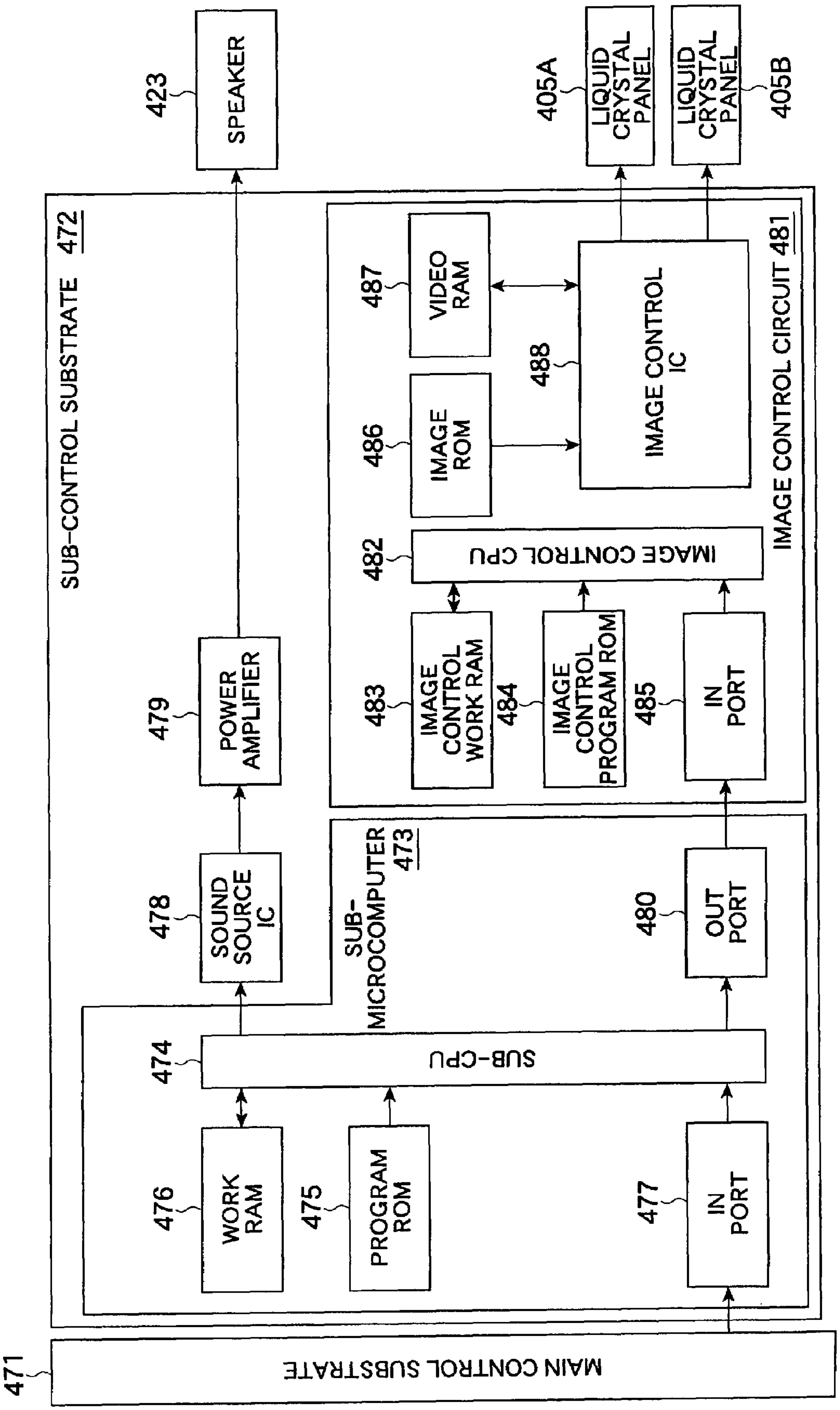
FIG. 44 is a block diagram showing an internal configuration of a sub-control substrate shown in FIG. 2.

Furthermore, a sub-control substrate 472 is connected to the main control substrate 471. The sub-control substrate 472, as shown in FIG. 44, receiving a command from the main control substrate 471, carries out a display control of the liquid crystal panel 405A of the upper display portion 404A and the liquid crystal panel 405B of the variable display portion 404B, and an emission control of a sound from the speakers 423. The sub-control substrate 472, being configured on a circuit substrate separate from the circuit substrate configuring the main control substrate 471, with a microcomputer (hereafter called a "sub-microcomputer") 473 as a main component, has a sound source IC 478, which controls the sound emitted from the speakers 423, a power amplifier 479, which acts as an amplifier, and an image control circuit 481 operating as a display controller of the liquid crystal panels 405A and 405B.

The sub-microcomputer 473 has a sub-CPU 474, which carries out a control operation in accordance with a control command transmitted from the main control substrate 471, a program ROM 475 acting as a memory, a work RAM 476, and I/O ports 477 and 480. The sub-control substrate 472, although not including the clock pulse generator, the frequency divider, the random number generator or the sampling circuit, is configured in such a way as to execute a random number sampling on an operation program of the sub-CPU 474. The program ROM 475 stores a control program executed by the sub-CPU 474. The work RAM 476 is configured as a temporary memory for when the control program is executed by the sub-CPU 474.

The image control circuit 481 has an image control CPU 482, an image control work RAM 483, an image control program ROM 484, an image ROM 486, a video RAM 487 and an image control IC 488. The image control CPU 482, based on parameters set by the sub-microcomputer 473, determines an image to be displayed on the liquid crystal panels 405A and 405B, in accordance with an image control program stored in the image control program ROM 484.

The image control program relating to the display on the liquid crystal panels 405A and 405B, and various kinds of selection table, are stored in the image control program ROM 484. The image control work RAM 483 is configured as a temporary memory for when the image control program is executed by the image control CPU 482. The image control IC 488 forms an image corresponding to details determined by the image control CPU 482, and transmits it to the liquid crystal panels 405A and 405B.

The image ROM 486 stores dot data for forming an image. The video RAM 487 operates as a temporary memory for when the image is formed by the image control IC 488.

Figure 45:
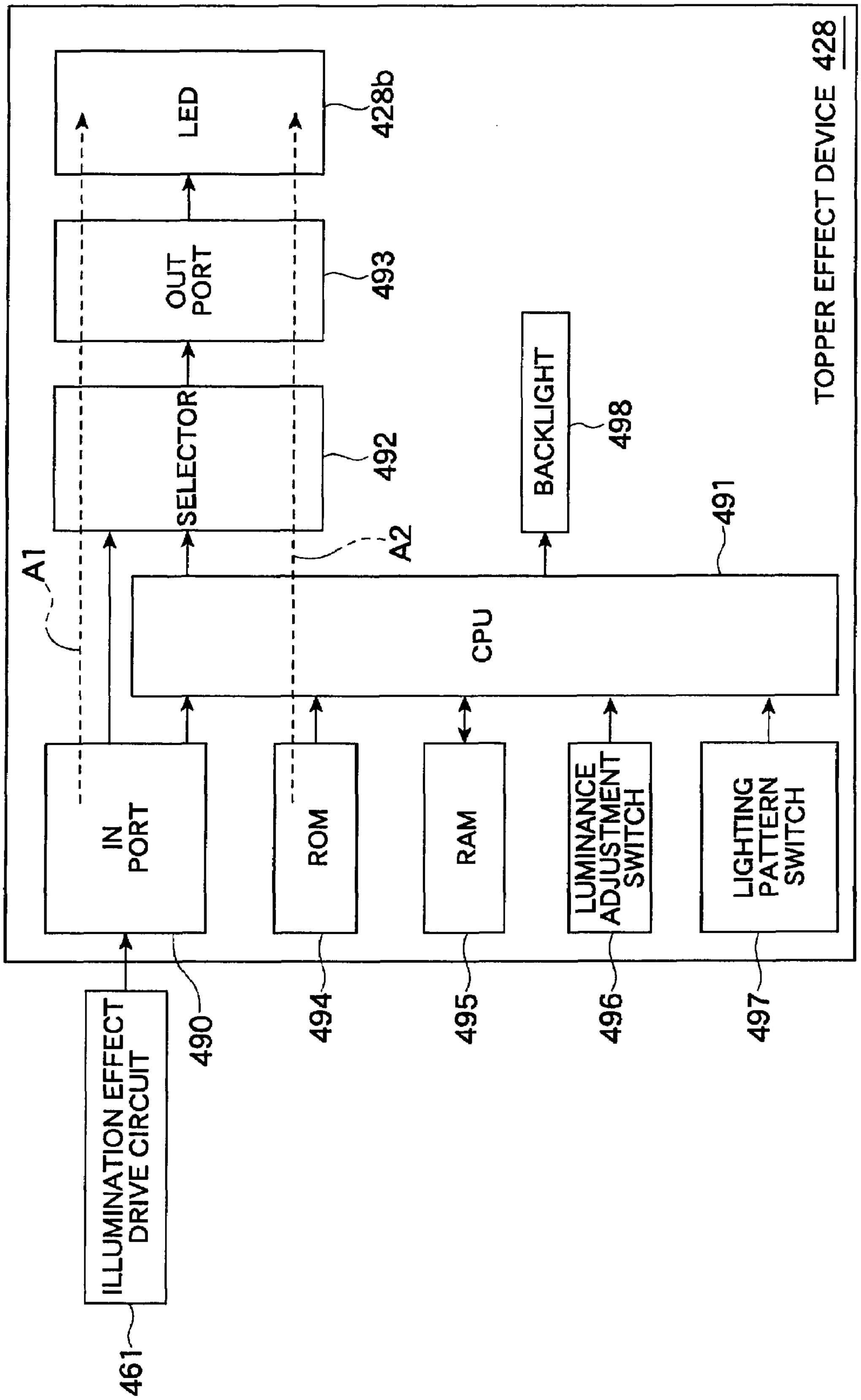
FIG. 45 is a block diagram showing an internal configuration of a topper effect device shown in FIG. 2.

FIG. 45 is a block diagram showing an internal configuration of the topper effect device 428 of the gaming machine 401. As shown in FIG. 45, the topper effect device 428 has an IN port 490, which receives information from the illumination effect drive circuit 461 outside the device, a CPU 491, which carries out various kind of calculation process, a selector 492, which carries out a selection transmission of an effect signal, and an OUT port 493 which sends the effect signal to the LED's 428*b*.

The IN port 490 of the topper effect device 428 is serially connected to the illumination effect drive circuit 461 of the main control substrate 471 via the light emitting portion 420. The IN port 490, being an effect information receiver, receives effect information (hereafter called first effect information) relating to the illumination effect of the topper effect device 428 from the illumination effect drive circuit 461. Effect detail information instructing effect details such as a lighting pattern of each LED 428*b* is included in the first effect information. For this reason, in a case in which the first effect information is transmitted from the OUT port 493 as the effect signal, the LED's 428*b* acting as an effect device carry out an illumination effect corresponding to the effect detail information included in the first effect information. The first effect information received by the IN port 490 is transmitted in parallel to the CPU 491 and the selector 492.

An ROM 494 and an RAM 495, which are effect information storage device, being connected to the CPU 491, effect information (hereafter called second effect information) relating to the illumination effect of the topper effect device 428 is stored in the ROM 494. Although, in the same way as in the first effect information, effect detail information instructing effect details such as the lighting pattern of each LED 428*b* is also included in the second effect information, the relevant effect detail information differs from the effect detail information included in the first effect information.

The CPU 491, when a prescribed effect condition is fulfilled, as well as transmitting an effect signal corresponding to the effect detail information included in the second effect information, which is stored in the ROM 494, to the selector 492, sends to the selector 492 a switching command instructing the selector 492 to transmit the effect signal in place of the first effect information. Herein, the effect condition in the embodiment is that there is no inputting of the first effect information from the IN port 490 into the CPU 491. That is, when there is no inputting of the first effect information from the IN port 490 into the CPU 491, the CPU 491, as well as transmitting an effect signal corresponding to the second effect information to the selector 492, sends the switching command to the selector 492. It is also acceptable that the effect condition, not being limited to the heretofore described condition, is an elapsing of a prescribed time period, a coming of a prescribed time, a reception of a specified signal from the illumination effect drive circuit 461 or the like.

The selector 492, based on the switching command sent from the CPU 491, transmits either the effect signal corresponding to the first effect information sent from the IN port 490, or the effect signal corresponding to the second effect information sent from the CPU 491, to the LED's 428*b* via the OUT port 493. That is, an effect signal transmitter, being configured of the heretofore described CPU 491, selector 492 and OUT port 493, based on the prescribed effect condition, transmits either an effect signal based on the first effect information received by the IN port 490, or an effect signal based on the second effect information stored in the ROM 494, to the LED's 428*b*.

Furthermore, a luminance adjustment switch 496, a lighting pattern switch 497 and a backlight 498 are connected to the CPU 491. The luminance adjustment switch 496, being a DIP switch for controlling a time interval between an ON and an OFF of each LED 428*b* and adjusting a luminance, sends a signal for causing the CPU 491 to carry out a multistage luminance adjustment (for example, four-stage adjustment) to the CPU 491. The lighting pattern switch 497, being a switch used for setting the lighting pattern of each LED 428*b* as an effect change condition, inputs a signal for causing the CPU 491 to set various kinds of lighting pattern, to be described hereafter, into the CPU 491. By the CPU 491 causing only an LED 428*b* in a prescribed place, among the plurality of LED's 428*b*, to light and/or flash, a confirmation is carried out as to which lighting pattern has been set. The backlight 498 being an illumination unit which, in response to a transmission signal from the CPU 491, lights up the plastic panel 428*a* of the heretofore described topper effect device 428, for example, a cold cathode tube is adopted.

Figure 46:
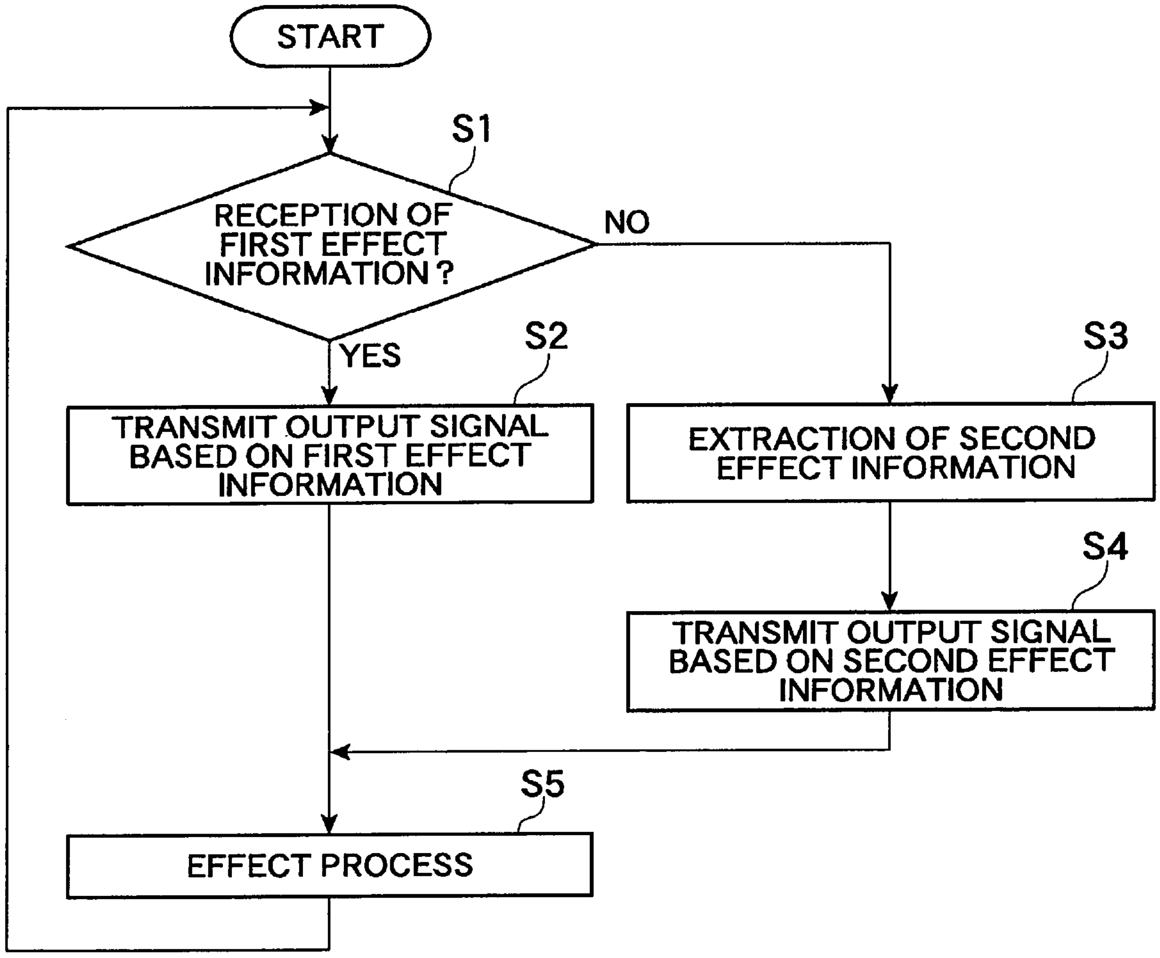
FIG. 46 is a flowchart showing a procedure of an effect process in the topper effect device according to the invention.

Next, a description will be given, while referring to FIG. 46, of a procedure of an effect process in the topper effect device 428.

The CPU 491, by receiving the first effect information sent from the IN port 490, constantly or intermittently monitoring whether or not the IN port 490 has received the first effect information, carries out a determination of the effect condition (Step 1). Then, if the CPU 491 has detected the reception of the first effect information from the IN port 490, it sends the switching command for transmitting the effect signal corresponding to the first effect information to the selector 492, and the effect signal is transmitted from the selector 492 via the OUT port 493 to the LED's 428*b* (Step 2).

Meanwhile, the CPU 491 carries out the determination of the effect condition (Step 1) and, if it has not detected the reception of the first effect information from the IN port 490, it extracts the second effect information from the ROM 494 (Step 3). Then, the CPU 491 sends the switching command for transmitting the effect signal of the second effect information to the selector 492, along with the effect signal corresponding to the second effect information, to the selector 492. Continuing on, the effect signal sent to the selector 492 from the CPU 491 is transmitted to the LED's 428*b*, via the OUT port 493, from the selector 492 (Step 4).

Then, the LED's 428*b* carry out an effect corresponding to the effect signal sent from the OUT port 493 (Step 5). In the topper effect device 428, the above steps 1 to 5 are repeated as the effect process. Consequently, when the first effect information has been input from the illumination effect drive circuit 461 into the topper effect device 428, as shown by an arrow A1, the LED's 428*b* carry out an illumination effect corresponding to the effect signal of the first effect information. Meanwhile, when the first effect information has not been input from the illumination effect drive circuit 461 into the topper effect device 428, as shown by an arrow A2, the LED's 428*b* carry out an illumination effect corresponding to the second effect information stored in the ROM 494 of the topper effect device 428.

That is, in the topper effect device 428, as the LED's 428*b* carry out not only the illumination effect corresponding to the effect signal of the first effect information received from an exterior, but also an effect corresponding to the effect signal of the second effect information stored in the ROM 494, a diversification of effects being achieved, it is possible to carry out an effect richer in variety. Moreover, even in the event that the inputting of the first effect information from the illumination effect drive circuit 461 into the topper effect device 428 has been interrupted because of a disconnection of a line or the like, as the effect based on the second effect information is carried out, it is possible to continuously carry out the effect due to the topper effect device 428.

Also, in the heretofore described embodiment, as the effect detail information relating to the effect details of the LED's 428*b* is included in the first effect information, it is not necessary for the topper effect device 428 to store the effect detail information. That is, in the topper effect device 428, it not being necessary to newly provide a storage device for the effect detail information, or allot a part of a recording area of the ROM 494 in which the second effect information is stored, an efficient use is made of the recording area of the topper effect device 428.

However, it is also possible, as necessary, to have an aspect in which at least apart of the effect detail information relating to the effect details of the LED's 428*b* is stored in the ROM 494 and, when the first effect information is input into the IN port 490, the CPU 491 extracts the effect detail information, and sends it to the LED's 428*b*. For example, it is also possible to have an aspect in which effect detail information relating to the lighting pattern of each LED 428*b* is stored in the ROM 494 and, when the first effect information including only a light emitting timing as the effect detail information is input into the IN port 490, the CPU 491 extracts the effect detail information relating to the lighting pattern, and sends it to the LED's 428*b*.

Furthermore, in the heretofore described embodiment, the topper effect device 428 is serially connected to the illumination effect drive circuit 461 of the main control substrate 471 via the light emitting portion 420. By adopting this kind of serial connection, it is possible to add on the light emitting portion or the effect device, and also, wirings necessary for the connection are reduced in number.

Although the heretofore described embodiment shows an aspect in which one item of second effect information is stored in the ROM 494, it is also acceptable to appropriately change to an aspect in which a plurality of items of second effect information including different items of effect detail information are stored in the ROM 494. In this case, the CPU 491, in Step 3 in the effect process of the topper effect device 428, selects and extracts one of the plurality of items of second effect information and, in Step 4, transmits the selected second effect information to the LED's 428*b* (refer to FIG. 46). In this way, by storing the plurality of items of second effect information in the ROM 494, it is possible for the topper effect device 428 to realize a variety of effects depending on how the CPU 491 selects the second effect information.

Also, in the heretofore described aspect in which the plurality of items of second effect information are stored in the ROM 494, it is also acceptable that the CPU 491, at the time of Step 3, changes second effect information to be selected from the ROM 494 every time the effect change condition is fulfilled. The effect change condition includes an elapsing of a prescribed time period, a coming of a prescribed time, a reception or otherwise of a change signal from the illumination effect drive circuit 461, a signal input of the lighting pattern switch 497 or the like. As the effect change condition, in a case of an aspect in which second effect information to be selected is changed in response to the signal input of the lighting pattern switch 497, it is possible, by an operation of the lighting pattern switch 497, to set to optional second effect information.

In this way, by changing the second effect information to be selected from the ROM 494 in response to the effect change condition, it is possible for the topper effect device 428 to realize various effect aspects corresponding to the effect change condition. Second effect information to be selected from the ROM 494 not necessarily being changed, even by simply randomly reselecting second effect information to be selected, every time the effect change condition is fulfilled, it is possible to realize various effect aspects.

Although the above description has been given of the topper effect device 428 as an example of the effect device, the whole of the gaming machine 401 including the topper effect device 428 can also become the effect device. In this case, the gaming machine 401, having a system similar to or equivalent to the system in the block diagram of the topper effect device 428 shown in FIG. 45, receives the first effect information from the exterior of the gaming machine 401 (for example, a separate gaming machine, a game server or the like). Then, the gaming machine 401, based on the prescribed effect condition, transmits either the effect signal based on the first effect information or the effect signal based on the second effect information stored in an effect information storage device (for example, the ROM 434) of the gaming machine 401, and causes an effect device (for example, the light emitting portion 420 or the speakers 423) to carry out an effect corresponding to the signal. By this part, even in a case in which the gaming machine 401 itself is the effect device, in the same way as in a case in which the topper effect device 428 is the effect device, a diversification of effects by the gaming machine 401 is achieved, and the effect richer in variety is carried out.

The invention, not being limited to the heretofore described embodiment, can be variously modified. For example, the effect device not being limited to the LED's 428*b* carrying out the illumination effect or the like, it is also acceptable that it is a device carrying out the sound effect, a device carrying out the image effect or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gaming machine comprising:

a cabinet having a display portion, which displays information relating to a game, and an operation table for a player to carry out an operation of the game;

a light emitting portion which emits light; and a light interception portion which intercepts at least some light heading toward a player, from among light emerging from a light source provided on the light emitting portion, wherein the light emitting portion is arranged in an inside of a display device casing of a gaming machine display device mounted on an upper end of the cabinet, an oblique light portion having a reflecting surface is provided on a side of the light emitting portion, the plurality of light emitting portions are provided in an inside of a peripheral frame of the cabinet, a light interception plate which constitutes the light interception portion and a transparent plate are provided on the peripheral frame, and a lower display portion which emits light from under lamps is provided below the operation table of the cabinet.

2. The gaming device according to claim 1, wherein the light emitting portion has a lens which converges the light emerging from the light source.

3. The gaming device according to claim 2, wherein the light interception portion surrounds a periphery of the lens.

* * * * *